US011200246B2

(12) United States Patent
Kharisma et al.

(10) Patent No.: US 11,200,246 B2
(45) Date of Patent: Dec. 14, 2021

(54) HASH BUCKETING OF DATA

(71) Applicant: Splunk Inc., San Francisco, CA (US)

(72) Inventors: Esguerra Ma Kharisma, San Mateo, CA (US); Igor Stojanovski, San Francisco, CA (US); Vishal Patel, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 579 days.

(21) Appl. No.: 15/339,906

(22) Filed: Oct. 31, 2016

(65) Prior Publication Data
US 2018/0089188 A1 Mar. 29, 2018

Related U.S. Application Data

(60) Provisional application No. 62/400,081, filed on Sep. 26, 2016.

(51) Int. Cl.
*G06F 16/22* (2019.01)
*G06F 16/242* (2019.01)
(Continued)

(52) U.S. Cl.
CPC .......... *G06F 16/248* (2019.01); *G06F 3/0481* (2013.01); *G06F 16/22* (2019.01); *G06F 16/2228* (2019.01); *G06F 16/2255* (2019.01); *G06F 16/2425* (2019.01); *G06F 16/2455* (2019.01); *G06F 16/2462* (2019.01); *G06F 16/2477* (2019.01); *G06F 16/24568* (2019.01); *G06F 16/25* (2019.01); *G06F 16/285* (2019.01); *G06F 16/8373* (2019.01); *G06F 16/901* (2019.01); *G06F 16/9038* (2019.01);
(Continued)

(58) Field of Classification Search
CPC .. G06F 16/248; G06F 16/24568; G06F 16/22; G06F 16/285; G06F 16/8373; G06F 16/901; G06F 16/90335; G06F 16/9038; G06F 16/2255
See application file for complete search history.

(56) References Cited

U.S. PATENT DOCUMENTS

| 5,546,576 A | 8/1996 | Cochrane et al. |
| 6,591,298 B1 * | 7/2003 | Spicer ................ H04L 41/046 709/224 |

(Continued)

OTHER PUBLICATIONS

Qin et al., "A new connection degree calculation and measurement method for large scale network monitoring", Journal of Network and Computer Applications (Year: 2013).*

(Continued)

*Primary Examiner* — Irete F Ehichioya
*Assistant Examiner* — Huen Wong
(74) *Attorney, Agent, or Firm* — Perkins Coie LLP

(57) ABSTRACT

The disclosed embodiments include a method performed by a data intake and query system. The method includes ingesting metrics including respective key values and respective measured values, where the respective key values include a primary key value of a selected primary key. The method further includes generating a hash value for each metric by processing each primary key value with a hashing function, and indexing each metric in association with an existing hash bucket having a matching hash value.

25 Claims, 67 Drawing Sheets

(51) Int. Cl.

| | | |
|---|---|---|
| *G06F 16/2455* | (2019.01) | |
| *G06F 16/2458* | (2019.01) | |
| *G06F 16/248* | (2019.01) | |
| *G06F 16/25* | (2019.01) | |
| *G06F 16/28* | (2019.01) | |
| *G06F 16/835* | (2019.01) | |
| *G06F 16/901* | (2019.01) | |
| *G06F 16/903* | (2019.01) | |
| *G06F 16/9038* | (2019.01) | |
| *G06F 16/951* | (2019.01) | |
| *G06F 16/9535* | (2019.01) | |
| *G06F 3/0481* | (2013.01) | |
| *G06T 11/20* | (2006.01) | |
| *H04L 12/26* | (2006.01) | |
| *H04L 29/08* | (2006.01) | |

(52) U.S. Cl.
CPC ...... *G06F 16/90335* (2019.01); *G06F 16/951* (2019.01); *G06F 16/9535* (2019.01); *G06T 11/206* (2013.01); *H04L 67/02* (2013.01); *H04L 67/025* (2013.01); *G06T 2200/24* (2013.01); *H04L 43/08* (2013.01)

(56) References Cited

U.S. PATENT DOCUMENTS

| | | | |
|---|---|---|---|
| 6,597,661 B1* | 7/2003 | Bonn | H04L 29/06 370/235 |
| 6,892,307 B1* | 5/2005 | Wood | G06F 21/41 713/155 |
| 7,152,073 B2 | 12/2006 | Gudbjartsson et al. | |
| 7,191,184 B2 | 3/2007 | Laborde et al. | |
| 7,398,271 B1 | 7/2008 | Borkovsky et al. | |
| 7,480,940 B1* | 1/2009 | Agbabian | H04L 63/1425 726/22 |
| 7,624,265 B1* | 11/2009 | Slyva | H04L 63/08 713/168 |
| 7,680,775 B2 | 3/2010 | Levin et al. | |
| 7,716,167 B2 | 5/2010 | Colossi et al. | |
| 7,778,864 B2 | 8/2010 | Conrad et al. | |
| 7,873,619 B1 | 1/2011 | Faibish et al. | |
| 8,099,400 B2 | 1/2012 | Haub et al. | |
| 8,112,801 B2* | 2/2012 | Abdel-Aziz | H04L 63/145 726/22 |
| 8,635,373 B1* | 1/2014 | Supramaniam | H04L 67/42 709/248 |
| 8,655,823 B1* | 2/2014 | Kumar | G06F 21/554 706/46 |
| 8,824,321 B2* | 9/2014 | Shibata | H04L 43/0817 370/230.1 |
| 8,838,597 B1 | 9/2014 | Gottumukkala et al. | |
| 9,251,296 B2 | 2/2016 | Haub et al. | |
| 9,471,610 B1 | 10/2016 | Long et al. | |
| 9,584,395 B1 | 2/2017 | Rapoport et al. | |
| 9,876,873 B1 | 1/2018 | Teague et al. | |
| 10,003,555 B1* | 6/2018 | O'Brien | H04L 49/405 |
| 10,114,663 B2 | 10/2018 | Bingham et al. | |
| 10,169,434 B1 | 1/2019 | Block et al. | |
| 10,333,958 B2* | 6/2019 | Huang | H04L 43/04 |
| 10,346,758 B2 | 7/2019 | Natsumeda | |
| 10,505,825 B1 | 12/2019 | Bettaiah et al. | |
| 10,778,707 B1* | 9/2020 | Rastogi | H04L 63/1425 |
| 2002/0038346 A1 | 3/2002 | Morrison et al. | |
| 2003/0046031 A1* | 3/2003 | Conrad | H04L 43/16 702/188 |
| 2003/0061195 A1* | 3/2003 | Laborde | G06F 16/252 |
| 2003/0105811 A1* | 6/2003 | Laborde | G06F 16/24552 709/203 |
| 2003/0154192 A1 | 8/2003 | Laborde et al. | |
| 2003/0195865 A1 | 10/2003 | Long et al. | |
| 2004/0010567 A1 | 1/2004 | Moyer et al. | |
| 2004/0044680 A1 | 3/2004 | Thorpe et al. | |
| 2004/0249824 A1 | 12/2004 | Brockway et al. | |
| 2005/0083851 A1* | 4/2005 | Fotsch | G06Q 10/107 370/252 |
| 2005/0123268 A1 | 6/2005 | Kawaguchi et al. | |
| 2006/0036720 A1 | 2/2006 | Faulk | |
| 2006/0059117 A1 | 3/2006 | Tolson et al. | |
| 2006/0095458 A1* | 5/2006 | Siu | G06F 21/10 |
| 2006/0106971 A1 | 5/2006 | Mahar et al. | |
| 2006/0161912 A1* | 7/2006 | Barrs | G06F 13/102 717/170 |
| 2006/0212730 A1* | 9/2006 | Senda | G06F 1/32 713/300 |
| 2006/0218538 A1 | 9/2006 | Van | |
| 2006/0274762 A1* | 12/2006 | Pong | H04L 69/16 370/400 |
| 2007/0038591 A1 | 2/2007 | Haub et al. | |
| 2008/0215546 A1 | 9/2008 | Baum et al. | |
| 2008/0222089 A1 | 9/2008 | Stewart et al. | |
| 2008/0301135 A1 | 12/2008 | Alves et al. | |
| 2009/0292877 A1 | 11/2009 | Piper et al. | |
| 2010/0010937 A1 | 1/2010 | Rosenthal | |
| 2010/0157822 A1 | 6/2010 | Ivanov et al. | |
| 2010/0299338 A1 | 11/2010 | Aarni et al. | |
| 2011/0060876 A1* | 3/2011 | Liu | G06F 12/1018 711/108 |
| 2011/0247071 A1* | 10/2011 | Hooks | G06F 21/567 726/24 |
| 2011/0288692 A1 | 11/2011 | Scott | |
| 2011/0289157 A1 | 11/2011 | Pirnazar | |
| 2011/0313844 A1 | 12/2011 | Chandramouli et al. | |
| 2012/0076022 A1* | 3/2012 | Shibata | H04L 43/0817 370/252 |
| 2012/0254199 A1* | 10/2012 | Kuno | G06F 7/32 707/752 |
| 2012/0254414 A1 | 10/2012 | Scarpelli | |
| 2013/0024339 A1* | 1/2013 | Choudhuri | G06Q 30/0185 705/35 |
| 2013/0073821 A1 | 3/2013 | Flynn et al. | |
| 2013/0158917 A1 | 6/2013 | Uchida | |
| 2013/0238791 A1 | 9/2013 | Anderson et al. | |
| 2013/0266014 A1* | 10/2013 | Blomquist | H04L 45/7453 370/392 |
| 2013/0338453 A1 | 12/2013 | Duke et al. | |
| 2014/0285177 A1 | 9/2014 | Kim et al. | |
| 2014/0310483 A1 | 10/2014 | Bennett | |
| 2014/0324862 A1 | 10/2014 | Bingham et al. | |
| 2015/0177315 A1 | 6/2015 | Lim et al. | |
| 2015/0213631 A1 | 7/2015 | Vander Broek | |
| 2015/0293954 A1 | 10/2015 | Hsiao et al. | |
| 2015/0295778 A1 | 10/2015 | Hsiao et al. | |
| 2015/0295779 A1 | 10/2015 | Ching et al. | |
| 2015/0319069 A1* | 11/2015 | He | H04L 43/026 709/224 |
| 2015/0324439 A1 | 11/2015 | Bhave et al. | |
| 2015/0358391 A1 | 12/2015 | Moon et al. | |
| 2016/0006708 A1* | 1/2016 | Sawafuji | H04L 63/0471 713/190 |
| 2016/0105338 A1 | 4/2016 | Fletcher et al. | |
| 2016/0179870 A1 | 6/2016 | Johnson | |
| 2016/0224632 A1 | 8/2016 | Lu et al. | |
| 2016/0299982 A1 | 10/2016 | Bhave et al. | |
| 2016/0366036 A1 | 12/2016 | Gupta et al. | |
| 2017/0017672 A1 | 1/2017 | Fan et al. | |
| 2017/0031988 A1* | 2/2017 | Sun | G06F 16/24554 |
| 2017/0070521 A1* | 3/2017 | Bailey | G06F 21/602 |
| 2017/0090814 A1* | 3/2017 | Yeung | G06F 3/0638 |
| 2017/0093985 A1* | 3/2017 | Kouno | H04L 41/082 |
| 2017/0103103 A1 | 4/2017 | Nixon et al. | |
| 2017/0168656 A1 | 6/2017 | Teachman et al. | |
| 2017/0176292 A1 | 6/2017 | Gouby et al. | |
| 2017/0228460 A1 | 8/2017 | Amel et al. | |
| 2017/0279828 A1* | 9/2017 | Savalle | H04L 41/142 |
| 2017/0339029 A1 | 11/2017 | Bingham et al. | |
| 2018/0011852 A1* | 1/2018 | Bennett | G06F 16/2228 |
| 2018/0089272 A1 | 3/2018 | Bath et al. | |
| 2018/0089286 A1 | 3/2018 | Marquardt et al. | |
| 2018/0089287 A1 | 3/2018 | Haggie et al. | |
| 2018/0089288 A1 | 3/2018 | Haggie et al. | |

(56) References Cited

U.S. PATENT DOCUMENTS

| | | | |
|---|---|---|---|
| 2018/0089289 A1 | 3/2018 | Zhang et al. |
| 2018/0089290 A1 | 3/2018 | Haggie et al. |
| 2018/0089328 A1 | 3/2018 | Bath et al. |
| 2019/0095478 A1 | 3/2019 | Tankersley et al. |
| 2019/0163678 A1 | 5/2019 | Bath et al. |
| 2019/0236149 A1 | 8/2019 | Kuruvada et al. |

OTHER PUBLICATIONS

Non-Final Office Action dated Apr. 19, 2019 for U.S. Appl. No. 15/339,863 of Marquardt et al., filed Oct. 31, 2016.
Non-Final Office Action dated May 2, 2019 for U.S. Appl. No. 15/339,899 of Haggie et al., filed Oct. 31, 2016.
"Data Intake Solution", Oracle Insurance Group Policy Administration, version 10.0.0.0, part No. E40981_01, Oct. 2013, 31 pages.
Non-Final Office Action dated May 16, 2019 for U.S. Appl. No. 15/339,886 of Haggie et al., filed Oct. 31, 2016.
Carasso, David, "Exploring Splunk—Search Processing Lanaguage (SPL) Primer And Cookbook", Apr. 2012, Apr. 2012, 156 Pages.
Final Office Action dated Sep. 19, 2019 for U.S. Appl. No. 15/339,863 of Marquardt et al., filed Oct. 31, 2016.
Final Office Action dated Sep. 6, 2019 for U.S. Appl. No. 15/339,886 of Bath et al., filed Oct. 31, 2016.
Non-Final Office Action dated Aug. 16, 2019 for U.S. Appl. No. 15/339,909 of Zhang et al., filed Oct. 31, 2016.
Non-Final Office Action dated Aug. 22, 2019 for U.S. Appl. No. 15/339,912 to Haggie et al., filed Oct. 31, 2016.
Non-Final Office Action dated May 16, 2019 for U.S. Appl. No. 15/339,886 of Bath et al., filed Oct. 31, 2016.
Non-Final Office Action dated May 16, 2019 for U.S. Appl. No. 15/339,894 of Haggie et al., filed Oct. 31, 2016.
Non-Final Office Action dated May 23, 2019 for U.S. Appl. No. 15/339,889 of Bath et al., filed Oct. 31, 2016.
"What is Splunk and How Does it Work?", Helge Klein; retrieved online from url: https://helgeklein.com/blog/2014/09/splunk-work/, Sep. 3, 2014, 11 pages.
Diaz, Sam , "Splunk goes real-time, eliminates latency from IT data search", ZDNet; retrieved online from url: https://www.zdnet.com/article/splunk-goes-real-time-eliminates-latency-from-it-data-search/, Apr. 5, 2010, 3 pages.
Final Office Action dated Dec. 23, 2019 for U.S. Appl. No. 15/339,912 of Haggie et al., filed Oct. 31, 2016.
Final Office Action dated Dec. 26, 2019 for U.S. Appl. No. 15/339,909 of Zhang et al., filed Oct. 31, 2016.
Notice of Allowance dated Dec. 20, 2019 for U.S. Appl. No. 15/339,886 of Bath et al., filed Oct. 31, 2016.
Final Office Action dated Nov. 5, 2019 for U.S. Appl. No. 15/339,889 for Bath et al., filed Oct. 31, 2016.
Final Office Action dated Nov. 29, 2019 for U.S. Appl. No. 15/339,899 of Haggie et al., filed Oct. 31, 2016.
Notice of Allowance dated Nov. 14, 2019 for U.S. Appl. No. 15/339,894 for Haggie et al., filed Oct. 31, 2016.
Notice of Allowance dated Dec. 12, 2019 for U.S. Appl. No. 15/339,863 of Marquardt et al., filed Oct. 31, 2016.
Roth, Heinz et al., "Event Data Warehousing for Complex Event Processing", 2010 Fourth International Conference on Research Challenges in Information Science (RCIS); May 19-21, 2010, Nice, France, May 2010, 10 pages.
Advisory Action dated Feb. 21, 2020 for U.S. Appl. No. 15/339,909 of Zhang et al., filed Oct. 31, 2016.
Advisory Action dated Jan. 21, 2020 for U.S. Appl. No. 15/339,889 of Bath et al., filed Oct. 31, 2016.
Advisory Action dated Mar. 5, 2020 for U.S. Appl. No. 15/339,899 of Haggie et al., filed Oct. 31, 2016.
Advisory Action dated Feb. 20, 2020 for U.S. Appl. No. 15/339,912 of Haggie et al., filed Oct. 31, 2016.
Notice of Allowance dated Feb. 25, 2020 for U.S. Appl. No. 15/339,889 of Bath et al., filed Oct. 31, 2016.
U.S. Appl. No. 16/777,592 of Marquardt et al., filed Jan. 30, 2020.
U.S. Appl. No. 16/803,944 of Haggie et al., filed Feb. 27, 2020.

* cited by examiner

EVENT 1

TIMESTAMP 1

RAW DATA 1

FIELD

XXXXXXXXX XXXXXXXXXXXXXXXX; XXXXXXXXX X XXXX
XXXXXXXXX XXXXXXXXXXX XXXXXXXXXXXXXXXX
XXXXXXXXXXXXXXX XXXXXXXXXXXXXXXXX XXXXX XXXXX
XXXXXXXXXXXXXXX XXX XXXXXXXXXXXXX

EVENT 2

TIMESTAMP 2

RAW DATA 2

FIELD

XXXXXXXXX XXXXXXXXXXXXXXXX; XXXXXXXXX X XXXX
XXXXXXXXX XXXXXXXXXXX XXXXXXXXXXXXXXXX
XXXXXXXXXXXXXXX XXXXXXXXXXXXXXXXX XXXXX XXXXX
XXXXXXXXXXXXXXX XXX XXXXXXXXXXXXX

.
.
.

EVENT K

TIMESTAMP K

RAW DATA K

FIELD

XXXXXXXXX XXXXXXXXXXXXXXXX; XXXXXXXXX X XXXX
XXXXXXXXX XXXXXXXXXXX XXXXXXXXXXXXXXXX
XXXXXXXXXXXXXXX XXXXXXXXXXXXXXXXX XXXXX XXXXX
XXXXXXXXXXXXXXX XXX XXXXXXXXXXXXX

Data Summary

| Hosts (5) | Sources (8) | Sourcetypes (3) | filter

| Host ≑ | | Count ≑ | Last Update ≑ |
|---|---|---|---|
| mailsv | ⊞ ∨ | 9,829 | 4/29/14 1:32:47.000 PM |
| vendor_sales | ⊞ ∨ | 30,244 | 4/29/14 1:32:46.000 PM |
| www1 | ⊞ ∨ | 24,221 | 4/29/14 1:32:44.000 PM |
| www2 | ⊞ ∨ | 22,595 | 4/29/14 1:32:47.000 PM |
| www3 | ⊞ ∨ | 22,975 | 4/29/14 1:32:45.000 PM |

| ☐ New Pivot | Save As... ∨ | Clear | Acceleration ∨ |
|---|---|---|---|

1,050,004 of 1,050,004 events matched

Filters
[All time] [+]

Split Rows
[≡ component ∅] [+]

Split Columns
[+]

Column Values
[≡ Count of Event O... ∅] [+]

⊞ □ ↧ ⌕ Documentation ↗

| component ⇅ | Count of Event Object ⇅ |
|---|---|
| BucketMover | 4 |
| DatabaseDirectoryManager | 4 |
| DateParserVerbose | 463 |
| IndexConfig | 1 |
| LicenceUsage | 1884 |
| Metrics | 45997 |
| WatchedFile | 8 |
| cached | 3 |
| utils | 1 |
| view | 4 |

20 per page ∨   Format ∨

*FIG. 9D*

INCIDENT REVIEW DASHBOARD 164

Incident Review | Actions ∨

Status:    Urgency:    Owner:    Title:

Security domain:    high    Governance: pci    Search:

INCIDENT ATTRIBUTES FIELDS 166

TIME RANGE FIELD 168

✓ 225 matching events

☒ Hide   ⊕ Zoom out   ⊖ Zoom to selection   [ ] Deselect 120
60

4:00 AM    6:00 AM    8:00 AM
Sun Aug 26 2012

24 hour window ∨
Last 15 minutes
Last 60 minutes
Last 4 hours
Last 24 hours
Last 7 days
Last 30 days
Last year
Real-time
Other
All time
Custom time i   🖫 Save ∨   Create ∨
Linear scale ∨   1 bar = 1 hour
TIMELINE 170   120
  60

225 events in a 24 hour window (real-time) (from 11:29:20 AM August 25 to 11:29:20 AM August 26, 2012) | Edit selected events | Edit all 225 matching events
Select all | Unselect all   prev [1] 2 3 4 5 6 7 8 9 10 next>

EVENTS LIST 172

| Select | Options | Time | Security Domain | Title | Urgency | Status | Owner | |
|---|---|---|---|---|---|---|---|---|
| ☐ | ▷ | 8/26/12 11:11:03.000 AM | Access ∨ | Insecure Or Cleartext Authentication Detected | ⓘ High ∨ | New ∨ | unassigned ∨ | view details |
| ☐ | ▷ | 8/26/12 11:10:07.000 AM | Access ∨ | Insecure Or Cleartext Authentication Detected | ⓘ High ∨ | New ∨ | unassigned ∨ | view details |
| ☐ | ▷ | 8/26/12 11:00:39.000 AM | Access ∨ | Account (blinebry) Deleted On (PROD-POS-001) | ⓘ High ∨ | New ∨ | unassigned ∨ | view details |
| ☐ | ▷ | 8/26/12 11:00:39.000 AM | Access ∨ | Account (beu) Deleted On (COREDEV-006) | ⓘ High ∨ | New ∨ | unassigned ∨ | view details |
| ☐ | ▷ | 8/26/12 11:00:39.000 AM | Access ∨ | Account (combs) Deleted On (HOST-005) | ⓘ High ∨ | New ∨ | unassigned ∨ | view details |
| ☐ | ▷ | 8/26/12 11:00:39.000 AM | Access ∨ | Account (wisner) Deleted On (BUSDEV-005) | ⓘ High ∨ | New ∨ | unassigned ∨ | view details |

*FIG. 11B*

New Pivot 1,775,004 of 1,775,004 events matched

Save As... ∨ | Clear | Acceleration ∨

Filters
All time

Split Rows
≡ component

Split Columns
≡ group

Column Values
≡ Count of Event O..

Documentation ⌐

— 140

| component ⬥ | NULL ⬥ | conf ⬥ | deploy_connections ⬥ | deploy_server ⬥ | map ⬥ | mpool ⬥ | per_host_thruput ⬥ | per_index_thruput ⬥ | per_source_thruput ⬥ | per_source_type_thruput ⬥ | pipeline ⬥ | queue ⬥ | realtime_search_data ⬥ |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenceUsage | 2872 | 0 | 0 | 0 | 0 | 0 | 0 | 0 | 0 | 0 | 0 | 0 | 0 |
| Metrics | 0 | 1 | 972 | 2916 | 972 | 972 | 4621 | 2843 | 9314 | 9306 | 18797 | 12636 | 972 |
| OneShotWriter | 12226 | 0 | 0 | 0 | 0 | 0 | 0 | 0 | 0 | 0 | 0 | 0 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

20 per page ∨  Format ∨

— 142

*FIG. 17* splunk>enterprise   Search & Reporting ∨                                Administrator ∨   ④ Messages ∨   Settings ∨   Activity ∨   Help ∨   Q Find

Metrics Catalog 274

Filter  276                                                                                                                                      Add Metric ∨

Metrics (476)   Dimensions (2312)   Hosts (3487)   Tags (322)
                        ▲ 278              ▲ 280              ▲ 282
                                    272

> activemq
> apache
> aws.dynamodb
> aws.ec2
> aws.ecs
> aws.elasticache
> cassandra
> couchdb
> docker
> elasticsearch
> express
> gae
∨ gcp.gce.project.quota
    > backend_services
    > firewalls
    > forwarding_rules
    > health_checks
    > images
    > in_use_addresses
    > instance_templates
    > networks
    > routes
    > snapshots
    > ssl_certificates
    > static_addresses
    > subnetworks
    > target_http_proxies
    > target_instance Select an item to view its details About   Support   File a Bug   Documentation   Privacy Policy                                                © 2005-2015 Splunk Inc. All rights reserved

270

*FIG. 29* splunk>enterprise     Administrator ∨   ④ Messages ∨   Settings ∨   Activity ∨   Help ∨   🔍 Find ⟵ 304

Add Data    ⟨   Next ⟩

Select source   Input Settings   Review   Done

Files & Directories 310-1
Upload a file, index a local file, or monitor an entire directory.

HTTP Event Collector 310-2
Configure tokens that clients can use to send data over HTTP or HTTPS.

TCP / UDP 310-3
Configure Splunk to listen on a network port.

Scripts 310-4
Get data from any API, service, or data base with a script.

Metrics -- Distributed Management Console Monitoring 310-5
Performance and licensing metrics collected to optimize your Splunk Deployment.

⟵ 308-1
CPU -- Dimensions process name, hostname, nostname, nostip, splunkcomponent (e.g., indexer, searchhead, indexclustermaster, licensemanager, etc.)

306-1 → ☑ dmc.cpu.usage
306-2 → ☑ dmc.cpu.hostidle

⟵ 308-2
Memory -- dimensions: processname, hostname, hostip, splunkcomponent (e.g., indexer, searchhead, indexclustermaster, licensemanager, etc.)

306-3 → ☑ dmc.mem.usage
306-4 → ☑ dmc.mem.hostfree

⟵ 308-3
KVStore 306-5 → ☑ dmc.kvstore.sizeofcollections
306-6 → ☑ dmc.kvstore.collections ⟵ 308-4
Others 306-7 → ☑ dmc.indexingrate
306-8 → ☑ dmc.license.usage
306-9 → ☑ dmc.disk.usage

*FIG. 32*

FIG. 33

HASH BUCKETING OF DATA

CROSS-REFERENCE OF RELATED APPLICATIONS

The present application claims benefit of U.S. Provisional Application No. 62/400,081, filed on Sep. 26, 2016, entitled "ANALYZING AND STORING METRICS DATA", which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to storing and querying metrics data, and, more particularly, to improving the capabilities of a data intake and query system to query the stored metrics data.

BACKGROUND

An information technology (IT) ecosystem typically includes infrastructures of various kinds of computing resources including computer systems, servers, storage systems, network communication devices, or any other electronic resource having characteristics that can be measured. Measuring the characteristics of the computing resources is vital to mitigating instabilities and detecting vulnerabilities. Examples of the characteristics include temperature, utilization, availability, etc. For example, measuring the health of a datacenter's infrastructure, services, service components, backend systems, and various types of application programming interfaces (APIs) is important to enable organizations to proactively monitor, diagnose, and analyze the infrastructure, application, and business metrics of the datacenter.

The performance metrics (e.g., metrics) are useful time-series measurements of computing resources for IT operations and application management. Metrics are used to analyze performance of one or more systems in a domain. Specifically, a metric represents a performance measurement of a computing resource. The metric includes a numerical value indicative of a characteristic of the computing resource measured at a point in time. The numerical value may also be referred to as the "measure" of the metric. In some cases, a metric can represent a data point of a time series of characteristic measurements taken of a computing resource. The numerical value may be a floating point value including any number of decimal values that reflects a precision of that measurement. In some embodiments, the number can be an integer value.

Metrics can be measured at short intervals for multiple applications and/or systems, resulting in large data sets. Metrics measurements can be at the root of everything deployed and managed in at least some known IT environments. From on-premises to cloud deployments, measurements of such metrics enable analysts to understand the availability, performance, and health of mission critical services delivered to end users. Such metrics measurements can provide insights into trends and facilitate a comparison of what is normal and what is not. Existing systems for processing and analyzing metrics data remain inadequate and fail to provide meaningful insights into the health of computing resources.

Metrics can also be helpful in assessing machine-generated data generated by various components in IT environments, such as servers, sensors, routers, mobile devices, Internet of Things (IoT) devices, etc., and for business analytics and security. Analyzing large volumes of machine-generated data has become imperative to obtaining critical insights of systems and their computing resources. However, existing systems for analyzing machine-generated data are incapable of providing insights that benefit from metrics data, which is processed independently by separate systems. As such, analyzing metrics data and/or machine-generated data of computing resources is often difficult, thereby creating a significant cognitive burden on analysts to determine meaningful insights about systems.

BRIEF DESCRIPTION OF THE DRAWINGS

One or more embodiments of the present disclosure are illustrated by way of example and not limitation in the figures of the accompanying drawings, in which like references indicate similar elements.

FIG. 2 is a block diagram illustrating a series of events including raw data according to some embodiments of the present disclosure;

FIG. 8A illustrates a search screen according to some embodiments of the present disclosure;

FIG. 8B illustrates a data summary dialog that enables a user to select various data sources according to some embodiments of the present disclosure;

FIG. 9A illustrates a user interface screen for an example data model-driven report generation interface according to some embodiments of the present disclosure;

FIG. 9D illustrates a user interface screen for an example data model-driven report generation interface according to some embodiments of the present disclosure;

FIG. 11B illustrates an incident review dashboard according to some embodiments of the present disclosure;

FIG. 17 illustrates example visualizations generated by a reporting application according to some embodiments of the present disclosure;

FIG. 29 illustrates a user interface screen of a metric catalog displaying a list of selectable metrics sources according to some embodiments of the present disclosure;

FIG. 32 illustrates a user interface screen of a data ingestion interface according to some embodiments of the present disclosure;

FIG. 33 illustrates a user interface screen for searching and selecting various types of data including metrics according to some embodiments of the present disclosure;

DETAILED DESCRIPTION

The ensuing description provides exemplary embodiments only and is not intended to limit the scope, applicability, or configuration of the disclosure. Rather, the ensuing description of the exemplary embodiments will provide those skilled in the art with an enabling description for implementing a preferred exemplary embodiment. It is understood that various changes can be made in the function and arrangement of elements without departing from the spirit and scope as set forth in the appended claims.

In this description, references to "an embodiment," "one embodiment," or the like mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

A data intake and query system can index and store data in data stores of indexers and can process search queries causing a search of the indexers to obtain search results. The data indexed and stored by the data intake and query system typically includes non-metrics data, such as raw machine-generated data (e.g., application logs). The raw data may include metrics data. In some cases, the data intake and query system can receive structured metrics data including, for example, a time series of metrics generated for a computing resource.

The metrics data and non-metrics data provide insights into the operations and performance of computing resources. In some cases, the insights obtained by analyzing metrics data may complement the insights obtained by analyzing non-metrics data. Moreover, the diverse nature of the metrics and non-metrics data can further enrich an analysis of computing resources to obtain useful insights into the operations and performance of computing resources. However, analyzing metrics and non-metrics data is often complex and requires using different technical tools, thereby creating a significant cognitive burden on analysts.

The disclosed embodiments overcome these drawbacks with a data intake and query system that can process metrics and non-metrics data to obtain useful and meaningful insights into the operations and performance of computing resources. The disclosed embodiments also include techniques that improve intake, storage, and querying of metrics data alone, separate from non-metrics data. As such, the disclosed embodiments reduce the cognitive burden on analysts to obtain useful insights of a computing system based on metrics data alone, or in combination with non-metrics data.

Figure 1:
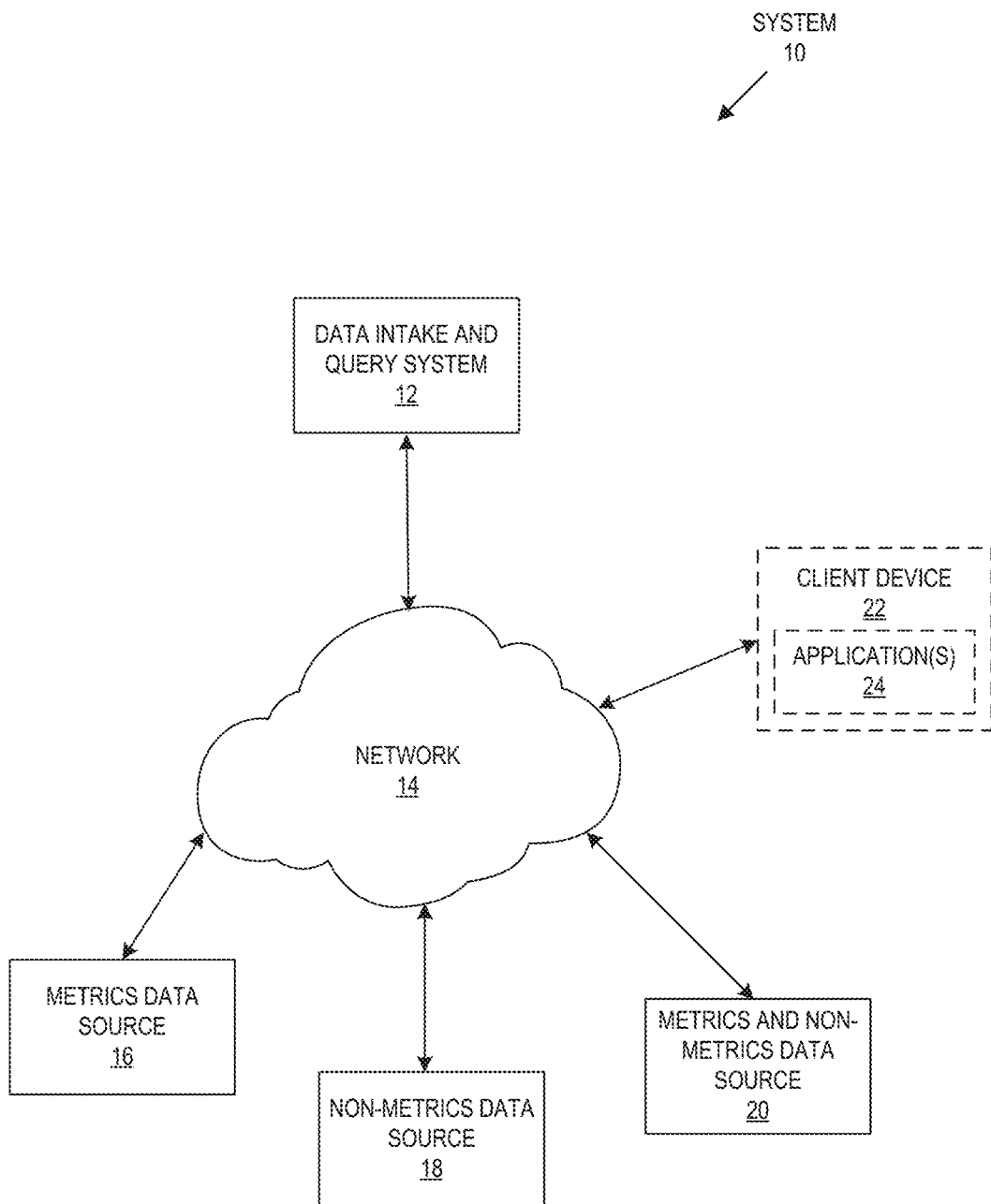
FIG. 1 is a high-level system diagram in which an embodiment may be implemented.

FIG. 1 is a high-level system diagram in which an embodiment may be implemented. The system 10 includes data intake and query system 12 interconnected to various components over a network 14. The components include a source 16 of metrics data, another source 18 of non-metrics data, and another source 20 of both metrics and non-metrics data. The sources 16, 18, and/or 20 ("the sources") include computing resources that can generate data (e.g., log data) or are the basis from which data can be generated (e.g., measured performance). The data from these sources can be transferred to the data intake and query system 12 over the network 14.

The metrics data may include unstructured raw data, semi-structured data, or structured data. "Structured data" may refer to information with a high degree of organization, such that inclusion in a relational database is seamless and readily searchable by simple, straightforward search engine algorithms or other search operations. "Semi-structured data" may refer to a form of structured data that does not conform with the formal structure of data models typically associated with relational databases or other forms of data tables, but nonetheless contains tags or other markers to separate semantic elements and enforce hierarchies of records and fields within the data. Lastly, "unstructured data" may refer to information that either does not have a pre-defined data model or is not organized in a pre-defined manner.

The non-metrics data may include raw machine data. The system 10 can also include a client device 22 running one or more client applications 24. The client device 22 may access the data intake and query system 12 or any other components of the system 10. For example, the client device may include a user interface (UI) rendered on a display device that provides an interactive platform to access and control components of the system 10 over the network 14.

The volume of data generated or collected of the sources can grow at very high rates as the number of transactions and diverse computing resources grows. A portion of this large volume of data could be processed and stored by the data intake and query system 12 while other portions could be stored in any of the sources. In an effort to reduce the vast amounts of data generated in this data ecosystem, some systems (e.g., the sources) may pre-process the raw data based on anticipated data analysis needs, store the pre-processed data, and discard any remaining raw data. However, discarding massive amounts of raw data can result in the loss of valuable insights that could have been obtained by searching all of the raw data.

In contrast, the data intake and query system 12 can address some of these challenges by collecting and storing raw data as structured "events." FIG. 2 is a block diagram illustrating a series of events, including raw data, according to some embodiments of the present disclosure. An event includes a portion of raw data and is associated with a specific point in time. For example, events may be derived from "time series data," where the time series data comprises a sequence of data points (e.g., performance measurements from a computer system) that are associated with successive points in time.

As shown, each event 1 through K can be associated with a timestamp 1 through K that can be derived from the raw data in the respective event, determined through interpolation between temporally proximate events having known timestamps, or determined based on other configurable rules for associating timestamps with events. During operation of the data intake and query system 12, ingested raw data is divided into segments of raw data delineated by time segments (e.g., blocks of raw data, each associated with a specific time frame). The segments of raw data are indexed as timestamped events, corresponding to their respective time segments as shown in FIG. 2. The system stores the timestamped events in a data store.

In some instances, data systems can store raw data in a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. As shown in FIG. 2, each event 1 through K includes a field that is nine characters in length beginning after a semicolon on a first line of the raw data, for example. In certain embodiments, these fields can be queried to extract their contents.

In some embodiments, systems can store raw data as events that are indexed by timestamps but are also associated with predetermined data items. This structure is essentially a modification of database systems that require pre-determining data items for subsequent searches. These systems can be modified to retain the remaining raw data for subsequent re-processing for other predetermined data items.

Specifically, the raw data can be divided into segments and indexed by timestamps. The predetermined data items can be associated with the events indexed by timestamps. The events can be searched only for the predetermined data items during search time; the events can be re-processed later in time to re-index the raw data, and generate events with new predetermined data items. As such, the data systems of the system 10 can store related data in a variety of pre-processed data and raw data in a variety of structures.

In some cases, the sources can generate, process, and/or store semi-structured or structured metrics data. The metrics data includes at least one metric, which includes at least one or only one numerical value that represents a performance measurement of a characteristic of a computing resource. The data intake and query system can obtain the metrics data from the sources over the network 14 via a variety of mechanism, which are described in greater detail below. However, existing data intake and query systems that can handle metrics data and non-metrics data underperform systems that only handle one type of data. This is caused, in part, because metrics data is uniquely different from other types of data. Additionally, the processes for handling non-metric data can be incompatible with processes for handing metrics data.

For example, each metric includes at least one or possibly only one numerical value that represents the metric's measure. Each numerical value can be a highly precise floating point number. Hence, the cardinality of metrics data is exceedingly large compared to other types of data. That is, each metric tends to have a uniquely different measure compared to other metrics, except for the possible repeating value of zero. As such, existing systems that are designed to efficiently handle non-metrics data cannot efficiently handle metrics data the same way, which causes the overall processing of metrics to be less efficient compared to systems that process only metrics data. However, using independent systems to process and analyze metrics and non-metrics data fails to exploit relationships between these types of data to obtain new, useful, and meaning insights into the operations and performance of systems.

A number of tools are available to separately process, store, search, and analyze metrics data and non-metrics data from diverse systems. As such, an analyst can use a first tool to process metrics data from the source 16 and a second tool to process the non-metrics data from the source 18. The analyst then has the choice of using different tools to process the metrics data and non-metrics data separately and to manually derive correlations between the metrics and non-metrics data, or to use a single underperforming tool to process both metrics data and non-metrics data; however, the analyst is still required to manually derive correlations between the metrics and non-metrics types of data. Thus, existing tools cannot obtain valuable insights from diverse types of metric data alone, or combinations of diverse types of metrics data and non-metrics data. Examples of these valuable insights may include correlations between metrics data and non-metrics data. The disclosed embodiments overcome at least these drawbacks.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time, it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.) and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values or for a group of common field values (e.g., CPU metric from different sources Amazon Web Services, Google Cloud Platform, Linux OS) in the events, when the events are being created, indexed, or stored, or possibly at a later time. Alternatively, a user may manually define extraction rules for fields or a group of fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learning valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 7).

2.0. Operating Environment

Figure 3:
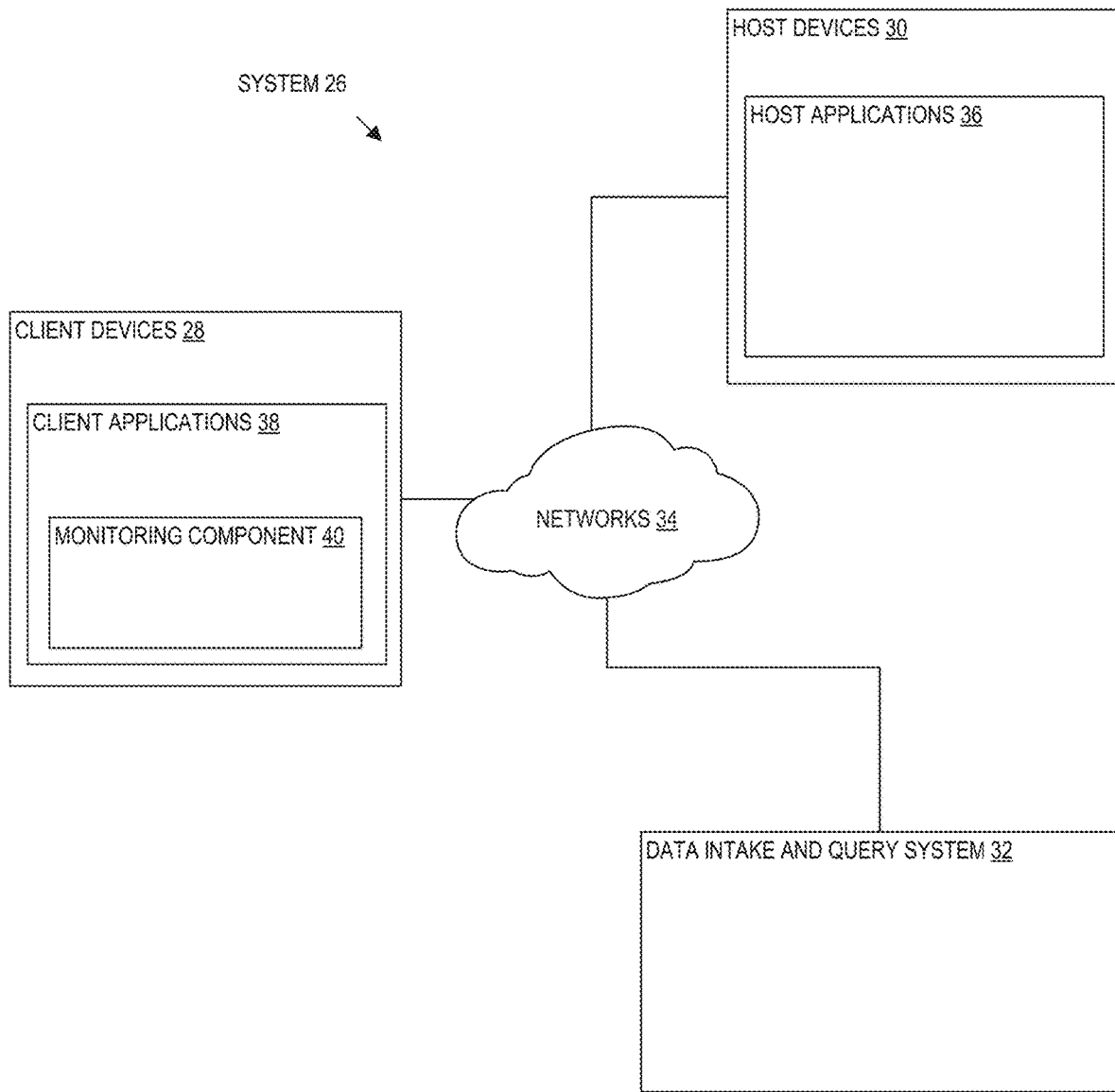
FIG. 3 illustrates a networked computer environment in which an embodiment may be implemented.

FIG. 3 illustrates a networked computer system 26 in which an embodiment may be implemented. Those skilled in the art would understand that FIG. 3 represents one example of a networked computer system and other embodiments may use different arrangements.

The networked computer system 26 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 28 are coupled to one or more host devices 30 and a data intake and query system 32 (also referred to as "system 32") via one or more networks 34. In some embodiments, the data intake and query system 32 is similar or the same as the data intake and query system 12 of FIG. 1. Networks 34 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 26 includes one or more host devices 30. Host devices 30 may broadly include any number of computers, virtual machine instances, and/or data centers that are configured to host or execute one or more instances of host applications 36. In general, a host device 30 may be involved, directly or indirectly, in processing requests received from client devices 28. Each host device 30 may comprise, for example, one or more of a network device, a web server, an application server, a database server, etc. A collection of host devices 30 may be configured to implement a network-based service. For example, a provider of a network-based service may configure one or more host devices 30 and host applications 36 (e.g., one or more web servers, application servers, database servers, etc.) to collectively implement the network-based application.

In general, client devices 28 communicate with one or more host applications 36 to exchange information. The communication between a client device 28 and a host application 36 may, for example, be based on the Hypertext Transfer Protocol (HTTP) or any other network protocol. Content delivered from the host application 36 to a client device 28 may include, for example, HTML documents, media content, etc. The communication between a client device 28 and host application 36 may include sending various requests and receiving data packets. For example, in general, a client device 28 or application running on a client device may initiate communication with a host application 38 by making a request for a specific resource (e.g., based on an HTTP request), and the application server may respond with the requested content stored in one or more response packets.

In the illustrated embodiment, one or more of host applications 38 may generate various types of performance data during operation, including event logs, network data, sensor data, and other types of machine-generated data. For example, a host application 38 comprising a web server may generate one or more web server logs in which details of interactions between the web server and any number of client devices 28 is recorded. As another example, a host device 30 comprising a router may generate one or more router logs that record information related to network traffic managed by the router. As yet another example, a host application 38 comprising a database server may generate one or more logs that record information related to requests sent from other host applications 38 (e.g., web servers or application servers) for data managed by the database server.

2.2. Client Devices

Client devices 28 of FIG. 3 represent any computing device capable of interacting with one or more host devices 30 via a network (connected or wireless) 34. Examples of client devices 28 may include, without limitation, smart phones, tablet computers, handheld computers, wearable devices, laptop computers, desktop computers, servers, portable media players, gaming devices, and so forth. In general, a client device 28 can provide access to different content, for instance, content provided by one or more host devices 30, etc. Each client device 28 may comprise one or more client applications 38, described in more detail in a separate section hereinafter.

2.3. Client Device Applications

In an embodiment, each client device 28 may host or execute one or more client applications 38 that are capable of interacting with one or more host devices 30 via one or more networks 34. For instance, a client application 38 may be or comprise a web browser that a user may use to navigate to one or more websites or other resources provided by one or more host devices 30. As another example, a client application 38 may comprise a mobile application or "app." For example, an operator of a network-based service hosted by one or more host devices 30 may make available one or more mobile apps that enable users of client devices 28 to access various resources of the network-based service. As yet another example, client applications 38 may include background processes that perform various operations without direct interaction from a user. A client application 38 may include a "plug-in" or "extension" to another application, such as a web browser plug-in or extension.

In an embodiment, a client application 38 may include a monitoring component 40. At a high level, the monitoring component 40 comprises a software component or other logic that facilitates generating performance data related to a client device's operating state, including monitoring network traffic sent and received from the client device and collecting other device and/or application-specific information. Monitoring component 40 may be an integrated component of a client application 38, a plug-in, an extension, or any other type of add-on component. Monitoring component 40 may also be a stand-alone process.

In one embodiment, a monitoring component 40 may be created when a client application 38 is developed, for example, by an application developer using a software development kit (SDK). The SDK may include custom monitoring code that can be incorporated into the code implementing a client application 38. When the code is converted to an executable application, the custom code implementing the monitoring functionality can become part of the application itself.

In some cases, an SDK or other code for implementing the monitoring functionality may be offered by a provider of a data intake and query system, such as a system 32. In such cases, the provider of the system 32 can implement the custom code so that performance data generated by the monitoring functionality is sent to the system 32 to facilitate analysis of the performance data by a developer of the client application or other users.

In an embodiment, the custom monitoring code may be incorporated into the code of a client application 38 in a number of different ways, such as the insertion of one or more lines in the client application code that call or otherwise invoke the monitoring component 40. As such, a developer of a client application 38 can add one or more lines of code into the client application 38 to trigger the monitoring component 40 at desired points during execution of the application. Code that triggers the monitoring component may be referred to as a monitor trigger. For instance, a monitor trigger may be included at or near the beginning of the executable code of the client application 38 such that the monitoring component 40 is initiated or triggered as the application is launched, or included at other points in the code that correspond to various actions of the client application, such as sending a network request or displaying a particular interface.

In an embodiment, the monitoring component 40 may monitor one or more aspects of network traffic sent and/or received by a client application 38. For example, the monitoring component 40 may be configured to monitor data packets transmitted to and/or from one or more host applications 36. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 38 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 32 for analysis.

Upon developing a client application 38 that incorporates a monitoring component 40, the client application 38 can be distributed to client devices 28. Applications generally can be distributed to client devices 28 in any manner, or they can be pre-loaded. In some cases, the application may be distributed to a client device 28 via an application marketplace or other application distribution system. For instance, an application marketplace or other application distribution system might distribute the application to a client device based on a request from the client device to download the application.

Examples of functionality that enable monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 40 may also monitor and collect performance data related to one or more aspects of the operational state of a client application 38 and/or client device 28. For example, a monitoring component 40 may be configured to collect device performance information by monitoring one or more client device operations, or by making calls to an operating system and/or one or more other applications executing on a client device 28 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 40 may also monitor and collect other device profile information including, for example, a type of client device, a manufacturer and model of the device, versions of various software applications installed on the device, and so forth.

In general, a monitoring component 40 may be configured to generate performance data in response to a monitor trigger in the code of a client application 38 or other triggering application event, as described above, and to store the performance data in one or more data records. Each data record, for example, may include a collection of field-value pairs, each field-value pair storing a particular item of performance data in association with a field for the item. For example, a data record generated by a monitoring component 40 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 4:
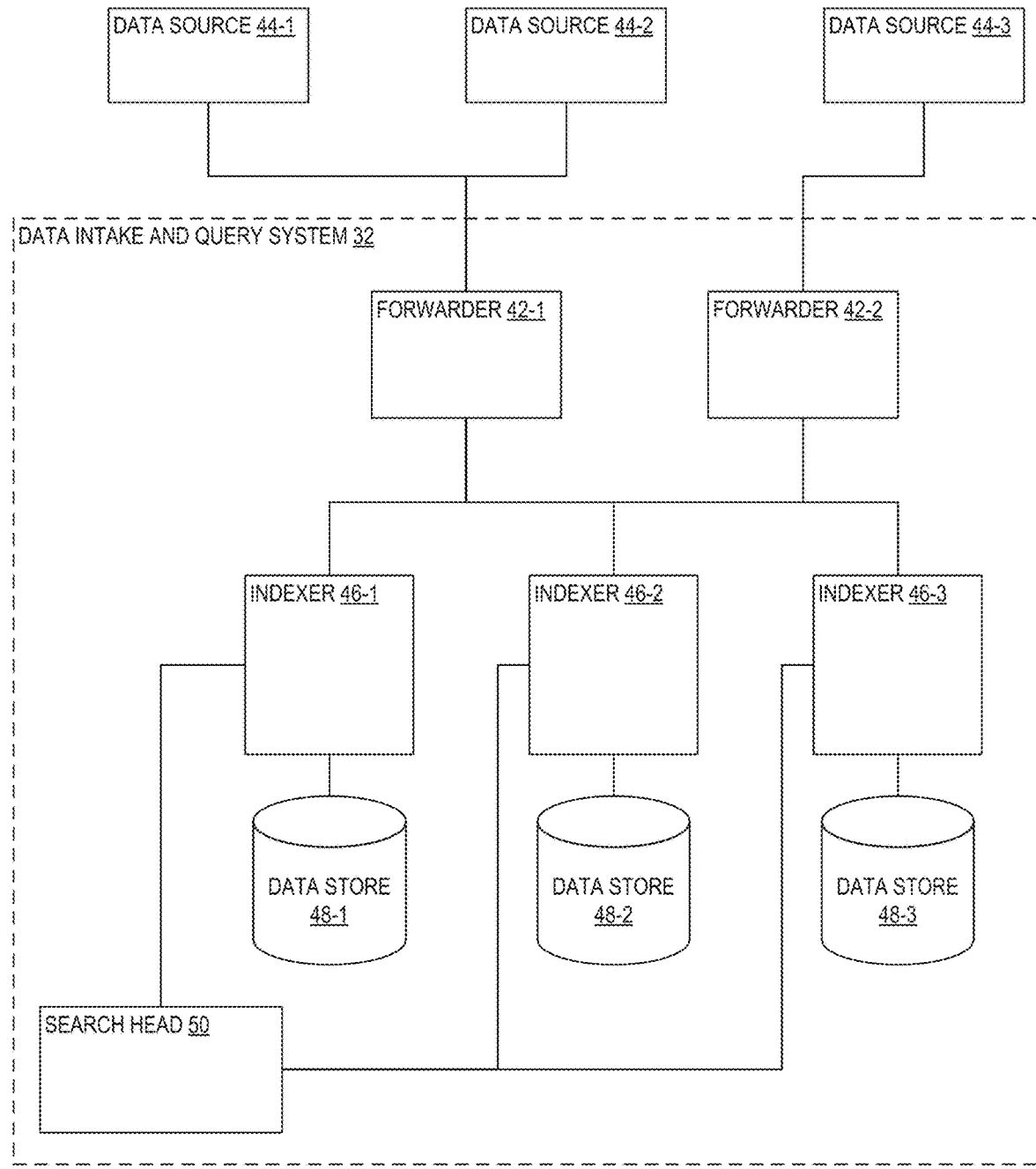
FIG. 4 illustrates a block diagram of an example data intake and query system in which an embodiment may be implemented.

FIG. 4 depicts a block diagram of an exemplary data intake and query system 32, similar to the SPLUNK® ENTERPRISE system. System 32 includes one or more forwarders 42 that receive data from a variety of input data sources 44, and one or more indexers 46 that process and store the data in one or more data stores 48. These forwarders and indexers can comprise separate computer systems, or may alternatively comprise separate processes executing on one or more computer systems.

Each data source 44 broadly represents a distinct source of data that can be consumed by a system 32. Examples of a data source 44 include, without limitation, data files, directories of files, data sent over a network, event logs, registries, etc.

During operation, the forwarders 42 identify which indexers 46 receive data collected from a data source 44 and forward the data to the appropriate indexers. Forwarders 42 can also perform operations on the data before forwarding, including removing extraneous data, detecting timestamps in the data, parsing data, indexing data, routing data based on criteria relating to the data being routed, and/or performing other data transformations.

In an embodiment, a forwarder 42 may comprise a service accessible to client devices 28 and host devices 30 via a network 34. For example, one type of forwarder 42 may be capable of consuming vast amounts of real-time data from a potentially large number of client devices 28 and/or host devices 30. The forwarder 42 may, for example, comprise a computing device which implements multiple data pipelines or "queues" to handle forwarding of network data to indexers 46. A forwarder 42 may also perform many of the functions that are performed by an indexer. For example, a forwarder 42 may perform keyword extractions on raw data or parse raw data to create events. A forwarder 42 may generate time stamps for events. Additionally or alternatively, a forwarder 42 may perform routing of events to indexers. Data store 48 may contain events derived from machine data from a variety of sources all pertaining to the same component in an IT environment, and this data may be produced by the machine in question or by other components in the IT environment.

2.5. Data Ingestion

Figure 5:
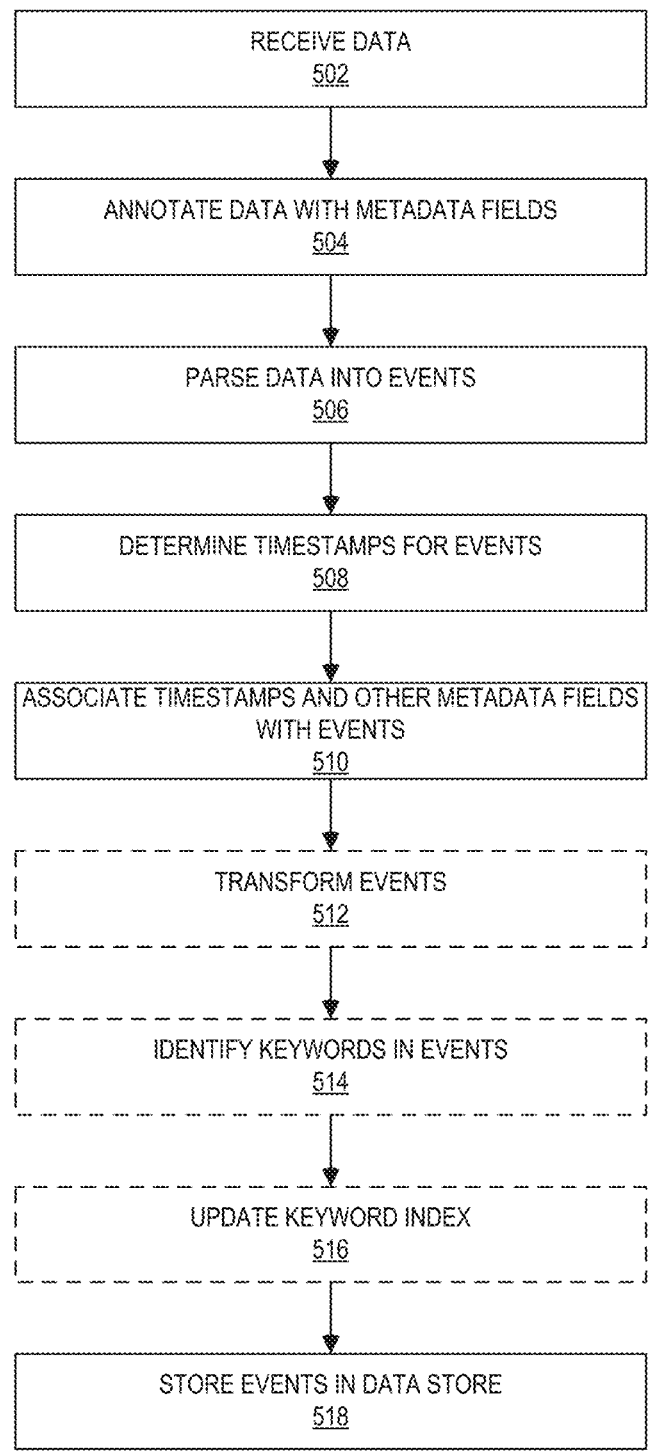
FIG. 5 is a flow diagram illustrating how indexers process, index, and store data received from forwarders according to some embodiments of the present disclosure.

FIG. 5 depicts a flow chart illustrating an example data flow performed by data intake and query system 32, in accordance with the disclosed embodiments. The data flow illustrated in FIG. 5 is provided for illustrative purposes only; those skilled in the art would understand that one or more of the steps of the processes illustrated in FIG. 5 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At step 502, a forwarder receives data from an input source, such as a data source 44 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At step 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At step 506, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At step 508, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or to use any other rules for determining timestamps.

At step 510, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at step 504, the default metadata fields associated with each event may include a host, source, and source type field including or in addition to a field storing the timestamp.

At step 512, an indexer may optionally apply one or more transformations to data included in the events created at step 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At steps 514 and 516, an indexer can optionally generate a keyword index to facilitate fast keyword searching for event data. To build a keyword index, at step 514, the indexer identifies a set of keywords in each event. At step 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At step 518, the indexer stores the events with an associated timestamp in a data store 48. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 46 may be responsible for storing and searching a subset of the events contained in a corresponding data store 48. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 6:
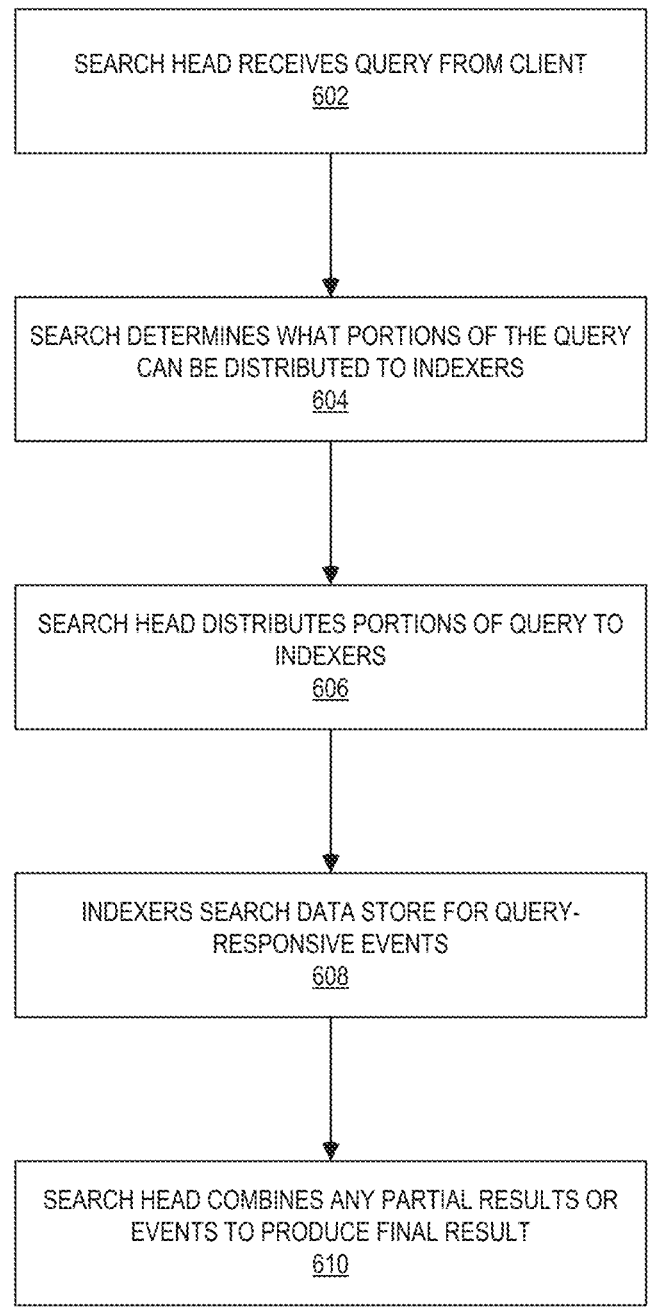
FIG. 6 is a flow diagram illustrating how a search head and indexers perform a search query according to some embodiments of the present disclosure.

FIG. 6 is a flow diagram that illustrates an exemplary process that a search head and one or more indexers may perform during a search query. At step 602, a search head receives a search query from a client. At step 604, the search head analyzes the search query to determine what portion(s) of the query can be delegated to indexers and what portions of the query can be executed locally by the search head. At step 606, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At step 608, the indexers to which the query was distributed search data stores associated with them for events and/or aspects of events (such as performance metrics derived from the events, dimensions of the performance metrics, logs, etc.) that are responsive to the query. To determine which events (or aspects of an event) are responsive to the query, the indexer searches for machine data that match the criteria specified in the query. These criteria can include matching keywords or specific values for certain fields. The searching operations at step 608 may use the late-binding schema to extract values for specified fields from events at the time the query is processed. In an embodiment, one or more rules for extracting field values may be specified as part of a source type definition. The indexers may then either send the relevant results back to the search head, or use the results to determine a partial result and send the partial result back to the search head.

At step 610, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 32 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready and then returns the complete set of results to the client. In another technique, certain results are stored as "search jobs," and the client may retrieve the results by referring to the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 50 allows users to search and visualize event data extracted from raw machine data received from homogenous data sources. It also allows users to search and visualize event data extracted from raw machine data received from heterogeneous data sources. The search head 50 includes various mechanisms, which may additionally reside in an indexer 46, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on, for additional commands. Other query languages, such as the Structured Query Language ("SQL"), can be used to create a query.

In response to receiving the search query, search head 50 uses extraction rules to extract values for the fields associated with a field or fields in the event data being searched. The search head 50 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 50 can apply the extraction rules to event data that it receives from indexers 46. Indexers 46 may apply the extraction rules to events in an associated data store 48. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 7:
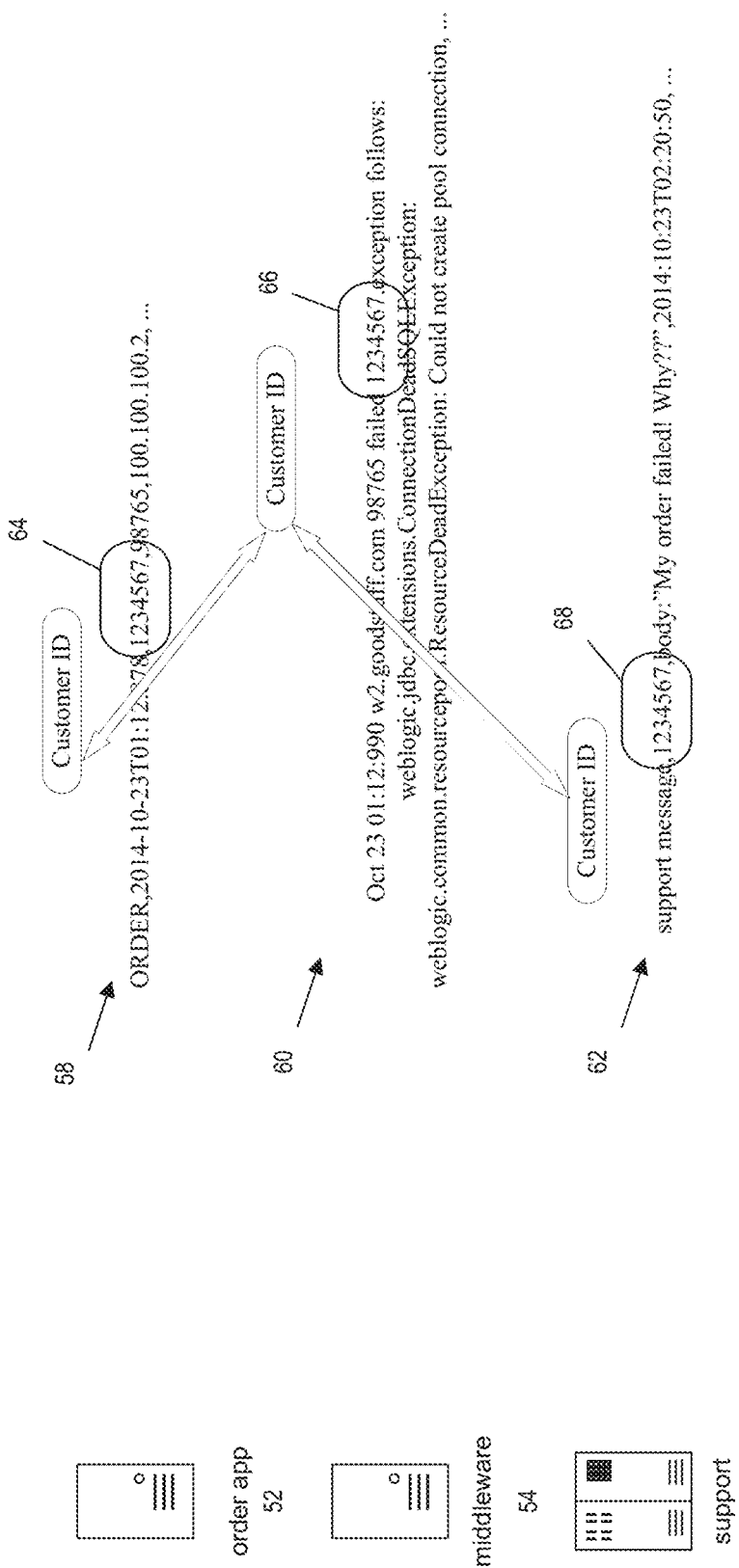
FIG. 7 illustrates a scenario where a common customer ID is found among log data received from three disparate sources according to some embodiments of the present disclosure.

FIG. 7 illustrates an example of raw machine data received from disparate data sources. In this example, a user submits an order for merchandise using a vendor's shopping application program 52 running on the user's system. In this example, the order was not delivered to the vendor's server due to a resource exception at the destination server that is detected by the middleware code 54. The user then sends a message to the customer support 56 to complain about the order failing to complete. The three systems 52, 54, and 56 are disparate systems that do not have a common logging format. The order application 52 sends log data 58 to the SPLUNK® ENTERPRISE system in one format, the middleware code 54 sends error log data 60 in a second format, and the support server 56 sends log data 62 in a third format.

Using the log data received at one or more indexers 46 from the three systems the vendor can uniquely obtain an insight into user activity, user experience, and system behavior. The search head 50 allows the vendor's administrator to search the log data from the three systems that one or more indexers 46 are responsible for searching, thereby obtaining correlated information, such as the order number and corresponding customer ID number of the person placing the order. The system also allows the administrator to see a visualization of related events via a user interface. The administrator can query the search head 50 for customer ID field value matches across the log data from the three systems that are stored at the one or more indexers 46. The customer ID field value exists in the data gathered from the three systems, but the customer ID field value may be located in different areas of the data given differences in the architecture of the systems—there is a semantic relationship between the customer ID field values generated by the three systems. The search head 50 requests event data from the one or more indexers 46 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 64, 66, and 68, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 8A:
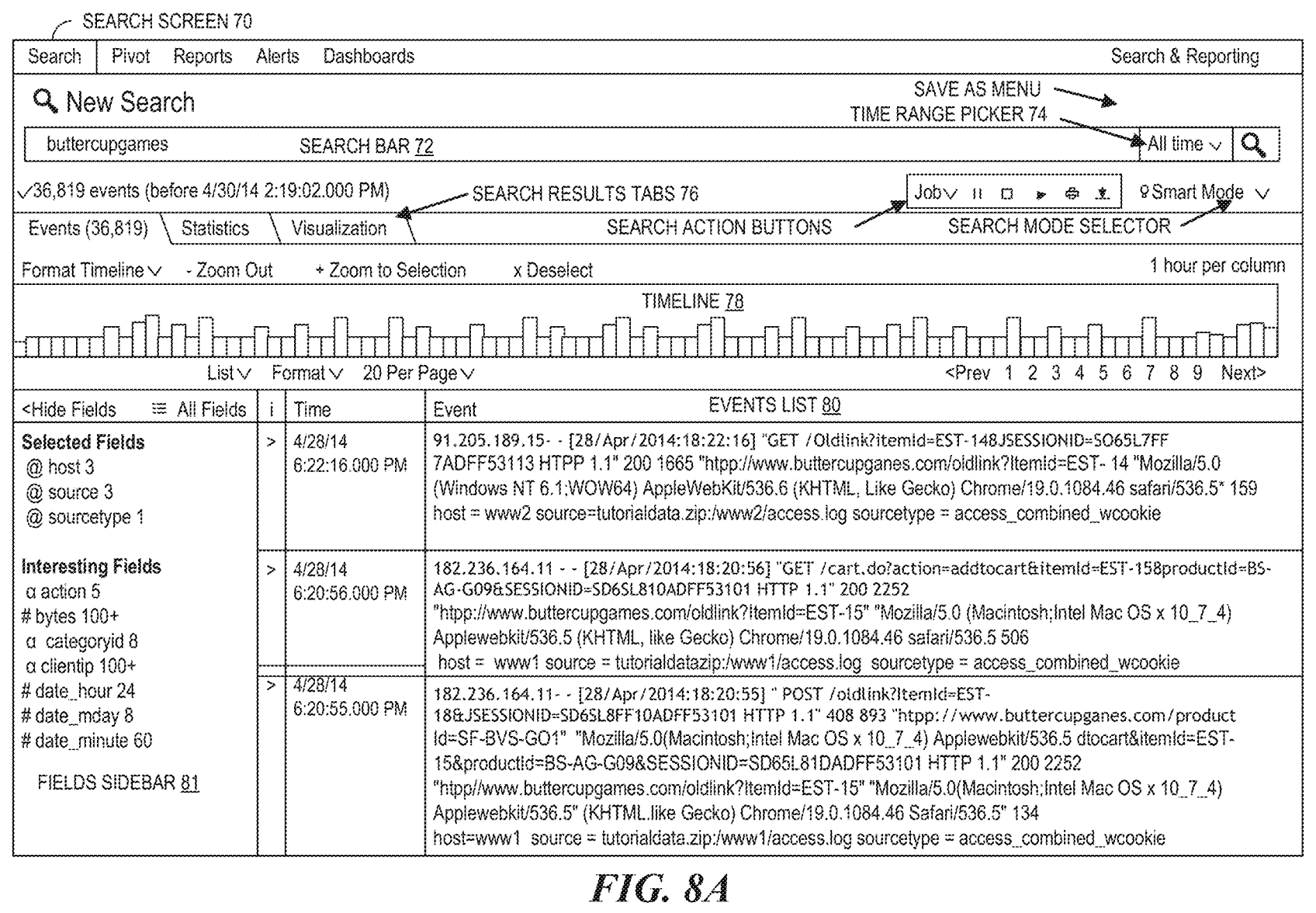

FIG. 8A illustrates an example search screen 70 in accordance with the disclosed embodiments. Search screen 70 includes a search bar 72 that accepts user input in the form of a search string. It also includes a time range picker 74 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 8B that enables the user to select different sources for the event data, such as by selecting specific hosts and log files.

After the search is executed, the search screen 70 in FIG. 8A can display the results through search results tabs 76, wherein search results tabs 76 includes: an "events tab" that displays various information about events returned by the search; a "statistics tab" that displays statistics about the search results; and a "visualization tab" that displays various visualizations of the search results. The events tab illustrated in FIG. 8A displays a timeline graph 78 that graphically illustrates the number of events that occurred in one-hour intervals over the selected time range. It also displays an events list 80 that enables a user to view the raw data in each of the returned events. It additionally displays a fields sidebar 81 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent and specify a set of fields that are associated with the events. Thus, a user can retrieve and use the "e-mails sent" data model object to quickly search source data for events relating to sent e-mails, and the user may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 32 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 14, 15, and 9A through 9D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 14:
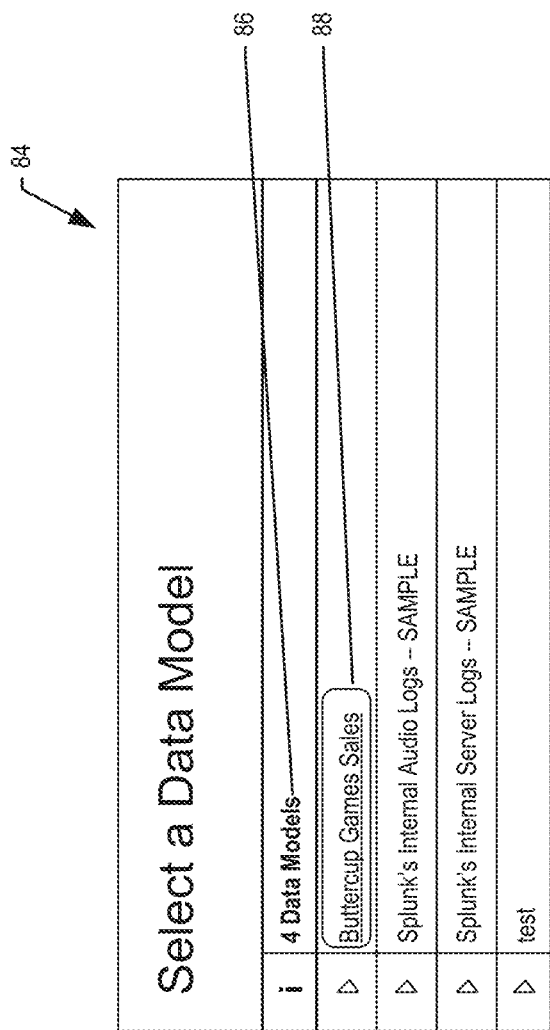
FIG. 14 illustrates a user interface screen for an example data model-driven report generation interface according to some embodiments of the present disclosure.

The selection of a data model object for use in driving a report generation may be facilitated by a data model object selection interface. FIG. 14 illustrates an example interactive data model selection graphical user interface 84 of a report editor that displays a listing of available data models 86. The user may select one of the data models 88.

Figure 15:
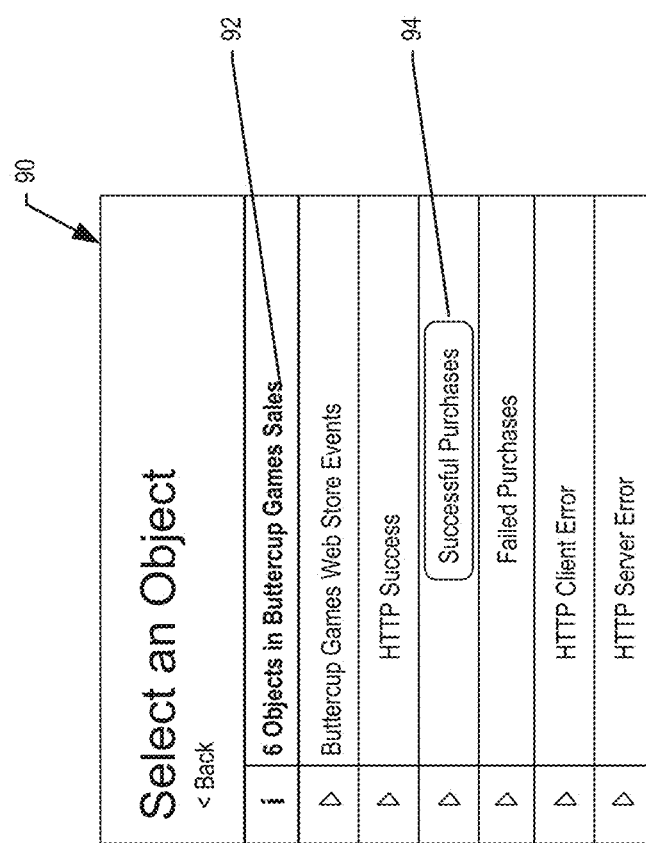
FIG. 15 illustrates a user interface screen for an example data model-driven report generation interface according to some embodiments of the present disclosure.

FIG. 15 illustrates an example data model object selection graphical user interface 90 that displays available data objects 92 for the selected data object model 88. The user may select one of the displayed data model objects 94 for use in driving the report generation process.

Figure 9A:
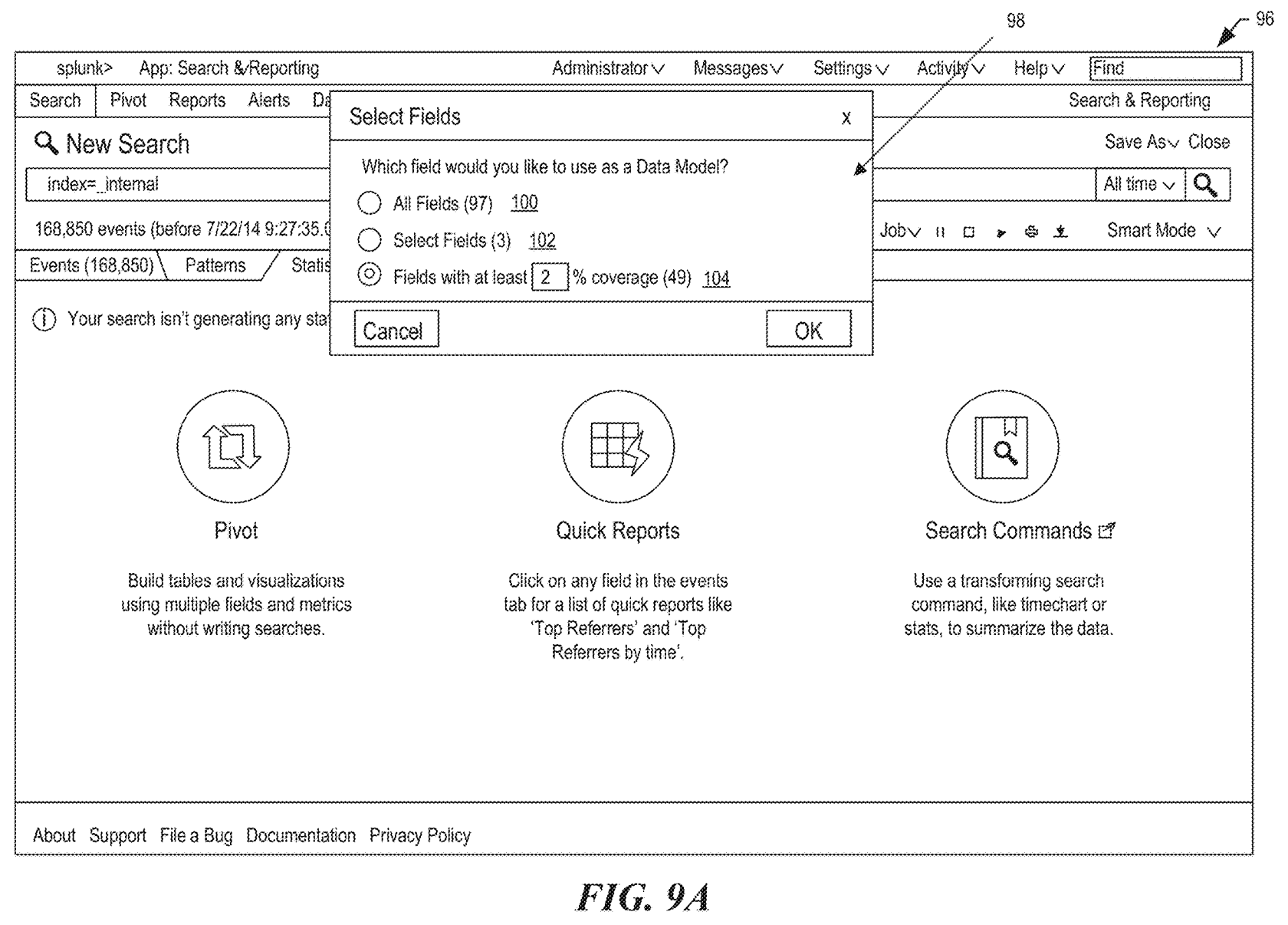

Once a data model object is selected by the user, a user interface screen 96 shown in FIG. 9A may display an interactive listing of automatic field identification options 98 based on the selected data model object. For example, a user may select one of the three illustrated options (e.g., the "All Fields" option 100, the "Selected Fields" option 102, or the "Coverage" option (e.g., fields with at least a specified % of coverage) 104). If the user selects the "All Fields" option 100, all of the fields identified from the events that were returned in response to an initial search query may be selected. That is, for example, all of the fields of the identified data model object fields may be selected. If the user selects the "Selected Fields" option 102, only the fields from the fields of the identified data model object fields that are selected by the user may be used. If the user selects the "Coverage" option 104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 100 indicates that 97 fields will be selected if the "All Fields" option is selected. The "3" displayed next to the "Selected Fields" option 102 indicates that 3 of the 97 fields will be selected if the "Selected Fields" option is selected. The "49" displayed next to the "Coverage" option 104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 9B:
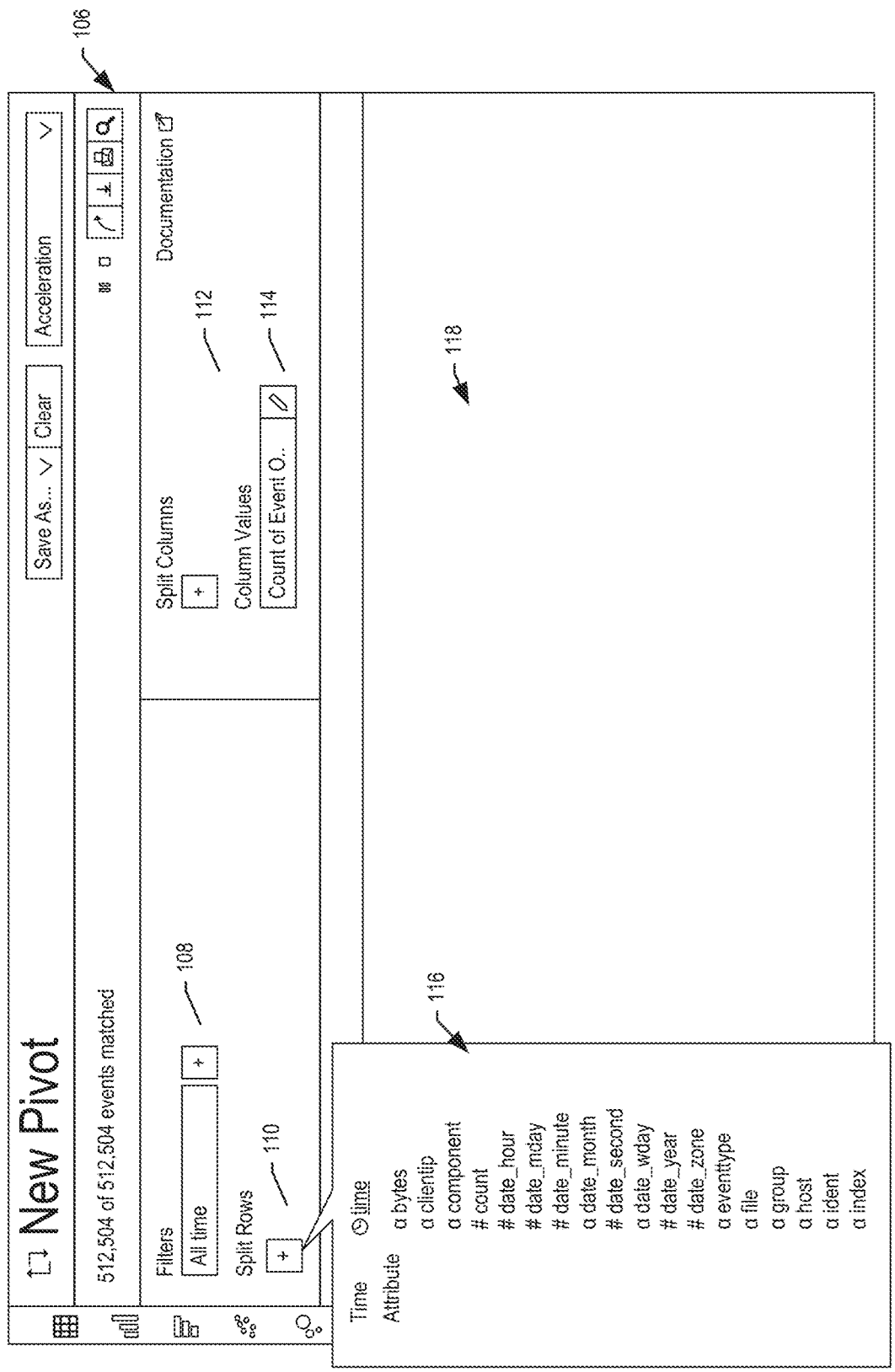
FIG. 9B illustrates a user interface screen for an example data model-driven report generation interface according to some embodiments of the present disclosure.
Figure 9C:
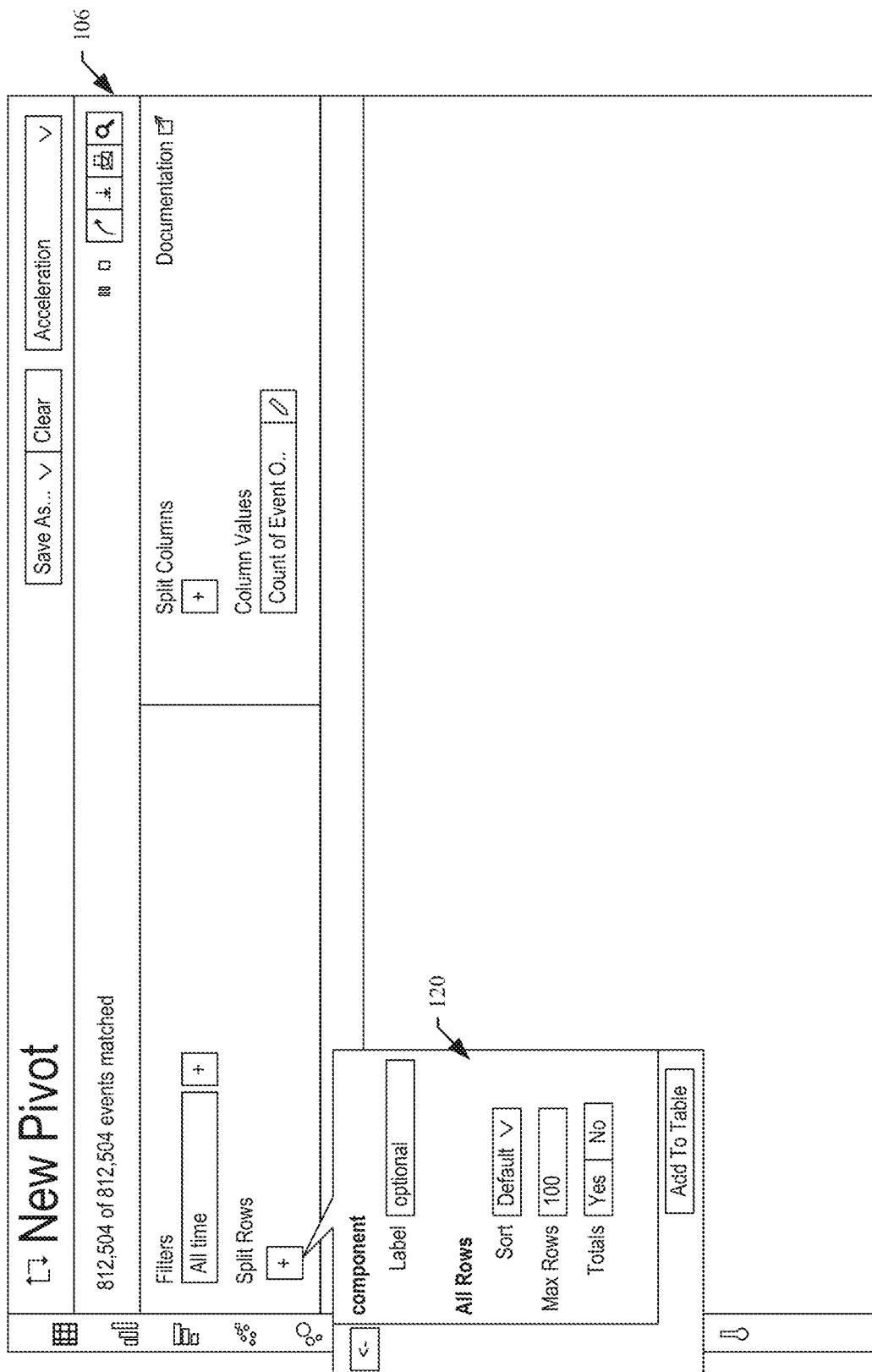
FIG. 9C illustrates a user interface screen for an example data model-driven report generation interface according to some embodiments of the present disclosure.

FIG. 9B illustrates an example graphical user interface screen (also called the pivot interface) 106 displaying the reporting application's "Report Editor" page. The screen may display interactive elements for defining various elements of a report. For example, the page includes a "Filters" element 108, a "Split Rows" element 110, a "Split Columns" element 112, and a "Column Values" element 114. The page may include a list of search results 118. In this example, the Split Rows element 110 is expanded, revealing a listing of fields 116 that can be used to define additional criteria (e.g., reporting criteria). The listing of fields 116 may correspond to the selected fields (attributes). That is, the listing of fields 116 may list only the fields previously selected, either automatically and/or manually by a user. FIG. 9C illustrates a formatting dialogue 120 that may be displayed upon selecting a field from the listing of fields 116. The dialogue can be used to format the display of the results of the selection (e.g., label the column to be displayed as "component").

FIG. 9D illustrates an example graphical user interface screen 106 including a table of results 122 based on the selected criteria including splitting the rows by the "component" field. A column 124 having an associated count for each component listed in the table may be displayed that indicates an aggregate count of the number of times that the particular field-value pair (e.g., the value in a row) occurs in the set of events responsive to the initial search query.

Figure 16:
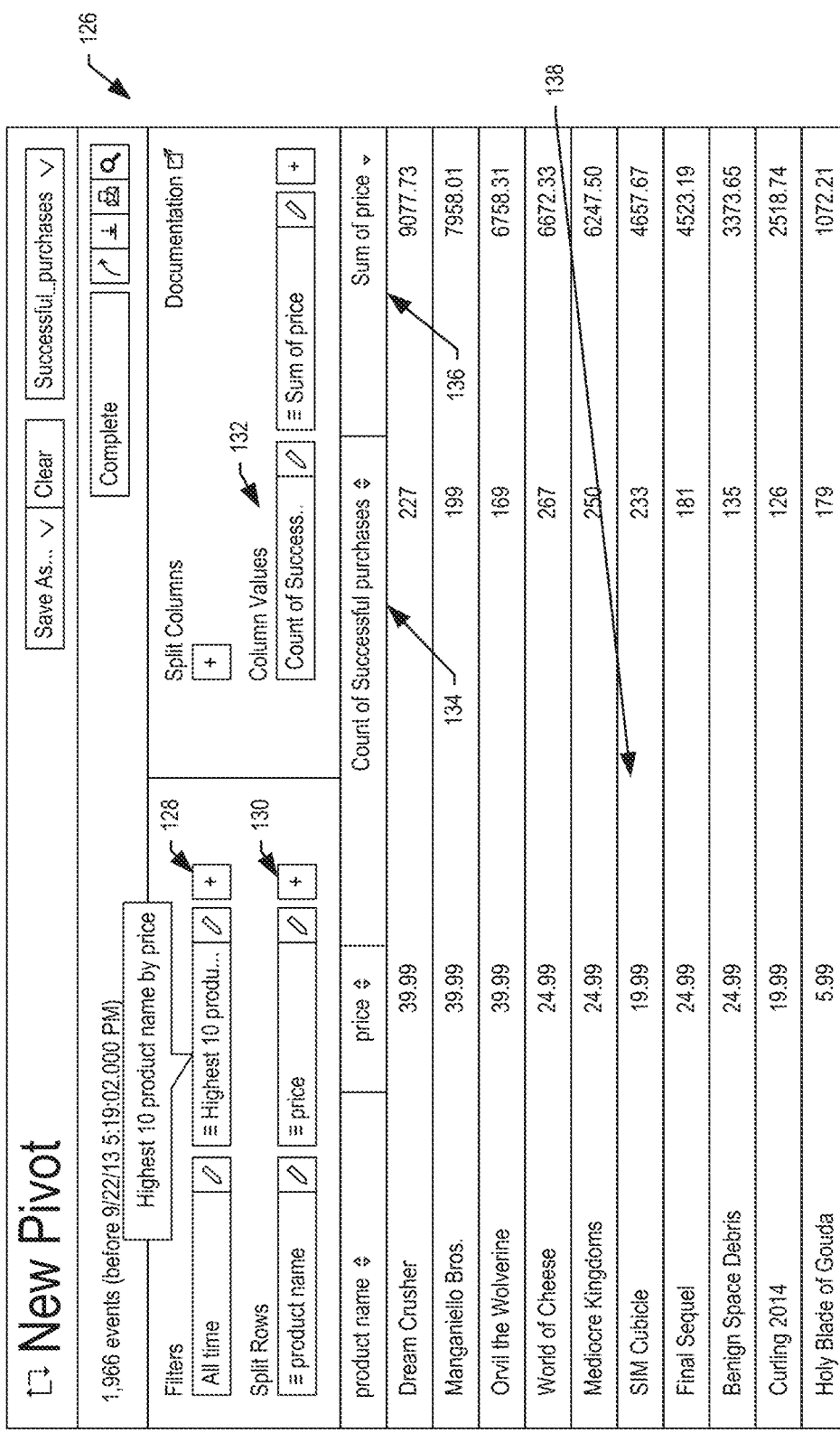
FIG. 16 illustrates a user interface screen for an example data model-driven report generation interface according to some embodiments of the present disclosure.

FIG. 16 illustrates an example graphical user interface screen 126 that allows the user to filter search results and to perform statistical analysis on values extracted from specific fields in the set of events. In this example, the top ten product names ranked by price are selected as a filter 128 that causes the display of the ten most popular products sorted by price. Each row is displayed by product name and price 130. This results in each product displayed in a column labeled "product name" along with an associated price in a column labeled "price" 138. Statistical analysis of other fields in the events associated with the ten most popular products have been specified as column values 132. A count of the number of successful purchases for each product is displayed in column 134. This statistics may be produced by filtering the search results by the product name, finding all occurrences of a successful purchase in a field within the events, and generating a total of the number of occurrences. A sum of the total sales is displayed in column 136, which is a result of the multiplication of the price and the number of successful purchases for each product.

Figure 18:
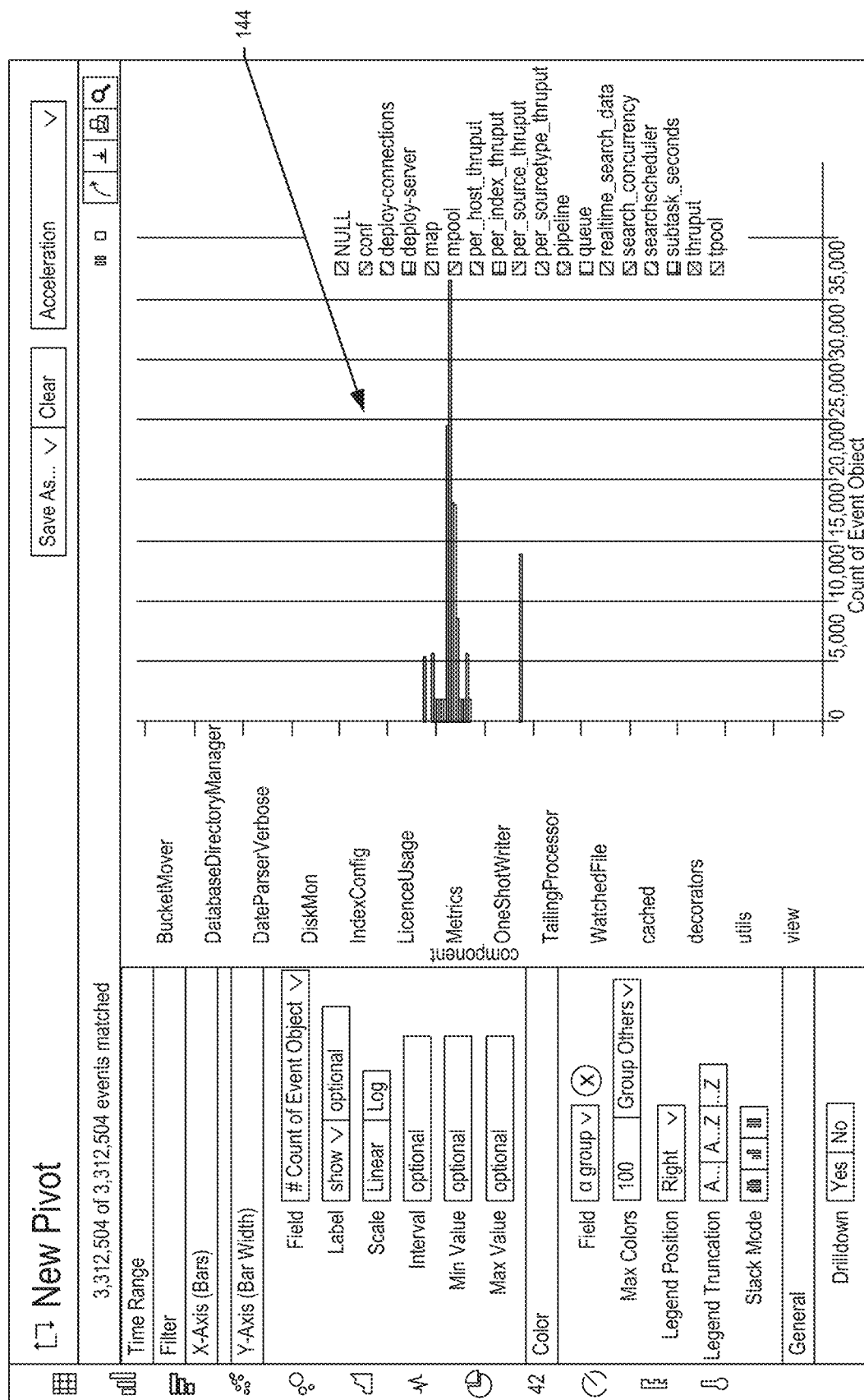
FIG. 18 illustrates example visualizations generated by a reporting application according to some embodiments of the present disclosure.
Figure 19:
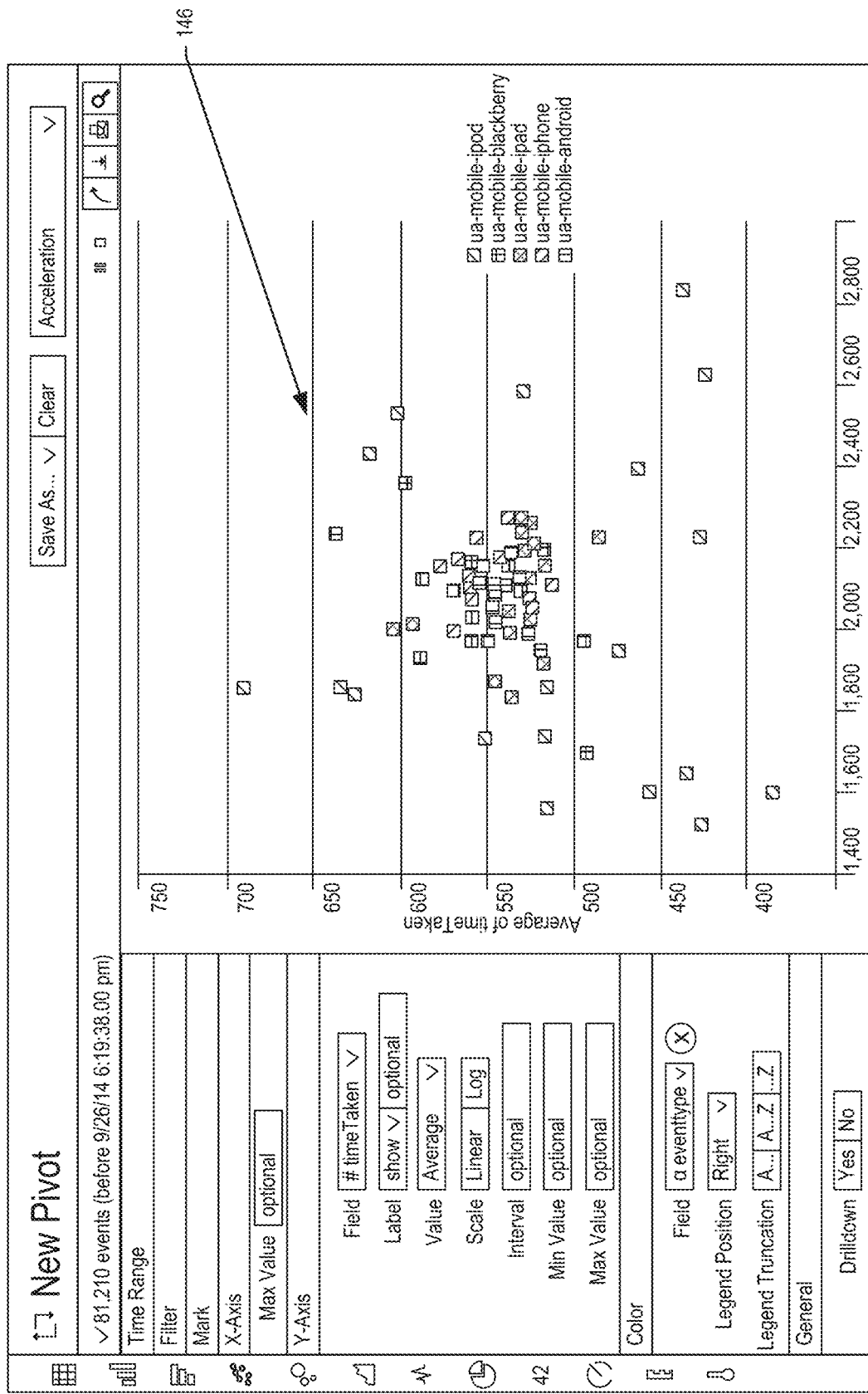
FIG. 19 illustrates example visualizations generated by a reporting application according to some embodiments of the present disclosure.

The reporting application allows the user to create graphical visualizations of the statistics generated for a report. For example, FIG. 17 illustrates an example graphical user interface 140 that displays a set of components and associated statistics 142. The reporting application allows the user to select a visualization of the statistics in a graph (e.g., bar chart, scatter plot, area chart, line chart, pie chart, radial gauge, marker gauge, filler gauge, etc.). FIG. 18 illustrates an example of a bar chart visualization 144 of an aspect of the statistical data 142. FIG. 19 illustrates a scatter plot visualization 146 of an aspect of the statistical data 142.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index (e.g., lexicon); (3) using a high performance analytics store; and (4) accelerating the process of generating reports. These novel techniques are described in more detail below.

2.10.1. Aggregation Technique

Figure 10:
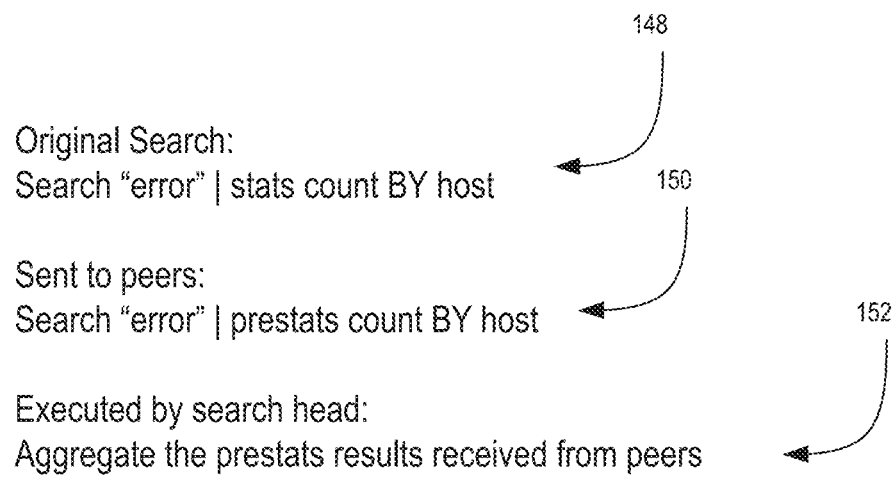
FIG. 10 illustrates an example search query received from a client and executed by search peers according to some embodiments of the present disclosure.

To facilitate faster query processing, a query can be structured such that multiple indexers perform the query in parallel, while aggregation of search results from the multiple indexers is performed locally at the search head. For example, FIG. 10 illustrates how a search query 148 received from a client at a search head 50 can split into two phases, including: (1) subtasks 150 (e.g., data retrieval or simple filtering) that may be performed in parallel by indexers 46 for execution, and (2) a search results aggregation operation 152 to be executed by the search head when the results are ultimately collected from the indexers.

During operation, upon receiving search query 148, a search head 50 determines that a portion of the operations involved with the search query may be performed locally by the search head. The search head modifies search query 148 by substituting "stats" (create aggregate statistics over results sets received from the indexers at the search head) with "prestats" (create statistics by the indexer from local results set) to produce search query 150, and then distributes search query 148 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6, or may alternatively distribute a modified version (e.g., a more restricted version) of the search query to the search peers. In this example, the indexers are responsible for producing the results and sending them to the search head. After the indexers return the results to the search head, the search head aggregates the received results 152 to form a single search result set. By executing the query in this manner, the system effectively distributes the computational operations across the indexers while minimizing data transfers.

2.10.2. Keyword Index

As described above with reference to the flow charts in FIG. 5 and FIG. 6, data intake and query system 32 can construct and maintain one or more keyword indices (e.g., lexicons) to quickly identify events containing specific keywords. This technique can greatly speed up the processing of queries involving specific keywords. As mentioned above, to build a keyword index, an indexer first identifies a set of keywords. Then, the indexer includes the identified keywords in an index (e.g., a time-series index), which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of the system 32 create a high performance analytics store, which can be referred to as a "summarization table," that contains entries for specific field-value pairs. A summarization table may be populated in response to a search query applied to events. The system can then use the summarization table to accelerate subsequent queries related to the events subject to the original search query. As such, the system can accelerate the subsequent queries by using the data contained in the summarization table to return search results, while avoiding the processing otherwise required to obtain the original search results. For example, the system 32 may receive a search query for events that have specified keywords. A summarization table produced in response to the search query can be used for perform subsequent statistical queries related to the events including the specified keywords.

The summarization tables can be populated at search time. The basis for the summarization tables are time-series index (tsidx) files that are populated at index time. The tsidx files are populated at index time to facilitate searching of events, as detailed above. Hence, the summarization tables built from the tsidx files can speed up certain types of queries. A tsidx file is a self-contained file populated with data extracted at index time from events. The tsidx file can associate field values (e.g., keywords) of events with location references to the events, which are stored in a companion journal file. For example, at index time, events can be processed to extract time values, metadata field values, user specified field values, other field values, etc. The system populates a tsidx file with the extracted time values and field values, and stores the actual events in a journal. The tsidx file is used to process a received search query having search criteria including the indexed events. The tsidx file then facilitates rapidly searching the events stored in the journal.

The structure and contents of a tsidx file facilitate searching data of events stored in a companion journal. In some embodiments, the structure of the tsidx file includes distinct sections. A section of the tsidx file includes an array of time values (e.g., timestamps) extracted from events. Another section includes event identifiers and information identifying the locations of respective events in the journal. Another section can include a lexicon (e.g., keyword index) of the field values extracted from the events. The lexicon may include field values identified at index time. The lexicon may also include user defined customized field values and/or combinations of field values identified at index time. The lexicon may also contain meta-field values such as a source, source type, or host values of the events. Another section of the tsidx file can include postings that map the field values in the lexicon to event identifiers.

The data entries of the sections can be structured to map data entries in one section to data entries in another section. In some embodiments, data entries contained in one section can be ordered in the same way as related data entries in another section. For example, the lexicon may include N entries in N rows. The posting map can also include N entries in N rows such that the kth entry in the lexicon matches the kth entry of the posting. In some embodiments, the data entries in sections can include explicit pointers to data entries in other sections of the tsidx file. For example, the lexicon can include N field value entries in N rows, and the postings map can include N event identifier entries in N rows. The event identifier can map to the event identifiers section including associated locations information to retrieve data from events stored in the journal. Thus, the structure of the tsidx file and the structure of its sections create paths that facilities searching events during search time.

During search time, a query may include criteria that specify field values (e.g., meta-field values) contained in the lexicon of the tsidx file. The lexicon is searched to identify the specified field values. The locations of the particular entries in the lexicon that contain the specified field values can be used to identify corresponding entries in the postings map, which can include references to event identifiers in the corresponding section of the tsidx file. Then, configuration files for the identified events can be retrieved and used to extract data from the events. For example, the configuration files may define extraction rules that are event source or source type specific, and those extraction rules can be used to extract data from the events.

For example, the search criteria of a search query may include IP addresses of events that include the value "94107" for a "ZIP code" field. The system can search the lexicon of the tsidx for the specified field value. The third entry of the lexicon may include a specified field value, and the corresponding third entry of the posting list may identify two events. The event identifiers in the third entry of the postings are used to identify the location information of the events including the value "94107" for the "ZIP code" field. The configuration files of identified events are retrieved, and their extraction rules are used to extract the IP addresses from the identified events. As such, the IP addresses or events that satisfy the search query can be retrieved using the tsidx file.

Thus, when the system 32 receives a search query, the system 32 will run scans on the tsidx files for the search criteria, and uses location references to retrieve events that satisfy the search criteria from the journal file. In some embodiments, each "bucket" or events includes its own tsidx file and companion journal. As such, processing a search query may require scanning the tsidx files of multiple buckets to obtain partial search results that are aggregated to obtain the search results that satisfy the search query. In some embodiments, to speed up searches, bloom filters can be used to narrow the set of tsidx files that the system 32 must search to obtain search results.

In some embodiments, the process for searching events detailed above is repeated for each search query. Hence, even though the use of tsidx files enhances searching by avoiding the need to search all events, using the tsidx files for searching over events for certain queries can be inefficient. For example, a first query may specify keywords, and tsidx files can be used to retrieve events that contain those keywords. A second query may specify a statistical analysis to be performed of events that contain the keywords of the first query. As such, performing the second query would require at least the same steps performed for the first search query, and additional steps to complete the statistical analysis. Accordingly, performing the second subsequent query is inefficient because it fails to take advantage of the execution of the first query.

To speed up certain types of queries, some embodiments of the system 32 create the summarization tables, which contain entries for specific field values. This optimization mechanism can be initiated automatically or manually by a user to create summarization tables on a per search, per bucket basis. For example, a user can set a data model to automatically generate and use summarization tables to perform the specialized searches. In another example, a user can submit a command through a user interface to accelerate query processing by using summarization tables. Then, upon receiving search queries, the system can generate and scan summarization tables to accelerate searches. For example, a user can add SPL commands to a search field causing a search to operate on the summarization table, and the results can be quickly obtained by avoiding the need to consult configuration files, extraction rules, etc.

At search time, summarization tables are generated based on the tsidx files. In particular, a summarization table is populated based on events retrieved during search time, in response to a search query. In some embodiments, the size of the summarization table may be derived based on the configuration files for events retrieved as search time. For example, each source type definition may have one or more configuration files that define all the extraction rules that can be used to extract field values from events of that source type. In another example, the configuration files can define the extraction rules for a source or another meta field.

The configuration files for events retrieved at search time can be used to populate a summarization table by applying all the extraction rules of the retrieved events to the retrieved events. For example, the system 32 would identify configuration files for the source types matching the retrieved events. The system can apply some or all the extraction rules to extract some or all the field values that are extractable based on the extraction rules defined by the configuration files. The summarization table can then be populated with all the event data from the tsidx file retrieved during search time and all other field values of those events identified from their configuration files.

In some embodiments, the resulting summarization table can have a columnar structure where data is stored in columns instead of rows. Specifically, each column may correspond to a field type of the events retrieved at search time. In some embodiments, where events identified at search time have different configuration files, the summarization table may include cells that are empty. Specifically, the retrieved events may be associated with different source types that have different configuration files defining different extraction rules. As a result, some cells of the summarization table are empty because the extraction rules used to extract data from some events may not be relevant to all events.

Thus, a summarization table includes the search results obtained by scanning a tsidx file and is enriched by the field values determined in accordance with the extraction rules of the configuration files for retrieved events. More specifically, the summarization table may contain multiple entries including specific values from specific fields of the event data. The extracted field values satisfy the search criteria of the query received by the system, and may also include other field values that do not satisfy the specific criteria but which were extracted from events including the field values that do satisfy the criteria. The summarization table may also include other data related to the query processed by the system. Thus, the field values of the summarization table form a lexicon of where at least some columns of the summarization table map to the row of the tsidx file. As such, the tsidx file from which the summarization table was derived can itself be derived from the summarization data.

In some embodiments, the summarization table may not include information indicative of the locations of events in the journal if all the field values of those events are included in the summarization table. As a result, scanning the summarization table to obtain results eliminates the need to access events stored in the journal. As such, searches performed on data contained in the summarization table are accelerated because the configuration files for events do not need to be consulted and the events themselves do not need to be retrieved form the journal.

For example, a search query may have search criteria including IP addresses of events having value of "94107" for a "ZIP code" field of events. The system could automatically populate a summarization table with multiple entries including entries based on the events that include the specified field values. The summarization table is also enriched with all other field values that could be extracted from the events based on their configuration files. Thus, the summarization table includes the search results and other field values that are not part of the search results. Moreover, the summarization table can be used to reconstruct the tsidx file itself from which the search results were obtained.

The disclosed embodiments enable the system 32 to quickly process subsequent queries that can use the data contained in the summarization table rather than searching the events data all over again via the tsidx file. Examples of the subsequent queries may involve statistical analysis of field values that are included in the summarization table. Thus, rather than performing another search and extraction process on the events, the system can use the summarization table to perform the additional statistical analysis.

The system 32 can use the summarization table to return results for a query rather than needing to perform extraction operations on events to both extract field values and perform a statistical analysis of the field values. For example, a user may seek to perform a statistical analysis of events that include particular values in particular fields. To this end, the system can evaluate entries in the summarization table to perform a statistical analysis on specific values in the specific fields without having to go through the individual events or perform data extractions at search time.

For example, the system may receive a query specifying criteria including a count of events that have the value "94107" in the "ZIP code" field. Without the summarization table, the system would need to search and extract the raw data of the events that satisfy the search criteria and perform a count of specified field values pairs as search results. However, the system 32 can instead evaluate entries in the summarization table to count instances of "94107" in the "ZIP code" field without having to go through the individual events or perform data extractions at search time. Thus, the disclosed embodiments can speed up obtaining results for these types of queries.

In some embodiments, the system 32 can maintain a separate summarization table for each of the above-described time-specific buckets that stores events for a specific time range. A bucket-specific summarization table includes entries for specific field value combinations that occur in events in the specific bucket. In some embodiments, the system 32 can maintain a separate summarization table for each indexer. The indexer-specific summarization table includes entries for the events in a data store that are managed by the specific indexer. Indexer-specific summarization tables may also be bucket-specific. However, the disclosed embodiments are not so limited. Instead, summarization tables can be defined based on any range or parameter used to limit a search operation.

In some embodiments, a summarization table can include references to events from which its field values were extracted. If the system needs to process all events that have a specific field-value combination, the system can use the references in the summarization table entry to directly access the events from the journal. For example, when the summarization tables may not cover all of the events that are relevant to a subsequent query, the system can use the summarization tables to obtain partial results for the events that are covered by summarization tables, but may also have to search through other events that are not covered by the summarization tables to produce additional results. These additional results can then be combined with the partial results to produce a final set of results for the query.

Some aspects of the summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so, advantageously, only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
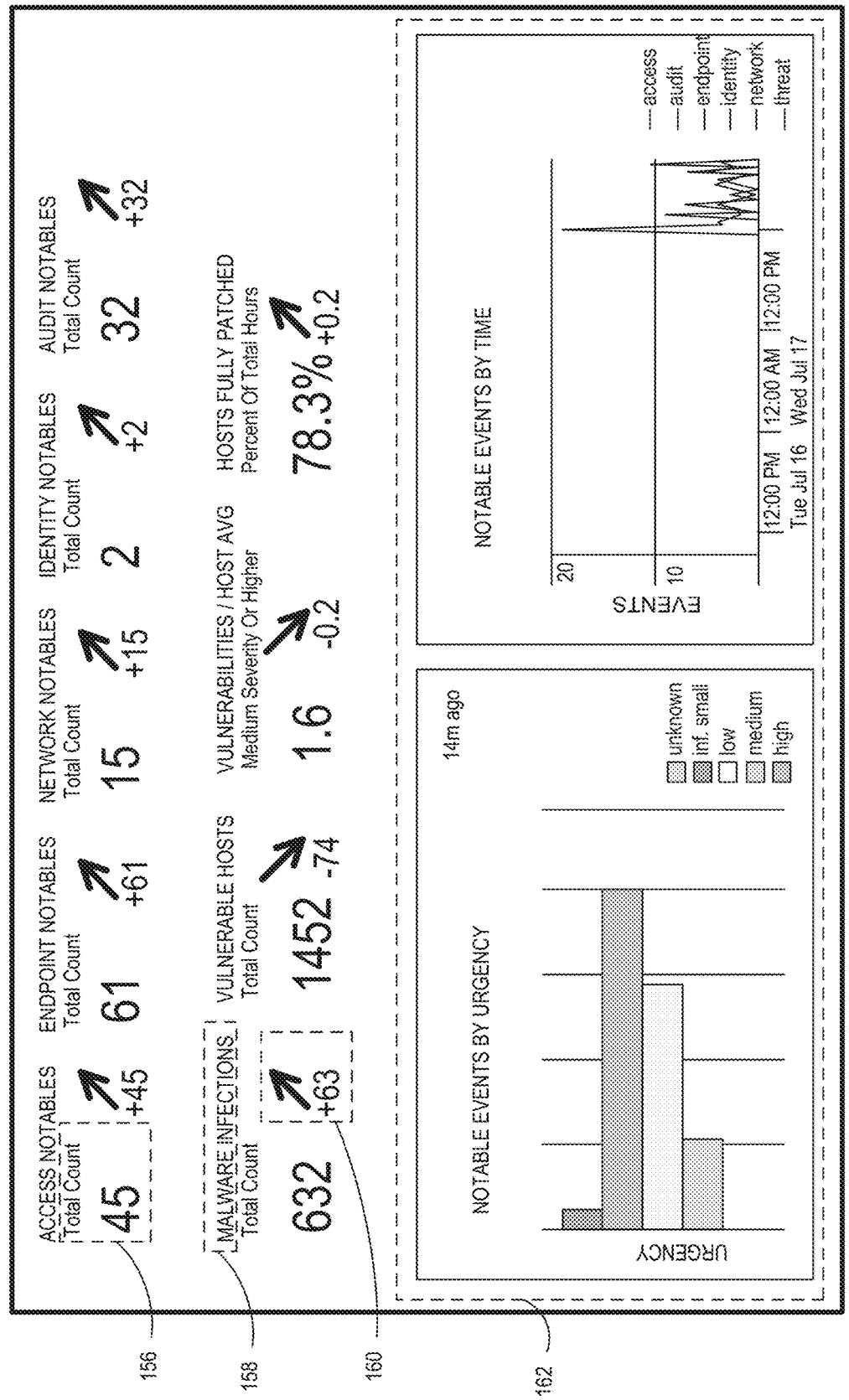
FIG. 11A illustrates a key indicators view according to some embodiments of the present disclosure.

The SPLUNK® APP FOR ENTERPRISE SECURITY provides various visualizations to aid in discovering security threats, such as a "key indicators view" that enables a user to view security metrics, such as counts of different types of notable events. For example, FIG. 11A illustrates an example key indicators view 154 that comprises a dashboard, which can display a value 156, for various security-related metrics, such as malware infections 158. It can also display a change in a metric value 160, which indicates that the number of malware infections increased by 63 during the preceding interval. Key indicators view 154 additionally displays a histogram panel 162 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an example incident review dashboard 164 that includes a set of incident attribute fields 166 that, for example, enables a user to specify a time range field 168 for the displayed events. It also includes a timeline 170 that graphically illustrates the number of incidents that occurred in time intervals over the selected time range. It additionally displays an events list 172 that enables a user to view a list of all of the notable events that match the criteria in the incident attributes fields 166. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and is discarded during pre-processing.

In contrast, the SPLUNK® APP FOR VMWARE® stores large volumes of minimally processed machine data (i.e., including raw data), such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif.

Examples of performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems).

Figure 11C:
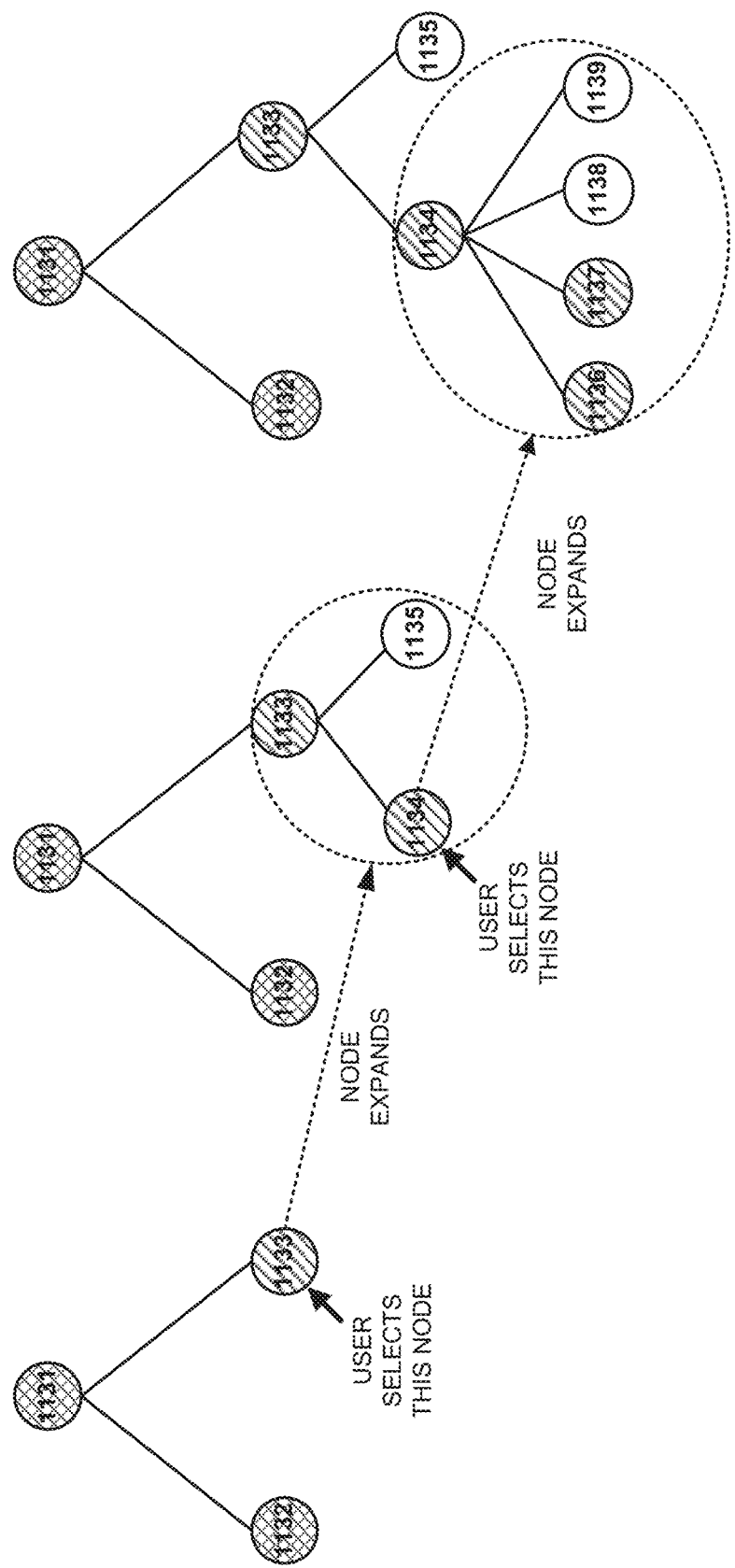
FIG. 11C illustrates a proactive monitoring tree according to some embodiments of the present disclosure.

Example node-expansion operations are illustrated in FIG. 11C, wherein nodes 1133 and 1134 are selectively expanded. Note that nodes 1131-1139 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 11D:
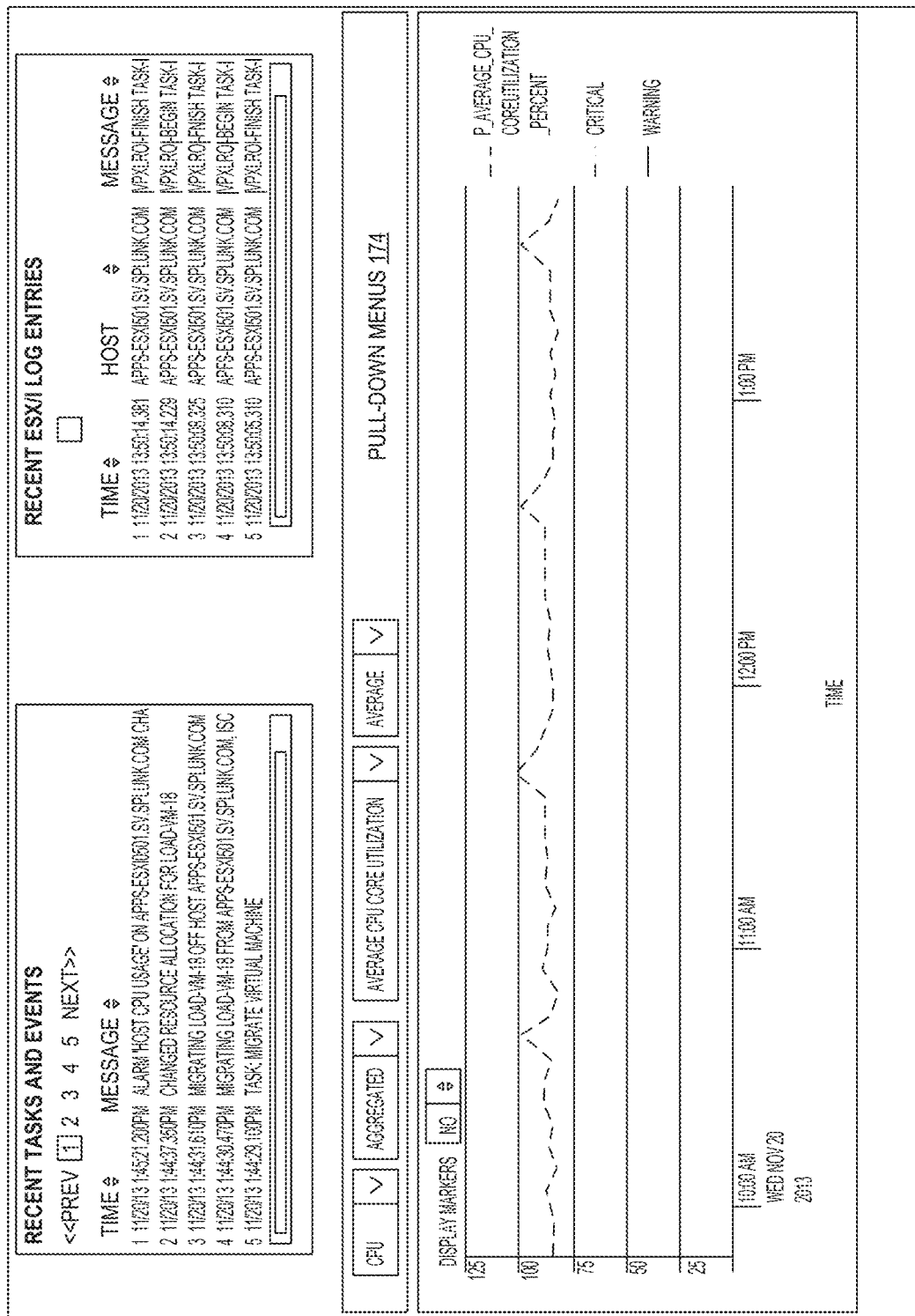
FIG. 11D illustrates a user interface screen displaying both log data and performance data according to some embodiments of the present disclosure.

The SPLUNK® APP FOR VMWARE® also provides a user interface that enables a user to select a specific time range and then view heterogeneous data comprising events, log data, and associated performance metrics for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 174 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 32 described in reference to FIG. 3 comprises several system components, including one or more forwarders, indexers, and search heads. In some environments, a user of a data intake and query system 32 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement may generally be referred to as an "on-premises" solution. That is, the system 32 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 32 operate.

In one embodiment, to provide an alternative to an entirely on-premises environment for system 32, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 12:
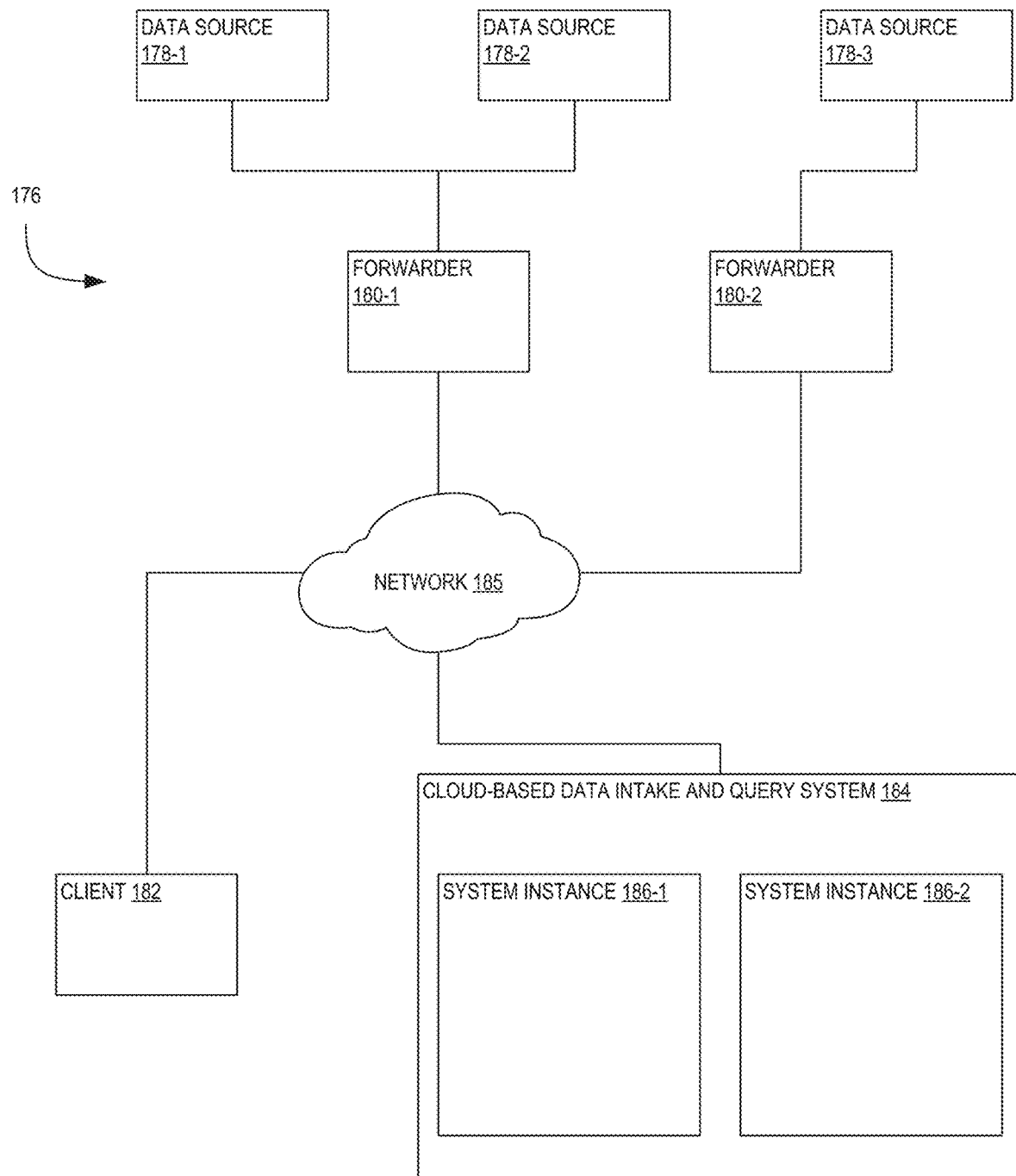
FIG. 12 illustrates a block diagram of an example cloud-based data intake and query system in which an embodiment may be implemented.

FIG. 12 illustrates a block diagram of an example cloud-based data intake and query system. Similar to the system of FIG. 4, the networked computer system 176 includes input data sources 178 and forwarders 180. These input data sources 178 and forwarders 180 may be in a subscriber's private computing environment. Alternatively, they might be directly managed by the service provider as part of the cloud service. In the example system 176, one or more forwarders 180 and client devices 182 are coupled to a cloud-based data intake and query system 184 via one or more networks 185. Network 185 broadly represents one or more LANs, WANs, cellular networks, intranetworks, internetworks, etc., using any of wired, wireless, terrestrial microwave, satellite links, etc., and may include the public Internet, and is used by client devices 182 and forwarders 180 to access the system 184. Similar to the system of 32, each of the forwarders 180 may be configured to receive data from an input source and to forward the data to other components of the system 184 for further processing.

In an embodiment, a cloud-based data intake and query system 184 may comprise a plurality of system instances 186. In general, each system instance 186-1 and 186-2 may include one or more computing resources managed by a provider of the cloud-based system 184 made available to a particular subscriber. The computing resources comprising a system instance 186 may, for example, include one or more servers or other devices configured to implement one or more forwarders, indexers, search heads, and other components of a data intake and query system, similar to system 32. As indicated above, a subscriber may use a web browser or other application of a client device 182 to access a web portal or other interface that enables the subscriber to configure an instance 186.

Providing a data intake and query system as described in reference to system 32 as a cloud-based service presents a number of challenges. Each of the components of a system 32 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 186) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK® CLOUD are centrally visible).

2.14. Searching Externally Archived Data

Figure 13:
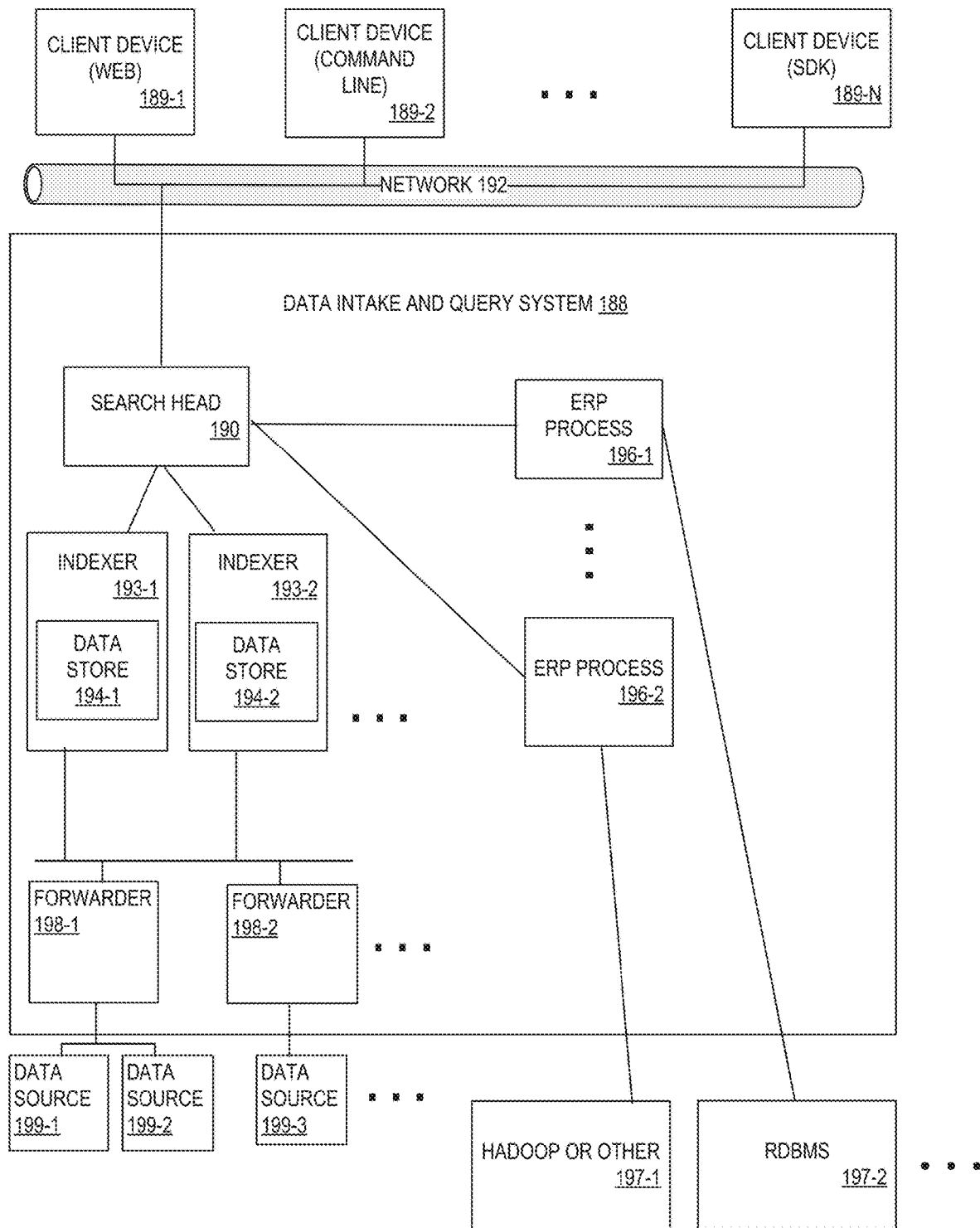
FIG. 13 illustrates a block diagram of an example data intake and query system that performs searches across external data systems according to some embodiments of the present disclosure.

FIG. 13 shows a block diagram of an example of a data intake and query system 188 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 190 of the data intake and query system receives search requests from one or more client devices 189 over network connections 192. As discussed above, the data intake and query system 188 may reside in an enterprise location, in the cloud, etc. FIG. 13 illustrates that multiple client devices 189-1, 189-2, ..., 189-N may communicate with the data intake and query system 32. The client devices 189 may communicate with the data intake and query system using a variety of connections. For example, one client device in FIG. 13 is illustrated as communicating over an Internet (Web) protocol, another client device is illustrated as communicating via a command line interface, and another client device is illustrated as communicating via a system developer kit (SDK).

The search head 190 analyzes the received search request to identify request parameters. If a search request received from one of the client devices 189 references an index maintained by the data intake and query system, then the search head 190 connects to one or more indexers 193 of the data intake and query system for the index referenced in the request parameters. That is, if the request parameters of the search request reference an index, then the search head accesses the data in the index via the indexer. The data intake and query system 188 may include one or more indexers 193, depending on system access resources and requirements. As described further below, the indexers 193 retrieve data from their respective local data stores 194 as specified in the search request. The indexers and their respective data stores can comprise one or more storage devices and typically reside on the same system, though they may be connected via a local network connection. The data is forwarded to the indexers by forwarders 198, which obtained the data from data sources 199.

If the request parameters of the received search request reference an external data collection, which is not accessible to the indexers 193 or under the management of the data intake and query system, then the search head 190 can access the external data collection through an External Result Provider (ERP) process 196. An external data collection may be referred to as a "virtual index" (plural, "virtual indices"). An ERP process provides an interface through which the search head 190 may access virtual indices.

Thus, a search reference to an index of the system relates to a locally stored and managed data collection. In contrast, a search reference to a virtual index relates to an externally stored and managed data collection, which the search head may access through one or more ERP processes 196-1 and 196-2. FIG. 13 shows two ERP processes 196-1 and 196-2 that connect to respective remote (external) virtual indices, which are indicated as a Hadoop or another system 197-1 (e.g., Amazon S3, Amazon EMR, other Hadoop Compatible File Systems (HCFS), etc.) and a relational database management system (RDBMS) 197-2. Other virtual indices may include other file organizations and protocols, such as Structured Query Language (SQL) and the like. The ellipses between the ERP processes 196-1 and 196-2 indicate optional additional ERP processes of the data intake and query system 188. An ERP process may be a computer process that is initiated or spawned by the search head 190 and is executed by the search data intake and query system 188. Alternatively or additionally, an ERP process may be a process spawned by the search head 190 on the same or different host system as the search head 190 resides.

The search head 190 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 190 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 196-1 and 196-2 receive a search request from the search head 190. The search head may optimize the received search request for execution at the respective external virtual index. Alternatively, the ERP process may receive a search request as a result of analysis performed by the search head or by a different system process. The ERP processes 196-1 and 196-2 can communicate with the search head 190 via conventional input/output routines (e.g., standard in/standard out, etc.). In this way, the ERP process receives the search request from a client device such that the search request may be efficiently executed at the corresponding external virtual index.

The ERP processes 196-1 and 196-2 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 196-1 and 196-2 generate appropriate search requests in the protocol and syntax of the respective virtual indices 197-1 and 197-2, each of which corresponds to the search request received by the search head 190. Upon receiving search results from their corresponding virtual indices, the respective ERP process passes the result to the search head 190, which may return or display the results or a processed set of results based on the returned results to the respective client device.

Client devices 189 may communicate with the data intake and query system 188 through a network interface 192, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real-time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it performs more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14.2. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPIs) are defined for a service within the SPLUNK® IT SERVICE INTELLIGENCE™ application. Each KPI measures an aspect of service performance at a point in time or over a period of time (aspect KPIs). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository itself may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPIs of the service to indicate an overall health score for the service.

SPLUNK® IT SERVICE INTELLIGENCE™ facilitates the production of meaningful aggregate KPIs through a system of KPI thresholds and state values. Different KPI definitions may produce values in different ranges, so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPIs can be processed uniformly once they are translated into the common state values using the thresholds. For example, "normal 80% of the time" can be applied across various KPIs. To provide meaningful aggregate KPIs, a weighting value can be assigned to each KPI so that its influence on the calculated aggregate KPI value is increased or decreased relative to the other KPIs.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as the systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPIs indicating overall health for defined services and a general KPI section with tiles for KPIs related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPIs in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

In some embodiments, one or more processes and/or interfaces of a SPLUNK® ENTERPRISE SYSTEM (such as a SPLUNK® IT SERVICE INTELLIGENCE™) are configured to provide a user with an efficient system to aggregate, store, and analyze metrics for example, within a SPLUNK® IT SERVICE INTELLIGENCE™ system. In some embodiments, the one or more processes are configured to provide metrics solutions including selective indexing of metrics, real-time search, a metrics catalog, ingestion protocols for standard ingestion of data, storage of raw metrics data, search commands and capabilities, in memory caching, conversion of log data to metrics data during ingestion, floating point compression and timestamp compression, dedicated file formats for metric storage, and/or additional processes and/or interfaces.

3.0. System for Storing and Analyzing Metrics Data

Figure 20:
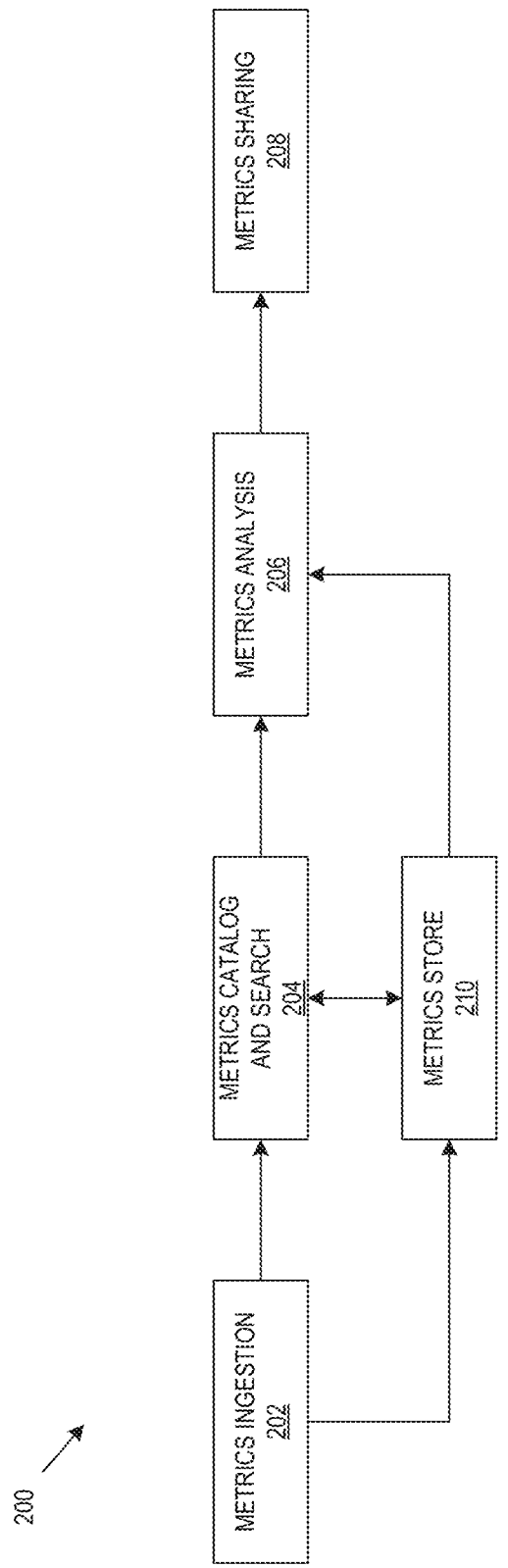
FIG. 20 is a block diagram of a system that can support storing and analyzing metrics data according to some embodiments of the present disclosure.

FIG. 20 is a block diagram of a system that can support storing and analyzing metrics data according to some embodiments of the present disclosure. The block diagram depicts components of the system 200 as functionally separate. However, it will be apparent to one of ordinary skill in the art that the components of FIG. 20 can be combined or divided into separate software, firmware and/or hardware components. Furthermore, it will also be apparent to one of ordinary skill in the art that such components, regardless of how they are combined or divided, can execute on the same host or multiple hosts, and the multiple hosts can be connected by one or more networks.

The system 200 includes at least a metrics ingestion component 202, a metrics catalog and search component 204 ("metrics catalog 204" or "catalog 204"), a metrics analysis component 206, a metrics sharing component 208, and a metrics store component 210. Each component may include one or more components discussed in greater detail below. Generally, the ingestion component 202 is communicatively coupled to the metrics store 210, to store ingested metrics data in indexes of the metrics store 210. The metrics analysis component 206 includes features that enable analyzing metrics data or data related to metrics data in the metrics store 210 and the metrics catalog 204. For example, a metrics-aware user interface (UI) may be communicatively coupled to the metrics analysis component 206. A user can input search and/or analysis commands via the metrics-aware UI to the metrics analysis component 206, which may retrieve data from either the metrics store 210 in secondary memory or the metrics catalog and search component 204 in primary memory (e.g., an in memory). Lastly, the metrics sharing component 208 can enable users to share the analysis results with other users.

As used herein, the term component or module may refer to software, firmware, hardware, combinations thereof, or another component that is used to effectuate a purpose, and it will typically include a computing device, appliance, or host having processors and software instructions that are stored in a storage device, such as a non-volatile memory (also referred to as secondary memory) of the computing device for practicing one or more objectives. When the software instructions are executed by the processor(s), at least a subset of the software instructions is loaded into a memory (also referred to as primary memory) by the computing device, wherein the computing device becomes a special purpose computing device for practicing the objectives. When implemented on a general-purpose computing device, the computer program code segments configure the computing device to create specific logic circuits.

In the example of FIG. 20, each component can run on one or more nodes (e.g., hosting devices). As used herein, the term host may refer to a computing device, a communication device, a storage device, or any electronic device capable of running a software component. For example, a computing device can be, but is not limited to, a laptop personal computer ("PC"), a desktop PC, a tablet PC, or a server machine. A storage device can be, but is not limited to, a hard disk drive, a flash memory drive, or any portable storage device. A communication device can be, but is not limited to, a mobile phone.

3.1. Metrics Collection

Figure 21:
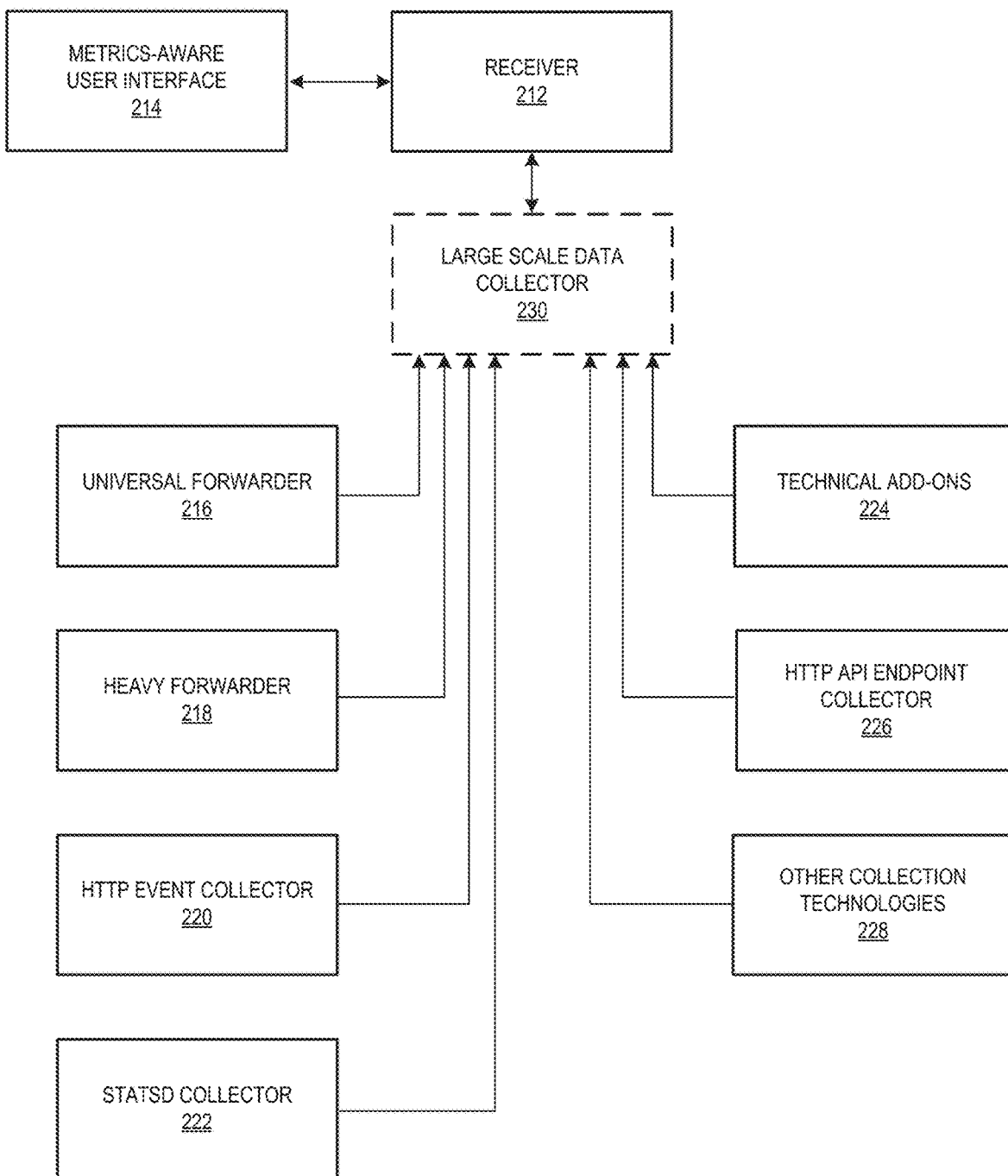
FIG. 21 is a block diagram illustrating different types of collection mechanisms that can transfer metrics or non-metrics data to a receiver of a data intake and query system according to some embodiments of the present disclosure.

The metrics ingestion component 202 can include a getting data in (GDI) mechanism that enables collecting metrics data from local or remote systems over a computer network. The GDI mechanism can include different collection mechanisms for collecting diverse types of metric and non-metric data from different resources. FIG. 21 is a block diagram illustrating various collection mechanisms that can transfer metric or non-metrics data to a receiver of a data intake and query system according to some embodiments of the present disclosure. In some embodiments, the receiver 212 can be an indexer or a forwarder of a data intake and query system. In some embodiments, a metrics-aware UI 214 can be used to configure the receiver 212, or configure any of the collection mechanisms over a computer network.

Examples of collection mechanisms include a universal forwarder 216, a heavy forwarder 218, an HTTP event collector (HEC) 220, a StatsD collector 222, a technical add-on 224, an HTTP API endpoint collector 226, and other collection technologies 228. In some embodiments, a large scale data collector (LSDC) 230 that supports metrics can coordinate the collection mechanisms to improve ingestion by mitigating congestion. Other technologies that can be implemented to enhance the operations of the metrics system 200 include IT service intelligence (ITSI) and key performance indicator (KPI) support for metrics, and machine learning techniques.

In some embodiments, the collection mechanisms can be selected or enabled via the metrics-aware UI 214 displayed on a display device. The metrics-aware UI 214 may include a list of available collection mechanisms, data types, and other options to customize collections operations by the data intake and query system. In some embodiments, these operations are presented in a user selectable format. Examples of data types include unstructured, semi-structured, or structured metrics data or non-metrics data (e.g., machine-generated data) from particular sources. Examples of the other user-selectable options include a customizable scheduler of the LSDC that can enable certain collection mechanisms for certain types of data or resources at certain times in accordance with a schedule. As such, a user can customize collections of metrics data and non-metrics data by the receiver 212 via the metrics-aware UI 214.

3.2.1 Universal Forwarder

The universal forwarder 216 may collect data securely from one or more remote sources over a computer network and forward the collected data to the receiver 212 of a data intake and query system for processing, storage, and analysis. For example, the universal forwarder 216 can collect and forward application log data alone, log and metrics data, or metrics data alone. The metrics data may include metrics collected from various computing resources over one or more computer networks. As indicated above, each metric includes a numerical value indicative of a measured characteristic of a computing resource. A metric may be collected as structured data, semi-structured data, or unstructured data, and forwarded to the receiver 212 for ingestion. The process for ingesting and storing metrics data by the receiver 212 of the data intake and query system is described further below.

The universal forwarder 216 can be a streamlined, dedicated component of the data intake and query system that contains only essential components needed to forward data to the receiver 212. As such, the universal forwarder 216 may not expose a metrics-ware UI. In some embodiments, the universal forwarder 216 is an executable such as an instance running on a node that collects and sends data to the receiver 212 such as an indexer, another instance, or to a third-party system. In some embodiments, the universal forwarder 216 may be the best or preferred way to forward metrics data to the receiver 212. In some embodiments, the universal forwarder 216 may only collect and forward non-metrics data (e.g., machine-generated raw data) to the receiver 212. In some embodiments, the universal forwarder 216 can only collect and forward metrics data (e.g., structured or semi-structured metrics data) to the receiver 212. In some embodiments, the universal forwarder 216 can route either metrics data or non-metrics data to the receiver 212.

The universal forwarder 216 can be scaled to collect relatively large amounts of data (e.g., terabytes) from relatively large amounts of remote systems (e.g., tens of thousands) with minimal impact on performance. However, the universal forwarder 216 may not have capabilities to index data locally before routing the collected data elsewhere. The universal forwarder 216 can provide a robust solution for metrics data forwarding compared to conventional network feeds. The universal forwarder may include capabilities for tagging metadata (e.g., source, source type, and host), configurable buffering, data compression, SSL security, and use of any available network ports. Multiple universal forwarders can be used to perform functions like data consolidation and load balancing across forwarders.

Although the universal forwarder 216 may not be accessible by the metrics-aware UI 214 in the streamlined version, it may still be configured, managed, and scaled by editing configuration files or by using a forwarder management or distributed management console (DMC) interface. Hence, a user can selectably enable the universal forwarder 216 to collect and forward data from specified sources, of specified source type, and of specified data type (e.g., metric or non-metrics data).

3.2.2. Heavy Forwarder

The heavy forwarder 218 can be an entirely separate, full instance of a streamlined executable with certain features disabled. The heavy forwarder 218 has a larger footprint than the universal forwarder 216, and retains indexer capabilities, except that it lacks the ability to perform distributed searches. Much of its default functionality, such as a web interface, can be disabled, if necessary, to reduce the footprint size on the machine on which it runs.

Unlike the universal forwarder 216, the heavy forwarder 218 can parse data before forwarding it and can route data based on criteria such as source or type of event. The heavy forwarder 218 can index data locally, as well as forward data to another system instance. A user can enable these capability on, which may be disabled by default. In some embodiments, the heavy forwarder 218 can search stored data, and generate alerts as configured by users. In some embodiments, the heavy forwarder 218 can be accessed over a computer network via the metrics-aware UI 214. As a result, a user can selectably enable the heavy forwarder 218 to collect and forward a specified data type from a specified source of a specified source type via the metrics-aware UI 214. Thus, a user can configure, manage, and scale heavy forwarders online.

3.2.3. HTTP Event Collector

An HTTP event collector (HEC) 220 provides a fast and efficient way for developers to send application log data or metrics data over HTTP or HTTPs to the receiver 212. The HEC 220 requires only a few lines of code added to an application, causing it to send the log and/or metrics data to the receiver 212. The HEC 220 is token-based such that hard-coding of credentials in the application or supporting files is not required to enable sending data. In operation, the HEC 220 can be turned on at the endpoint machine. An HEC token is generated, a POST request is created on the client that will post data to the HEC, and the client's authentication header is set to include the HEC token. Then data is posted to the HEC token receiver.

The HEC 220 can support metric protocols to send metrics data over HTTP or HTTPS to various destinations such as metrics stores in the cloud, such as SPLUNK® ENTERPRISE or SPLUNK® CLOUD, in an efficient and secure manner. The HEC 220 can also take advantage of a distributed deployment of a data intake and query system to distribute and index very large amounts of data. Further, various kinds of data can be sent to the receiver 212 through the HEC 220. For example, event data sent by the HEC 220 can be raw text or formatted within a JSON object. In some embodiments, one of the logging libraries of the HEC 220 can automatically package and send data from the HEC 220 in a selected format. The HEC 220 also supports assigning different source types, indexes, and groups of indexers such that a user can customize where and how data gets ingested by the data intake and query system. In some embodiments, the HEC 220 can be customized by changing its configuration files.

3.2.4. StatsD Collector

The StatsD collector 222 is a daemon (i.e., background process) that can collect metrics data and forward it to the receiver 212. Unlike the HEC 220, the StatsD collector 222 runs outside an application from which it collects data, and uses UDP protocol. Hence, the StatSD collector can avoid crashing the application from which is collects data. The StatsD collector can include a front-end proxy for a set of tools that can be used to send, collect, and/or aggregate metrics based on the StatsD protocol. The StatsD protocol can be a simple, text-oriented protocol, which enables the StatsD collector to reliably interact with the backend components independent of languages and frameworks. It can also ensure strict isolation between the StatsD collector 222 and the rest of the components of a computer system from which it collects data.

The StatsD collector 222 enables a user to invoke or utilize the tools as well as many StatsD libraries to meet the user's needs. Specifically, applications are instrumented by developers using language-specific client libraries. The libraries communicate with the StatsD daemon using the StatsD protocol, and the daemon can generate aggregate metrics, and route data to the receiver 212. More specifically, the StatsD daemon can listen for UDP traffic from all application libraries, aggregate metrics data over time and then flush the metrics data. In some cases, the protocol used between the StatsD daemon and the backend of the data intake and query system may be HTTP-based.

The StatsD collector 222 can capture different types of metrics data including gauges, counters, timing summary statistics, and sets. As indicated above, the StatsD collector 222 can also aggregate and summarize metrics data that has been previously summarized and reported by a StatsD collector 222. The StatsD collector 222 may create new metrics by applying, for example, different aggregations (e.g., average, minimum, maximum, median) to multiple reported metrics (e.g., metrics data points). In some embodiments, after metrics are collected by another collector (e.g., the universal forwarder 216), the StatsD collector can then aggregate the collected metrics and route the aggregated metrics to the receiver 212. The aggregated metrics may be routed on regular intervals for further processing.

3.2.5. Batch and Streaming Data Extraction

In some embodiments, metrics are extracted and logged in batches according to a schedule. For example, each metric can be batched prior to being sent to the HEC 220, and then subsequently routed over an HTTP-based protocol to the receiver 212. In some embodiments, batching can be automatically enabled by specifying one or more batching-specific properties, and then queue metrics to be sent to the HEC 220 according to those properties. For example, a token property can be a required property to use for batching, and an interval can be set to flush metrics at specified time intervals, such as every second, when a specific number of metrics have been queued, or when the size of queued metrics equals or exceeds a threshold amount. In some embodiments, the batching can be performed manually. In some embodiments, data is extracted and streamed to create a metric of the data for subsequent analysis.

3.2.6. Technical Add-Ons and Build Support

The technical add-ons ("add-ons") 224 can support metrics data. Add-ons can generally import and enrich data from any source, creating a rich data set that is ready for direct analysis or use in an application. The add-ons 224 can also be used to extend the capabilities of a data intake and query system. The add-ons 224 can be proprietary or open source technologies. In particular, an add-on is a reusable software component like an application but does not contain a navigable view. A single add-on can be used in multiple applications, suites, or solutions. The add-ons 224 can include any combination of custom configurations, scripts, data inputs, custom reports or views, and themes that can change the look, feel, and operation of metrics ingestion.

More specifically, the add-ons 224 can help to collect, transform, and normalize data fields from various sources. Examples of add-ons include Amazon Web Services (AWS) CloudWatch, Containerization (e.g., cAdvisor/Heapster), and Docker Remote API. In some embodiments, the add-ons 224 can adopt open platform communication (OPC), which is a platform-independent interoperability standard for secure and reliable exchange of data among diverse platforms from multiple vendors. OPC can enable seamless integration of those platforms without costly, time-consuming software development. In some embodiments, Google Cloud Platform (GCP) StackDriver Monitoring API can be adopted to collect metrics and metadata from, for example, AWS, hosted uptime probes, application instrumentation, and a variety of application components including Cassandra, Nginx, and Apache Web Server.

The disclosed embodiments include an add-on builder ("builder"), which is an application that helps users build and validate the add-ons 224 for a deployment. The builder can guide a user through all the steps necessary to create an add-on, including building alert actions, adaptive response actions, etc. In some embodiments, the builder uses best practices and naming conventions, maintains CIM compliance to reduce development and testing time while maintaining quality of add-ons. The builder can be used to validate and test an add-on to check for readiness and to identify limitations such as compatibilities and dependencies, and to maintain a consistent look and feel while still making it easy to add branding.

3.2.7. HTTP API Endpoint

In some embodiments, an HTTP API endpoint collector 226 is part of a modular subsystem that allows for creating custom scripts to access metrics using APIs of third-party vendors to stream the metrics data to the receiver 212.

3.2.9. Large Scale Data Collector Support for Metrics

The disclosed collections technologies may optionally include the large scale data collector (LSDC) 230 that supports metrics data. For example, the data intake and query system may include numerous modular input mechanism to stream metrics data from different collectors over one or more computer networks. A module input mechanism may include custom scripts that can call third-party APIs to pull large volumes of metrics data from distributed computing sources. For example, a data intake and query system may include multiple add-ons and HECs that are operable to collect metrics and/or non-metrics data.

The data intake and query system may experience congestion caused by the multiple data streams being communicated from multiple sources over networks to different modular inputs of the receiver 212. In some cases, congestion can be mitigated by using alternate routes to communicate the data to the receiver 212. However, congestion may persist due to receiving the multiple data streams by the same destination at the same time.

The LSDC 230 overcomes the drawbacks caused by collecting large amounts of data (e.g., metrics or non-metrics data) from numerous different computing sources over one or more networks. Specifically, the LSDC 230 can be a centralized process that manages multiple modular inputs that can receive multiple data streams from different sources. The LSDC 230 is a distributed task scheduler that can manage different APIs to coordinate scheduling across multiple collectors for one or more indexers, which can result in significant performance improvements. For example, the LSDC 230 can coordinate scheduling of various types of collectors such as any combination of add-ons and HECs. Thus, the LSDC 230 can avoid congested links and coordinate a uniform transfer schedule to improve utilization of available resources.

3.2.10. IT Services for Metrics Data

The disclosed embodiments include metrics data IT service intelligence (MITSI) services. MITSI services can be invoked to monitor metrics data for service health, to perform root cause analysis, to receive alerts, and to ensure that IT operations are in compliance with business service-level agreements (SLAs). MITSI services enable analysts to define services that model IT infrastructure or computing resources.

The MITSI services can perform monitoring and alerting operations and can help an analyst diagnose the root cause of performance problems based on large volumes of metrics data correlated to the various services an IT organization provides. In particular, the MITSI services can store large volumes of metrics-related data at ingestion time for later retrieval and analysis at search time, to perform regular monitoring or to investigate a service issue. An analyst can define an IT operations infrastructure from the perspective of the services it provides. A service can be defined in terms of entities used to provide the service, such as host machines and network devices. An entity is defined to include information identifying all metrics data that pertains to the entity, whether produced by the entity or another machine, and considering the ways that the entity may be identified by metrics data (e.g., source name, source type, and host). The service and entity definitions can organize metrics data around a service so that all metrics data pertaining to the service can be identified. This capability enables implementing metric key performance indicators (MKPIs).

MKPIs are defined for a service within an MITSI application. Each MKPI measures an aspect of service performance at a point in time or over a period of time. Each MKPI is defined by a search query that derives a MKPI value from the metrics data associated with the entities that provide the service. Information in the entity definitions may be used to identify the appropriate metrics at the time a MKPI is defined or whenever a MKPI value is determined. The MKPI values derived over time may be stored to build a repository of current and historical performance information for the service, and the repository itself may be subject to search query processing. Aggregate MKPIs may be defined to provide a measure of service performance calculated from a set of MKPI values; this aggregate may be taken across defined timeframes and/or multiple services. A service may have an aggregate MKPI derived from substantially all the service's MKPIs to indicate an overall health score for the service.

The MITSI services can facilitate producing meaningful aggregate MKPIs based on thresholds and state values. Different MKPI definitions may produce values in different ranges and, as such, the same value may indicate something different for different MKPI definitions. For example, an MITSI service can translate individual MKPI values into a common domain of "state" values such as "critical," "warning," "normal," and "informational." Thresholds set for particular MKPI definitions determine ranges of values for that MKPI that correspond to various state values. For example, a first range of MKPI values may be set as a "critical" state in the state domain. MKPI values from disparate MKPIs can be processed uniformly once they are translated into the common state values using the thresholds. For example, "normal 80% of the time" can be applied across various MKPIs. To provide meaningful aggregate MKPIs, a weighting value can be assigned to each MKPI so that its influence on the calculated aggregate MKPI value is increased or decreased relative to the other MKPIs.

During operation, MITSI services can recognize "notable metrics" that may indicate a service performance problem or other situation of interest. The notable metrics can be recognized by a "correlation search" specifying trigger criteria for a notable metric. For example, every time MKPI values satisfy a criteria, an application indicates a notable metric. A severity level for the notable metric may also be specified. Furthermore, when trigger criteria are satisfied, a correlation search may cause the creation of a service ticket in a metric IT service management (MITSM) system.

MITSI services can be particularly useful for monitoring or investigating service performance. Moreover, a metrics-aware UI can include interactive and navigable visualizations of MKPI information. Lastly, MITSI services can provide pre-specified schemas for extracting relevant values from different types of service-related metrics data. The disclosed embodiments enable users to define such schemas. In some embodiments, the metrics ingestion component can adopt machine learning methods to monitor and analyze the metrics data.

3.3. Metrics-Aware User Interface

A metrics-aware user interface (UI) (e.g., metrics-aware UI 214) is a means by which users and a data intake and query system interact. The metrics-aware UI can have interactive components that allow users to customize a deployment of the data intake and query system. The metrics-aware UI can include controls for users to configure operations of the data intake and query system involving a combination of collection mechanisms, data sources, and data types. For example, a user can selectively enable an HEC to collect application log data from a remote source and enable a StatsD collector to collect only metrics data from another remote source.

The metrics-aware UI can enable users to interact with any of the components of metric system 200. For example, the metrics-aware UI can enable users to interact with the metrics catalog 204, which can further interact with the other components of the system 200. As such, the metrics-aware UI can provide a user with an onboarding metrics management experience. As shown by the numerous illustrations discussed in greater detail below, the metrics-aware UI enables users to view, manage, add, and delete metrics-related data. For example, a user can select multiple options and mechanisms via the metrics-aware UI such as metrics dimensions to be collected or analyzed. In another example, the metrics-aware UI can also be used to enable or schedule ingestion times or search times.

A user can use the metrics-aware UI to request an analysis of any number of measures of any number or series of characteristics or dimension values, based on catalog or field extraction rules defined by the metrics catalog and search component 204. In some embodiments, the options available via the metrics-aware UI can be configured or monitored by another component of the data intake and query system. In some embodiments, a user can use the metrics-aware UI to define or specify options for metrics to be collected or analyzed. For example, the metrics-aware UI may enable users to define metric dimensions used by collection mechanisms to collect metrics data with the user-defined dimensions. A distributed management console (DMC) separate from, or included in, the metrics-aware UI can monitor a variety of performance information of the data intake and query system.

3.4. Metrics Ingestion

During ingestion, metrics data can be acquired over computer networks from remote computer systems. The metrics data can be ingested in any format and transformed into a multi-dimensional structure. The transformed metrics data may be referred to as pipelined metrics data, which typically includes numerous key values that populate the dimensions of the multi-dimensional structure. Ingestion can include techniques for processing metrics data received via collectors by receivers, such as indexers. The metrics data may include numerous metrics, where each metric has at least one or only one numerical value that represents a measurement. The received metrics may be structured data, semi-structured data, or unstructured data.

In some embodiments, a metric includes multiple key values and only a single numerical value that represents the measured characteristic of a computing resource. The numerical value can be a floating point value with multiple decimal place values depending on the precision of the measurement. Examples of a characteristic of a computing resource includes a utilization of a processor, a temperature of an electronic component, or a voltage reading of an electronic component. Unlike key values, numerical values (except zero) tend to be unique among all metrics.

In some embodiments, metrics can include any suitable measureable metric of one or more computing components. For example, a temperature metric can include dimensions such as time, location (latitude/longitude), and a value (e.g., in degrees); a pressure metric can include dimensions such as time, valve IDs, and a pressure value (e.g., in psi); IT monitoring metrics can include dimensions such as time, host, PID, and IT values such as CPU utilization or memory usage; an internal metric can include dimensions such as time, user, and a value such as search count; and a web access metric can include dimensions such as requestor IP, requestor method, requestor URL, and a value such as request duration or count. However, the embodiments are not limited to these types of metrics. Instead, the metrics can include any suitable performance measurement.

Figure 22:
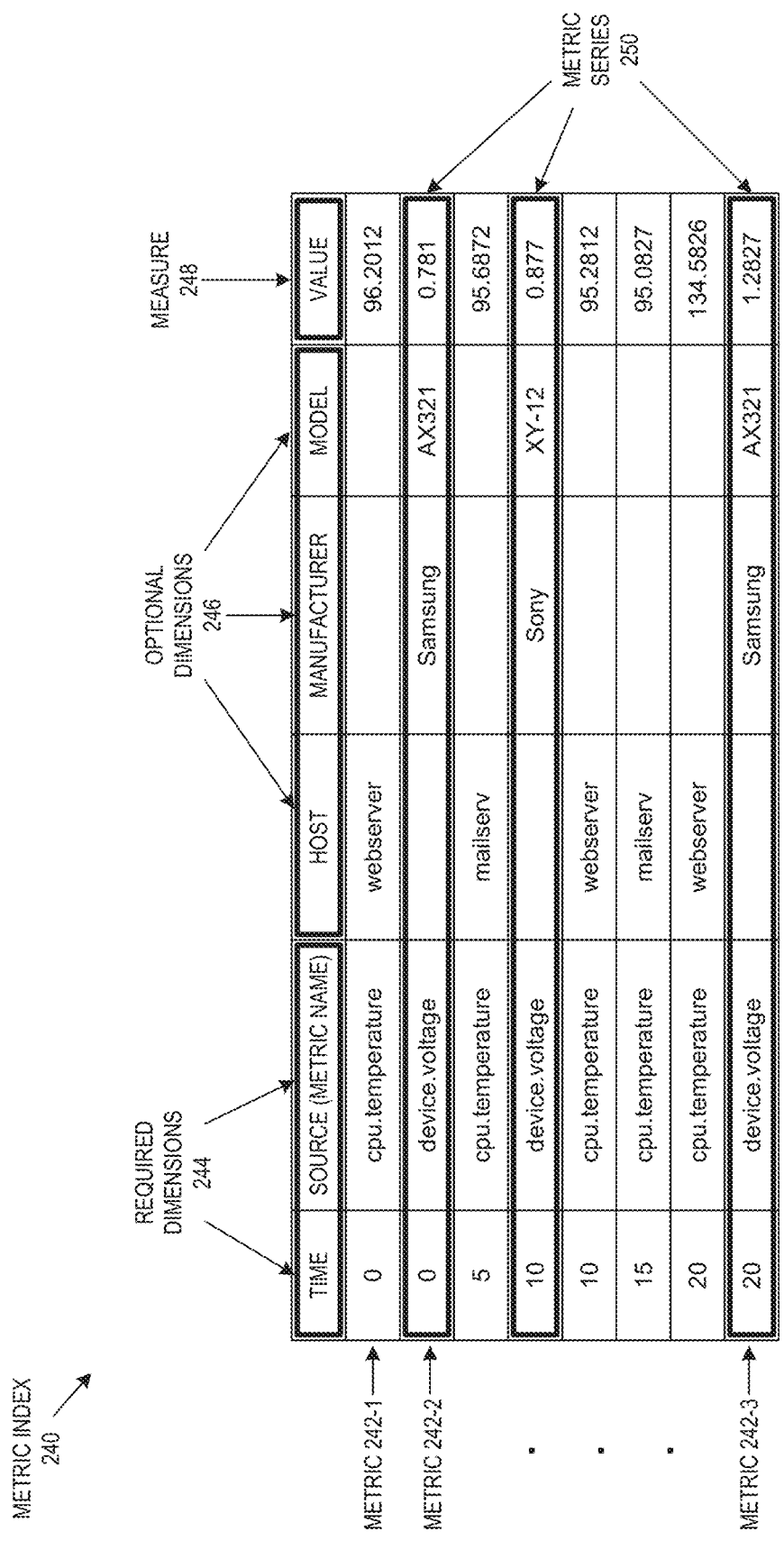
FIG. 22 illustrates an example of a metric index including ingested metrics according to some embodiments of the present disclosure.

FIG. 22 illustrates an example of a metric index 240 including multiple metrics according to some embodiments of the present disclosure. As shown, each metric 242 can be structured as an n-tuple record including required dimensions 244, optional dimensions 246, and a measure value 248. Examples of the required dimensions 244 include a time dimension or a name dimension. The time dimension includes a value indicative of a time when the measure value was taken. The name dimension includes a value indicative of a computing resource and the characteristic of that computing resource that was measured to obtain the measure value. The name dimension essentially repurposes the source field of time-indexed events to further enable the data intake and query to interchangeably handle metrics and non-metrics data seamlessly. In some embodiments, a user can set a dimension as a required dimension. For example, a source type dimension can be a required dimension by default or as set by a user.

Examples of the optional dimensions 246 include a host dimension, a manufacturer dimension, and a model dimension. The manufacturer and model dimensions are indicative of a manufacturer and a model of an electronic device used to obtain a measure value. Other examples of the optional dimensions 246 include geographical or relative descriptions of sources of metrics data such as a data center dimension with values that can include east, west, etc. Another example of an optional dimension is an address of the computing resource from which the measurement was taken. FIG. 22 merely shows examples of required or optional dimensions. However, the disclosed embodiments are not so limited. For example, the host or model dimensions may be required dimensions. In another example, the time or name dimensions may be considered dimensions.

The values of a required or optional dimension can include a string literal having a dotted hierarchy that represents a tag or name that provides metadata about the metric (e.g., technology—nginx, cloud environment—aws, cloud region—us-east-1a). For example, values of the name dimension can include "cpu.temperature" and "device.voltage." The metrics can be of different types, such as count, timing, sample, gauge, and/or sets (e.g., unique occurrences of events). The numerical values (i.e., measure values) of metrics can also be calculated values for a specific time resolution (e.g., count of 5xx errors for the last minute, sum, mean, upper 90th, lower 10th, etc.).

The metric index 240 illustrates an example of a structure for storing multiple metrics. The metrics ingestion component 202 can define any number of metric indexes for storing any number of ingested metrics. The metric index 240 is depicted in a table format and includes references to metrics data including required dimensions, optional dimensions, and measured values. In some embodiments, the metric index may be defined to analyze a set of metric values of interest to a user.

The metric index 240 includes a metric in each row of the table. The distinct metric of each row includes dimensions that are common to all the metrics of the index and some values for some of the dimensions. The dimension values correspond to key values included in the ingested metrics data. Each metric includes dimension values for each required dimension and measured values. The metrics also include optional dimensions, which can be defined by a user via, for example, a metrics-aware UI. In some embodiments, the user-specified dimensions may include the host, manufacturer, or model of machines (e.g., servers) used at the datacenter to take measurements. The user-specified dimensions may also include metadata.

The dimension values (i.e., metric key values) for each metric 242 include time values in the first leftmost column of the metric index 240, source values of the metrics in the adjacent column, some user-defined dimension values in the third through fifth columns, and the measurement numerical value 248 in the last rightmost column of the metric index. As indicated above, the source dimension may also be referred to as the metric name, which is indicative of the source of the measured value and/or the type of measured value. The optional dimensions of the metric index are a host, manufacturer, and model, which are associated with machines used to obtain the measured values.

In the metric index 240, a first metric entry has a measured CPU temperature value of 96.2012, at time 0 for a webserver. The webserver value is the only optional dimension value of this metric. The next metric entry is a device voltage value of 0.781, at time 0 of an unknown host, measured by a device manufactured by Samsung having a model number AX321. The metric index includes six other metric entries having values for each required dimension and measure, and some values for some optional dimensions.

The metric index 240 also includes different series of metrics for respective computing resources. Specifically, the metric index 240 includes a device.voltage series 250 of measurements taken by different devices at times 0, 10, and 20. The metric index also includes a cpu.temperature series of measurements of a webserver at times 0, 10, and 20. As shown, each series has time ordered values, and a particular series has different values for optional dimensions. For example, the device.voltage series has different user-specified dimension values (e.g., manufacturer and model values).

Thus, the metrics can collected and routed to receivers of the data intake and query system are ingested and processed to store in structures such as multi-dimensional metric indexes. Examples of receivers include indexers that receive metrics data routed from forwarders or any other collection mechanism. Another example of a receiver is the forwarder itself, which may also have capabilities to index metrics data. Although shown collectively in a metric index, the ingested key values that are used to populate dimensions may be stored separately or can be included in multiple indexes. For example, the ingested key values of each metric may be stored separately and can be collectively displayed in one or more metric indexes. In another example, the key values for each metric may be stored separately on a per key basis.

During ingestion, the pipelined metrics can be tagged with index values indicative of the indexes where the metrics are to be stored. An index value can be used by the data intake and query system to group metrics together into a metric index used for subsequent search and analytics operations. Then, during indexing, an indexer (or other receiver with indexing capabilities), such as the indexer 46 of FIG. 4, can index the metrics using similar operations that are described in connection with machine data discussed with respect to FIG. 4.

In some embodiments, the pipelined metrics are streamed to index processors, which can handle metrics in different ways. For example, for active real-time searches, separate real-time search processes connect the index processors to a management port, to route the metrics satisfying the real-time searches as streams from the index processors to the management port as search results. The process for real-time searches is described in greater detail below.

In some embodiments, the pipelined metrics can be alternatively or additionally written to a journal structure on a disk. In some embodiments, the journal is structured as a list of metrics that can be compressed or optimized to reduce the required amount of storage. A metric-series index (msidx) file can be populated with key-values and numerical values of the metrics. For example, the metrics can be asynchronously batched into a msidx file for an indexer. The msidx file is used to process subsequent historical searches. The process for performing historical searches is described in greater detail below.

The data received by a receiver may include metrics or non-metrics data including meta values indicative of a source, source type, or host from which the data was obtained. As such, metrics data represents a subset of all the types of data that can be ingested by the data intake and query system. In some embodiments, the meta values can be used to determine how to process the data. For example, data having different source types may be processed differently, and data having the same source type may be grouped and processed the same way.

The ingested metrics data can be distinguished over non-metrics data because metrics data has unique properties that are different from other types of data. For example, the source values of metrics map to metric names indicative of a type of measurement and computing resource. In contrast, the source values of other types of data can be merely indicative of physical or logical structure from which the data was obtained. Moreover, metrics can be structured or semi-structured data that does not include raw data. In contrast, other types of data that are processed into events include raw data. Thus, metrics may not be or include unstructured data or may be constrained to have certain necessary or optional dimensions.

In operation, receivers of the data intake and query system can open network ports that receive metrics data from collectors such as a StatsD collector or a universal forwarder. As metrics stream into the opened ports, rules based data extraction capabilities are used to delineate the metrics, transform them into a specified structure, and move them to specified locations. In some embodiments, the data intake and query system may include operators specifically designed to exclusively process structured metrics data, rather than using general processing techniques that can process non-metrics and metrics data. For example, operators can be designed specifically to process StatsD data. In some embodiments, operators enable tagging ingested metrics data to improve or expand processing or search capabilities.

The received metrics data from different collectors is parsed to extract key values mapped to the multi-dimensional data model for metrics described above. For example, each time, source, source type, and host associated with a measured value is mapped into the dimensions of a metric. As a result, the data intake and query system can ingest very large volumes of data, having metrics structured in different formats, and convert all of them into the same common format described above. The formatted metrics can then be arranged into one or more metric indexes for subsequent processing, search, and analysis. For example, the metrics or data derived from the metrics can be catalogued for subsequent search and analysis of metrics data and non-metrics data in a uniform manner, as described in greater detail below.

Figure 23:
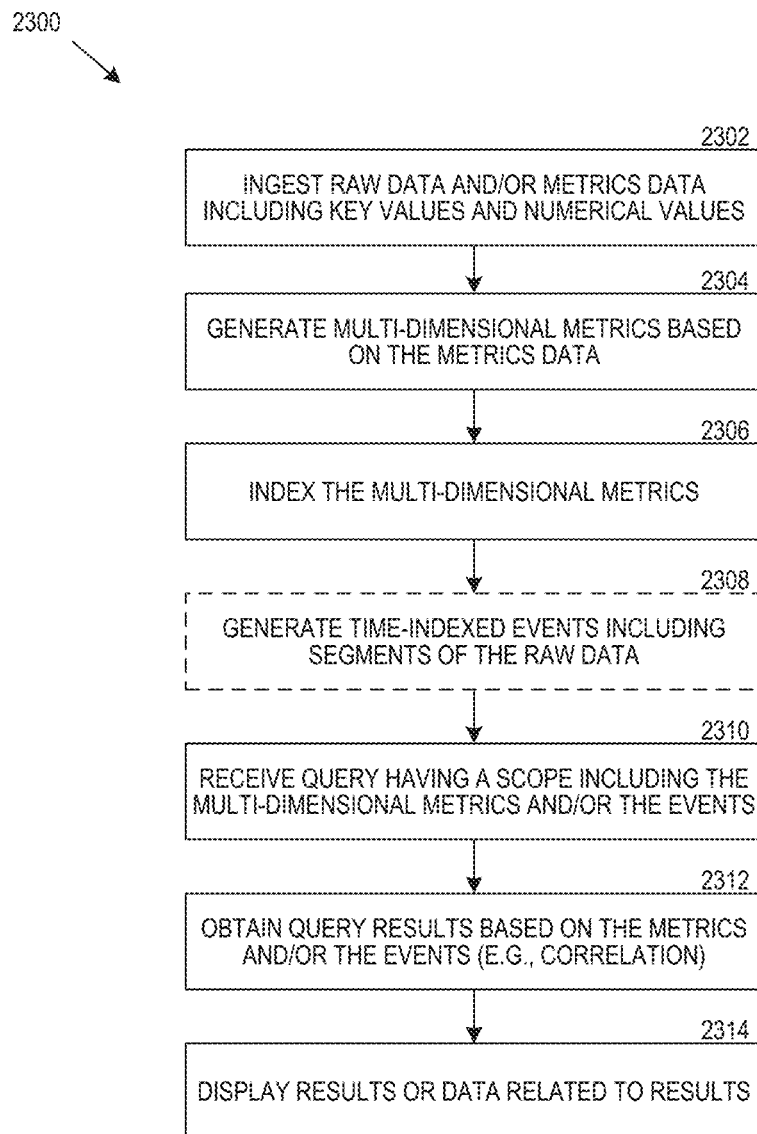
FIG. 23 is a flow diagram illustrating a method for ingesting metrics data according to some embodiments of the present disclosure.

FIG. 23 is a flow diagram illustrating a method for ingesting metrics data (e.g., semi-structured data or structured metric data) according to some embodiments of the present disclosure. The method 2300 is performed, at least in part, by a data intake and query system. In step 2302, a data intake and query system ingests collected data including metrics data including key values and numerical values, where each numerical value (e.g., floating point value) is indicative of a measured characteristic of a computing resource. Examples of a characteristic of a computing resource include a utilization of a processor, a temperature of an electronic component, or a voltage reading of an electronic component. In some embodiments, the metrics data is received by the data intake and query system over a computer network from remote computer systems.

In some embodiments, the data intake and query system can cause the collection of the data from different sources by using different types of collection mechanisms. For example, a universal forwarder can be configured to collect the data selected from a group consisting of only raw data, raw data and structured metrics data, and only structured metrics data. In some embodiments, a heavy forwarder can be configured to collect and locally index collected data selected from a group consisting of only raw data, raw data and structured metrics data, and only structured metrics data. The universal or heavy forwarders can then forward the collected data to the data intake and query system.

In some embodiments, a collection mechanism includes a script running on a remote computer system configured to collect the metrics data from an application running on the remote computer system, where the script is included in the application (e.g., an HEC). The data intake and query system then receives the metrics data over an HTTP-based connection of a computer network.

In some embodiments, a collection mechanism includes a background process (e.g., daemon) of a remote computer system configured to collect the metrics data from an application running on the remote computing system, where the background process is independent of the application. The data intake and query system then receives the metrics data over a computer network.

In some embodiments, the collection mechanism includes a StatsD collector running on a remote computer system configured to collect metrics data and/or aggregate metrics data from the remote computing system. The data intake and query system then receives the metrics data and/or aggregate metrics data over a computer network.

In some embodiments, the collection mechanism is an add-on reusable software component. The data intake and query system then receives the collected metrics data over a computer network. In some embodiments, the collection mechanism involves calling an API of a remote computer system to send the metrics data to the data intake and query system over a computer network.

In some embodiments, the data intake and query system can use a large scale data collector (LSDC) to coordinate the collection of data from different sources. For example, the LSDC can schedule the transfer of the metrics data collected by multiple collectors from multiple remote computer systems, and the data intake and query system can then collect the metrics data over a computer network in accordance with the schedule.

In step 2304, the data intake and query system generates metrics from the metrics data, where each metric has dimensions populated with at least some of the key values and at least one or only one of the numerical values. Further, one of the dimensions is a name dimension indicative of the measured characteristic and the computing resource of the at least one or only one numerical value.

In step 2306, the data intake and query system indexes the metrics by at least one of the dimensions. In some embodiments, the dimensions are required dimensions that must have values and/or optional dimensions that can have values. An example of required dimensions is a time dimension including a value indicative of when a measured characteristic was measured. Examples of optional dimensions include a host dimension, a manufacturer dimension, or a model dimension. In some embodiments, the optional dimensions were specified by a user before or after ingestion of the metrics data. Moreover, in some embodiments, at least some of the numerical values are indicative of a time series of measured characteristics of the same computing resource.

In some embodiments, the data ingested by the data intake and query system can be machine-generated data. As such, in step 2308, the data intake and query system can also generate events indexed by timestamps, where each of the events includes a respective segment of the raw machine data.

In step 2310, the data intake and query system can receive a search query having criteria indicative of a queried dimension. In some embodiments, the search query is input by a user and expressed as an SPL command.

In step 2312, the data intake and query system can obtain search query results based on the queried dimension. In some embodiments, the queried dimension is a required dimension or an optional dimension.

In some embodiments, the query results may require a correlation of metrics data and data from the time-indexed event. As such, the data intake and query system can extract field values from the segments of raw data of the events based on the criteria and correlate the extracted field values and the search query results to obtain correlation results. Lastly, in step 2314, the search results (or correlation results) or data indicative of the search results (or correlation results) can be displayed on a display device.

In some embodiments, metrics can be generated from ingested time-indexed events that include raw data. Specifically, raw data received by the data intake and query system is processed to create events that are time-indexed and stored as detailed above. Then, the events can be further processed to create multi-dimensional metrics as shown in FIG. 22. For example, a query applied to time-indexed events can extract key values from fields of raw data included in the events. The extracted key values can be used to populate dimension values and numerical values of metrics. Hence, the metrics created from unstructured data can have the same multi-dimensional structure as events generated from structured data.

Specifically, ingested raw data can be processed into metrics having an n-tuple of elements including a timestamp, a metric name, a measured numerical value, and many other dimensions as represented in FIG. 22. For example, log data can be stored as time-indexed events and then processed to extract field values used to populate metric dimensions. In some embodiments, the extracted field values from time-indexed events can be incorporated into metrics that have the same format as the structured metrics collected from remote sources. By processing the structured metrics and/or raw data to obtain metrics having the same specified format, resulting metrics can be correlated to obtain new insights about, for example, the performance of computing resources.

Figure 24:
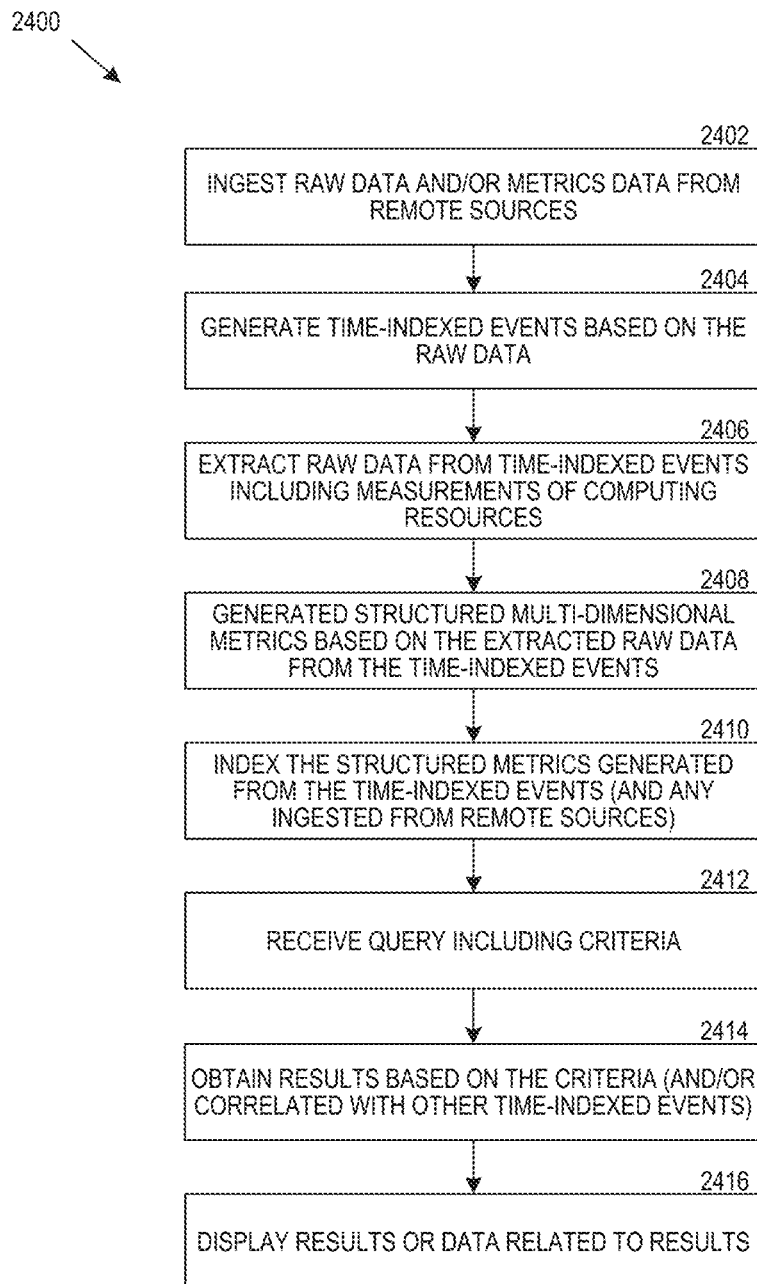
FIG. 24 is a flow diagram illustrating a method for creating metrics data from ingested events according to some embodiments of the present disclosure.

FIG. 24 is a flow diagram illustrating a method for creating metrics data from ingested events according to some embodiments of the present disclosure. The method 2400 is performed, at least in part, by a data intake and query system. In step 2402, the data intake and query system ingests data obtained over a computer network from remote computer systems. The data can include raw data (e.g., machine-generated data) and can additionally include structured metrics data.

In some embodiments, the data is collected using different types of collection mechanisms running on, for example, the remote computer systems. The collected data is then forwarded to the data intake and query system. For example, a universal forwarder running on a remote computer system can be configured to collect raw data and/or structured metrics data. In some embodiments, a heavy forwarder running on a remote computer system can be configured to collect and locally index the collected data, where the collected data is raw data and/or structured metrics data. The universal or heavy forwarders then forward the collected data to the data intake and query system.

In some embodiments, a collection mechanism (e.g., an HEC) includes a script running on a remote computer system configured to collect raw data and/or structured metrics data from an application running on the remote computer system, where the script is included in the application. The data intake and query system then receives the raw data and/or structured metrics data over an HTTP-based connection of a computer network.

In some embodiments, a collection mechanism includes a background process (e.g., daemon) of a remote computer system configured to collect raw data and/or structured metrics data from an application running on the remote computing system, where the background process is independent of the application. The data intake and query system then receives the raw data and/or structured metrics data over a computer network.

In some embodiments, the collection mechanism includes a StatsD collector running on a remote computer system configured to collect metrics data and/or aggregate metrics data from the remote computing system. The data intake and query system then receives the metrics data and/or aggregate metrics data over a computer network.

In some embodiments, the collection mechanism is an add-on reusable software component, and the data intake and query system receives the collected metrics data over a computer network. In some embodiments, the collection mechanism involves calling an API of a remote computer system to send the metrics data to the data intake and query system over a computer network.

In some embodiments, the data intake and query system can use a large scale data collector (LSDC) to coordinate the collection of data from different sources. For example, the LSDC can schedule the transfer of the data collected by multiple collectors from multiple remote computer systems, and the data intake and query system can then collect the data over a computer network in accordance with the schedule.

In step 2404, the data intake and query system generates time-indexed events from the received raw data. In particular, each event has a timestamp and a segment of the raw data. The events can be indexed by their timestamps. In some embodiments, the timestamp of a time-indexed event is derived from the raw data it contains.

In step 2406, the data intake and query system extracts field values from the raw data of the time-indexed events. The extracted field values include numerical values (e.g., floating point values), and each numerical value is indicative of a measured characteristic of a computing resource. Examples of a measured characteristic of a computing resource include a utilization of a processor, a temperature of an electronic component, or a voltage reading of an electronic component.

In step 2408, the data intake and query system generates structured metrics based on extracted field values of the time-indexed events. Each structured metric has multiple dimensions that are populated with the extracted field values, and includes at least one or only one of the numerical values. A name (i.e., source) dimension of the multiple dimensions is indicative of a measured characteristic and a computing resource of the numerical value. In some embodiments, the data intake and query system re-purposes its processing of the source field of time-indexed events to process the name dimension of the metrics.

In some embodiments, the dimensions are required dimensions that must have values and/or optional dimensions that can have values. An example of a required dimension is a time dimension including a value indicative of when a measured characteristic was measured. Examples of optional dimensions include a host dimension, a manufacturer dimension, or a model dimension. In some embodiments, the optional dimensions are specified by a user before or after ingestion of the data. Moreover, in some embodiments, at least some of the numerical values are indicative of a time series of measured characteristics of the same computing resource.

In step 2410, the data intake and query system indexes the structured metrics. For example, the structured metrics may be indexed by the values of their name dimensions. In some embodiments, the data intake and query system can index both the structured metrics generated based on the time-indexed events and any other structured metrics that have been structured in the multi-dimensional format described above.

In step 2412, the data intake and query system receives a search query having criteria indicative of a queried dimension of the multiple dimensions. For example, the search query may be input by a user and expressed in a pipelined search language. In some embodiments, the scope of the search query may include time-indexed events and/or metrics data.

In step 2414, the data intake and query system obtains search results based on, for example, the queried dimension. In some embodiments, the search is performed on either or both the structured metrics generated based on the time-indexed evens and structured metrics received from other sources over, for example, a computer network. In some embodiments, the search results involve performing a correlation of the search results from the metrics and time-indexed events other than the time-indexed events from which the metrics were generated. Lastly, in step 2416, the search results (e.g., correlation results) or data indicative of the search results are displayed on a display device.

The ability of the data intake and query system to process unstructured, semi-structured, and structured data improves performance and scalability over existing systems that process unstructured data separately from other systems that process structured data. As a result, the disclosed technology expands the capabilities of data intake and query systems to provide insights into metrics data or non-metrics data, as well as correlations of metrics and non-metrics data to better understand system performance, instabilities, and vulnerabilities.

3.5. Hash Bucketing

As an indexer indexes data, it can create a number of files that collectively constitute an index. The files can include tsidx or msidx and/or journal files that reside in directories referred to as buckets. An index can reside across many buckets. Buckets can contain newly indexed data or previously indexed data. A bucket may have a time range defined for the data it can contain. The bucket can move through several stages as its data ages in accordance with aging policies. The stages may include "hot," "warm," "cold," "frozen," and "thawed." The aging policies may be index-specific.

As buckets age, they "roll" from one stage to the next. Data actively being indexed goes to a hot bucket, which is searchable. The hot bucket "rolls to warm" when certain conditions occur (e.g., hot bucket reaches a maximum size), and a new hot bucket is created. Warm buckets are searchable, but are not actively written to. When other conditions occur (e.g., index reaches maximum number of warm buckets), the warm bucket "rolls to cold." The oldest warm bucket is typically rolled to cold. After a set period, a cold bucket rolls to frozen such that it gets either archived or deleted. If the frozen bucket is archived, it can later be thawed. Thawed buckets are searchable.

An indexer can index data across many indexes, where each index can define a partition of the data. Each index can have its own directories with subdirectories that categorize buckets by stage (e.g., hot, warm, cold, thawed). The buckets are subdirectories within those directories. The paths for the hot, warm, cold, and thawed buckets may be configurable such that cold buckets can be stored in a separate location (e.g., in secondary memory) from hot or warm buckets (e.g., in primary memory).

Buckets can be clustered or non-clustered. A standalone indexer creates non-clustered buckets. An indexer that is part of an indexer cluster creates clustered buckets. A clustered bucket can have multiple copies. A naming convention used for clustered buckets can distinguish between types of copies (e.g., originating or replicated). A variety of naming conventions can be used to identify a bucket, its stage, and whether it is clustered. For example, a name of a non-clustered hot bucket may have the format "hot_v1_<localid>", where "<localid>" is an identifier of the bucket. In another example, naming conventions for clustered buckets in a particular stage may additionally include timestamp information indicating the age of data in a bucket, and a globally unique identifier (e.g., unique to the deployed system).

The data intake and query system may implement various policies for creating hot buckets. The policies may limit the number of hot buckets and/or a time range per bucket, which constrains creating hot buckets at ingest time. The data intake and query system can implement heuristics to determine the creation of hot buckets in light of these and other constraints. The hot buckets are created along a time dimension to facilitate processing time based queries by avoiding the need to search buckets that are not part of the queries. Thus, the heuristics are implemented at ingest time to create hot buckets, when necessary, by a time dimension.

During search time, a search head can search buckets of a number of indexes to retrieve query results. By organizing data into one or more indexes having one or more buckets, each spanning a certain time range and organized by age, the data intake and query system can search particular buckets while avoiding the need to search other buckets. Since queries are typically targeted at specific time ranges, having buckets partition by time ranges avoids the need to search buckets not including the specified range. For example, in some embodiments, only hot or warm buckets having a time range overlapping the time range of the search query would be searched. A search head can search several indexers having particular indexes (i.e., partitions of data) to a hot path (e.g., hot buckets in primary memory) and/or a cold path (e.g., cold buckets in secondary memory).

The use of time-based buckets improves processing of time-based queries. Specifically, a data intake and query system can store non-metric data such as time-indexed events in buckets having limited time ranges. As a result, the data intake and query system only needs to search certain time-indexed events in certain time-based buckets for certain time-based queries. However, the nature of metrics data is such that users may seek to query for metrics along a dimension other than time. For example, an analyst may seek to search metrics by source. As a result, searching metrics by source in time-based buckets can be complex and inefficient because metrics from the same source can be indexed in different time buckets at index time.

To overcome these drawbacks, the disclosed embodiments include at least one hash bucketing technique. A hash bucket is hashed-based rather than time-based. In particular, a hash bucket is associated with a hash value for a primary partition key. Examples of a primary partition key can include a source, a source type, a host, an arbitrary key, or combinations thereof. In some embodiments, a primary partition key and/or combinations of primary partition keys are specified by a user before ingestion.

The data intake and query system can implement policies for creating hash buckets based on primary partition keys. For example, user-selected primary partition keys can be added to policies used at index time to create hash buckets. At index time, the data intake and query system can run a hashing algorithm to generate hash values from primary partition key values of data being ingested. Each hash value can define the scope of data written to its hash bucket. Subsequently ingested data that has the same hash values can be written to the same hash bucket.

In some embodiments, the primary partition key can be determined before index time or dynamically at index time depending on the type of data being ingested. For example, the disclosed hash bucket techniques may be enabled only when metrics data is being ingested (e.g., as detected) or otherwise disable by default when non-metrics data is being ingested.

For example, the data intake and query system can hash a source key, rather than using a time dimension to partition buckets. Then, metric data having the same source values can be written to the same hash buckets. In these cases, the use of hash buckets can improve query processing compared to using time buckets, when data is searched for the primary partition key rather than the time dimension.

In some embodiments, hash buckets can be partitioned by time in addition to one or more primary partition keys. As such, multiple hash buckets with different time range values that are associated with the same primary partition key value can coexist. For example, source-based hash buckets can be limited by a time range such that metrics data from the same source can be written to different source-based hash buckets having different time ranges. In some embodiments, however, hash bucketing techniques are enabled only when time coherent data is being ingested. For example, metrics data may be received in real-time such that there is a natural time coherence to the metric data. As such, partitioning buckets by time may be unnecessary.

During index time, heuristics determine when to create new hash buckets that will store the data being ingested. The heuristics implement the policies setting the primary partition keys used for generating hash values of the hash buckets. In some embodiments, the heuristics can be relatively simple or complex algorithms that consider various constraints when determining whether to create hash buckets and/or the size of the hash buckets. For example, the heuristics may include constraints by policies that limit the number of active hash buckets and size of each hash bucket. The heuristics may consider other rules, limits, or constraints such as computing resource constraints, processing constraints, or any user specified constraints to determine when to create new hash buckets.

The disclosed embodiments can also include a quarantine bucket. During ingestion, the quarantine bucket collects data having anomalous time values. For example, data that has a time value substantially or significantly greater than the median time value of data being ingested could be relegated to a quarantine bucket. In some embodiments, an anomalous time value may be determined relative to a preselected time value or preselected range of a hash bucket or expressed as a rule in a time policy. In some embodiments, the quarantine bucket does not hash on a primary partition key. As such, for example, when the primary partition key is a source key, metrics data of different sources can be written to the same quarantine bucket.

During search time, a search head can search the hash buckets of a number of indexes. By implementing a quarantine bucket, anomalous data can be excluded from searching, which can minimize the amount of data being searched and avoid obtaining skewed search results. In some embodiments, the quarantine bucket can also be searched at search time to retrieve the anomalous data associated with the primary partition key. In some embodiments, any data retrieved from the quarantine bucket can be tagged to distinguish that data from other search results to facilitate understanding the relative significance of the anomalous data.

Hash bucketing can be implemented for metrics data or non-metrics data. By organizing data into one or more indexes having one or more hash buckets organized by age, the data intake and query system can efficiently search particular hash buckets and avoid the need to search other hash buckets. Specifically, partitioning buckets by a primary partition key dimension can avoid the need to search buckets that are not relevant to search criteria. A hash bucket can be rolled from one stage to a next stage depending on whether certain conditions (e.g., age or size of bucket) occur. Similar to hot buckets, hash buckets can be searchable and actively being written to. In some embodiments, the hash buckets can be rolled into warm, cold, frozen, or thawed, and/or clustered in a similar manner as described above. In some embodiments, the naming conventions used for hash buckets may involve appending data indicative of the hash values to distinguish hash buckets from non-hash buckets.

Figure 25:
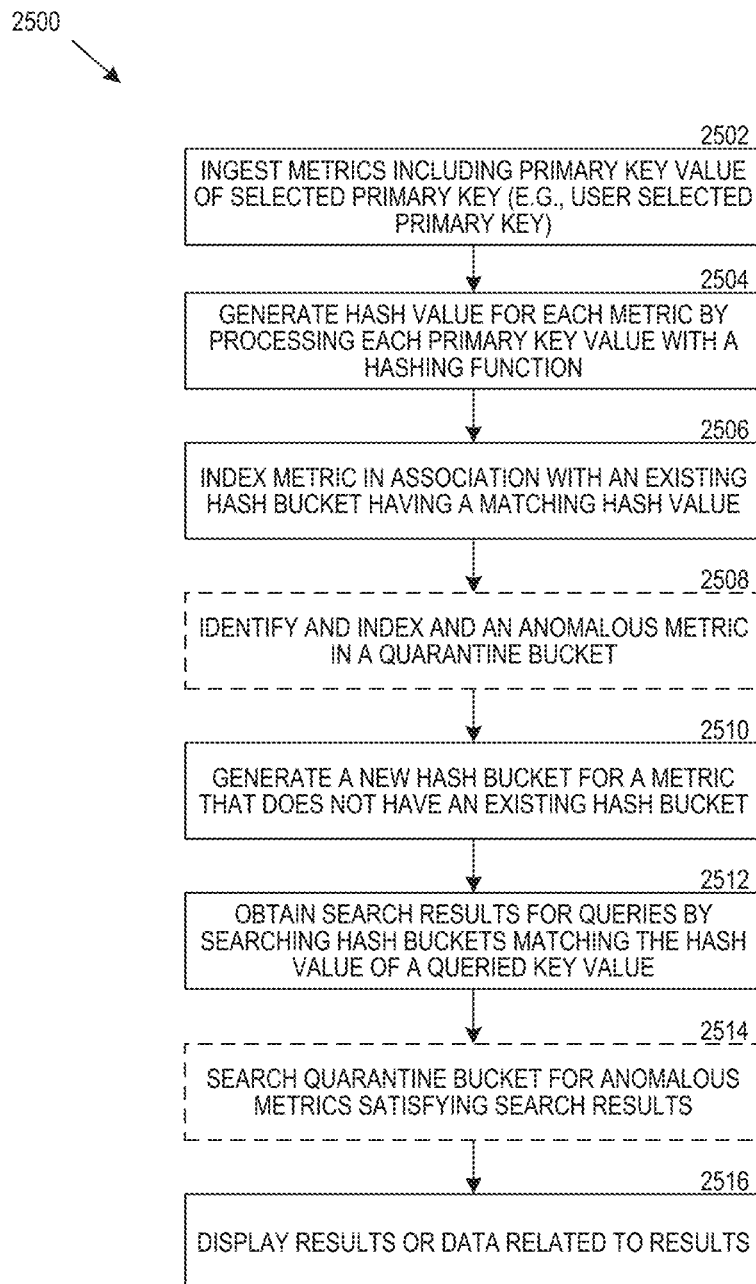
FIG. 25 is a flow diagram illustrating a method for hash bucketing according to some embodiments of the present disclosure.

FIG. 25 is a flow diagram illustrating a method for hash bucketing according to some embodiments of the present disclosure. Although described in the context of metrics data, the method illustrated in FIG. 25 can be implemented with any type of data including time-indexed events. The method 2500 is performed, at least in part, by a data intake and query system. In step 2502, the data intake and query system ingests metrics including key values and measured values. Each metric may include a primary key value of a selected primary key. For example, the selected primary key may be a source key, a host key, a source type key, or any arbitrary key selected by a user. In some embodiments, the selected primary key is included in a policy defining conditions for subsequently generating new hash buckets. In some embodiments, the primary key is not a time key. In other words, the hash buckets may not be partitioned in a time dimension.

In step 2504, a hash value is generated for each metric by processing each primary key value with a hashing function. The hashing function can be any hashing function known or not yet known to persons skilled in the art.

In step 2506, a metric can be indexed in association with an existing hash bucket having a matching hash value. In other words, a hash bucket that has a particular hash value associated with it can receive all the metrics having the same have value. As a result, the hash buckets of the data intake and query system can have a number of hash buckets partitioned by hash values of primary key values of the selected primary key. In some embodiments, the hash buckets age and can be rolled from hot to warm, and so on, when the hash buckets satisfy aging conditions.

In some embodiments, a quarantine bucket can be used to handle anomalous metrics. For example, in step 2508, the data intake and query system can identify an anomalous metric including an outlier key value relative to key values of other metrics. For example, a time value of a metric may be several standard deviations away from time values of related metrics. The anomalous metric can be stored in the quarantine bucket along with other anomalous metrics, irrespective of the hash values of any anomalous metrics.

In step 2510, the data intake and query system can generate a new hash bucket for a metric having a hash value that does not match an existing hash bucket. The new hash bucket can receive that metric and other metrics that have a hash value matching the hash value of the hash bucket. In some embodiments, the new hash bucket is generated in accordance with heuristics defining conditions that must be satisfied before generating the new hash bucket. The heuristics may be based on or related to user policies defining when to create new hash buckets.

In some embodiments, a new hash bucket is generated even if an existing hash bucket has a matching hash value when, for example, the size of the existing hash bucket exceeds a threshold value. In other words, a new hash bucket for the same primary source key value can be generated when an existing hash bucket is full. In some embodiments, a new hash bucket is generated even if an existing hash bucket has a matching hash value when, for example, a time value of a metric is not within a time range of the existing hash bucket. In other words, a hash bucket may be partitioned by time in addition to being partitioned by a primary key value. A new hash bucket may be created when a new metric having a matching hash value has a time value that is not within a designated time range of the matching hash bucket.

As a result, the data intake and query system can process subsequent queries by searching hash buckets having matching hash values of primary keys. For example, in step 2512, search results satisfying a search query indicative of a queried key value can be obtained by searching hash buckets matching the hash value of the queried key value. For example, a search query may specify a source, and the data intake and query system can search only through the hash buckets of that source, and avoid searching through other hash buckets that are not for that source.

In some embodiments, in step 2514, the data intake and query system can also search the quarantine bucket in addition to the hash buckets matching the hash value of the queried key value to obtain the search results. Lastly, in step 2516, the search results or data indicative of the search results can be displayed on a display device.

3.6. Metrics Stores

The metrics store component 210 can interact with the metrics ingestion component 202, the catalog and search component 204, and the metrics analysis component 206 to store metrics data and maintain and perform backend operations on metrics data, a catalog, and search and analysis results. In some embodiments, the metrics store component 210 includes one or more metrics stores analogous to the data stores for time-indexed events described above with respect to FIG. 4. The metrics stores can store metrics in accordance with the metric index data model described above. That is, ingested metrics can be stored in the metric index 240.

A metrics store may contain a number of metric indexes. The scope of each metric index may be defined by a user before ingestion of metrics data. For example, a metric index may have a scope limited by a range of time, a set of source types, or any dimension or data derived from a dimension. The metrics indexes of the metric store can be accessed by the system when performing queries with criteria that specifies metrics data. Moreover, the metrics indexes can be the basis for an in memory catalog of metadata, including data derived from the metrics, which enables rapid lookup, extraction, and analysis of metrics data contained in the metrics indexes.

3.7. Metrics Catalog

Figure 26:
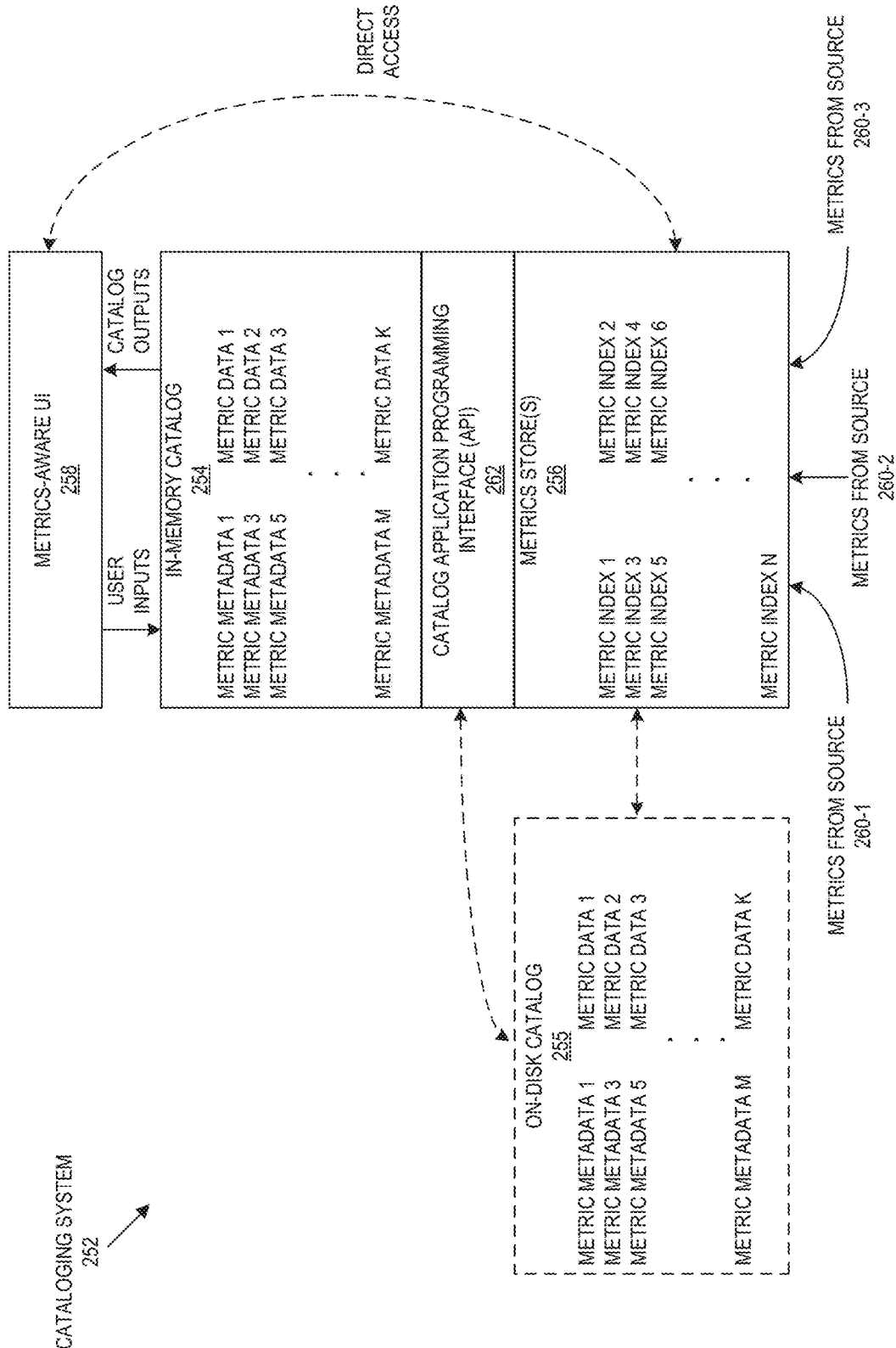
FIG. 26 is a block diagram illustrating a metrics cataloging system used to search and monitor metrics data according to some embodiments of the present disclosure.

The catalog and search component 204 can facilitate and improve search and analysis of metrics data stored in metrics stores. Further, the catalog is customizable to enable monitoring metrics and alerting users of monitored metrics. For example, FIG. 26 is a block diagram illustrating a metrics catalog system operable to search and monitor metrics data according to some embodiments of the present disclosure. The cataloging system 252 includes an in-memory catalog 254 ("catalog 254") that caches a catalog including metadata related to metrics data stored in a metrics store 256. The cataloging system 252 may also include an on-disk catalog including metadata related to metrics data stored in the metrics store 256. The metadata may be selected or defined by a user via the metrics-aware UI 258. The metrics-aware UI 258 sends user inputs to the catalog 254 and receives outputs from the catalog 254.

The user inputs may include queries submitted by a user as text input in a search field or by selecting controls or options displayed on metrics-aware UI 258. The metrics-aware UI 258 can return the outputs such as query results, which can be rendered in a variety of formats including visualizations that reduce the cognitive burden on users to understand and appreciate the insights obtained via the catalog 254. Details of the metrics-aware UI 258 and related use cases are provided further below.

The metrics data received from numerous sources 260 can be ingested and stored in one or more metric indexes of the metrics store 256 on secondary memory. As described above, a user can input an SPL command into a search field of the metric-aware UI 258 to directly access the metrics data stored in the metrics store 256, without using the catalog 254. However, the catalog 254 provides at least two improvements over techniques for directly accessing the metrics data from the metrics store 256. First, the catalog 254 provides in memory caching to enable rapid access to metrics or metrics related data. Second, the catalog 254 can store metadata to augment or enrich the metrics data contained the metrics store 256.

The catalog 254 can cache metrics data from the metric store 256 by calling an application programming interface (API) 262 to subsequently provide rapid access to the cached metrics data by reducing the need to access the metric store 256. The metadata stored in the catalog 254 can include user defined conditions (e.g., preferences, thresholds, or ranges) or rules related to the metrics data of the metrics store 256 such as schedule for monitoring metrics data, and/or alerts to notify a user about metrics that satisfy conditions. As such, the catalog 254 provides rapid access that can enrich the user experience of the metrics store 256, and the API 262 can be used to retrieve data from the metrics store 256 in accordance with the metadata stored in the catalog 254.

In some embodiments, the API 262 only manages operations related to the metadata. For example, the API 262 may manage read and write operations of metrics data (e.g., metadata) from the metrics store. Further, metric values can be retrieved from the metrics store by running searches in accordance with search commands (e.g., running SPL searches with mstats search commands). The cataloging system 252 may first try to obtain metadata directly from the in-memory cache; this process does not need to run a SPL-based query. However, the separate periodic process, which updates the on-disk metadata, may involve a SPL-based query.

In some embodiments, the cataloging system 252 may also include the on-disk catalog 255, in addition to the in-memory catalog 254. The data included in the in-memory catalog 254 may be related to the data included in the on-disk catalog 255. For example, the in-memory catalog 254 may have least some data in common with the on-disk catalog 255. In some embodiments, the API 262 only retrieves metadata from the in-memory catalog 254 or the on-disk catalog 255. In some embodiments, the data included in the on-disk catalog 255 can be retrieved from the metrics store 256. In some embodiments, the metrics-aware UI 258 can run mstats (and/or other SPL commands) queries behind the scenes to retrieve metric data from metric store 256 or the in-memory catalog 254 on the fly (e.g., for hot data, or real-time searches).

Using the on disk catalog 255 is advantageous for metadata that needs to run computationally expensive queries to get data from metrics index and configuration files. As such, the cataloging system 252 can store metadata in a separate system on disk, e.g. a file, a relational DB, a NOSQL data store, etc. The in-memory and on-disk metadata can be updated periodically with data from a metrics index and configuration files.

The cataloged metadata may have been directly extracted from the metrics store 256 or input via the metrics-aware UI 259 by users to customize the functionality of the cataloging system 252. Examples of the metadata extracted from the metrics store 256 may include dimensions or measure values. Examples of the metadata input by users includes rules or conditions causing retrieval of metric data from the metric store or reporting of particular metrics data that satisfies user specified conditions. For example, the catalog 254 may enable a user to navigate all dimensions of the metrics stored in the catalog 254 and to search across all of the metrics data by name and/or dimension metadata stored in the catalog 254. Further, the catalog 254 can integrate the search results with the analysis of other data, such as log events, to answer complex queries.

In another example, the user specified metadata may designate extraction rules for dimension values of metrics received from specified sources. The metadata input by users may also set thresholds or alerts for reporting metrics to the users that meet or exceed those thresholds. For example, user specified metadata may include a rule to alert a user when the measurement value of a named metric exceeds a threshold value. Thus, cataloging metadata enables searching for specified dimensions of metrics rapidly without needing to access the metric store 256 with every search.

In some embodiments, a user can submit a query for the catalog 254 as a number of commands expressed in SPL input to a search bar of the metrics-aware UI 258. In some cases, the SPL commands can be used to retrieve metrics data directly from the metrics store. In other cases, a user can submit a query in a non-SPL command to access data from the catalog but not the from the metrics store. The scope of the query may include metrics data and non-metrics data (e.g., time-indexed events). The catalog 254 can then determine whether to search the metrics data or non-metrics data or both, and further decompose the query to search the metrics data catalog 254 or store 256 and/or non-metrics data stores (not shown).

The catalog 254 understands the structure of a metric, including dimensions, time chart, and metadata and/or descriptions. As such, the catalog 254 can integrate the search results with an analysis of the metrics data and/or non-metrics data to answer queries, such as the dimensions available for a specified metric series, what metric series share a particular dimension, what logs are related to a particular metric series, what are the units for a particular measurement, etcetera.

The cataloging system 252 may enable users to perform management operations on metrics data. Examples of the management operations include editing and deleting metrics. In particular, the metrics-aware UI 258 can access the catalog 254 and enable a user to edit or delete selected metrics or related data. For example, a user can edit dimensions and/or dimension values of metrics. In response, the catalog 254 can store metadata such as flags indicating that metrics have been edited or deleted. Hence, the original metrics data stored in the metrics store 256 may persist despite being edited or deleted and will appear edited or deleted to users of the catalog 254. The catalog 254 can also enable a user to edit and delete metrics data such as dimensions, unit of measurements, scales, and other data.

The management operations include adding metrics metadata such as dimensions, unit of measurement, scaling information, and the like. For example, the catalog 254 can enable users to define or specify optional dimensions. A user-defined catalog configuration can be used to enhance one or more of the user experience (e.g., preferred visualization widget and configuration of widget), the type of aggregations or metric evaluation (e.g., using an evaluation command to convert bytes to GB) that can be applied to a series of measurements, or the type of analytics capability that can be applied (e.g., outliers, baseline, forecasting, etc.). In some embodiments, the catalog 254 can enable users to perform a front end evaluation of the metrics and transform units of their measurements as necessary (e.g., bytes to GB).

The catalog 254 can also enable a user to create metric metadata such as descriptions, relationships, and hierarchies of metrics or their parameters (e.g., dimensions or measures). For example, the catalog 254 can establish relationships among metrics stored in the metrics store 256. The catalog 254 can cache these relationships as metadata. A user can then analyze the relationships among metrics data in accordance with the cached metadata to rapidly obtain insights.

A user can designate a hierarchical structure including an arrangements metrics or related parameters at different hierarchical levels. The metrics related parameters may include computing resources from which measurements are obtained. Thus, a subsequent search for metrics data from one of these computing resources can return hierarchical metrics data indicative of insights about the relationship among the computing resources. In some embodiments, metadata indicative of the hierarchy can be temporarily stored in the catalog as a metric derived from other metrics. Thus, the catalog 254 can build an expanded set of metrics data from the original metrics data and store the expanded metrics data for subsequent searches and analysis.

The cataloging system 252 can have various use cases. Examples of the use cases are illustrated further below in the context of the metrics-aware UI 258. In one case, the catalog 254 can search and return an enumerate list of dimensions that are compatible with the given metric name. For example, a user may submit the metric name "cpu_user," and the catalog may return "host" and "data center" as dimensions that are compatible with the "cpu_user" metric name. In another case, the catalog 254 can search and enumerate metrics that have a given dimension. For example, a user can submit the dimension "data-center," and the catalog may return the metric names "cpu_user," "mem_free_bytes," and "disk_read_ops."

In another case, the catalog 254 can search and return an enumerated list of given dimension values. For example, a user may submit the dimension "IP," and the catalog 254 may return the values "10.1.2.3," "10.1.2.4," and "10.1.2.5." In other cases, a user can submit a query for all the metrics or dimensions available for inspection by that user, and the catalog 254 may return enumerated lists of those metrics or dimensions. In another case, a user can submit search queries by any dimensions, dimension values, or metric names, and the catalog 254 can return metrics data that satisfies the search queries. In yet another case, a user can submit a metric name, and the catalog 254 may return an enumerated list of all the functions that can be used to aggregate the named metric.

In some embodiments, the metrics catalog 254 can implement compression techniques for numerical values of metrics. Examples include delta-of-delta timestamps and XOR-based compression of the floating point values to reduce storage requirements and enable storing data in-memory, reducing latency, and improving query throughput.

Figure 27:
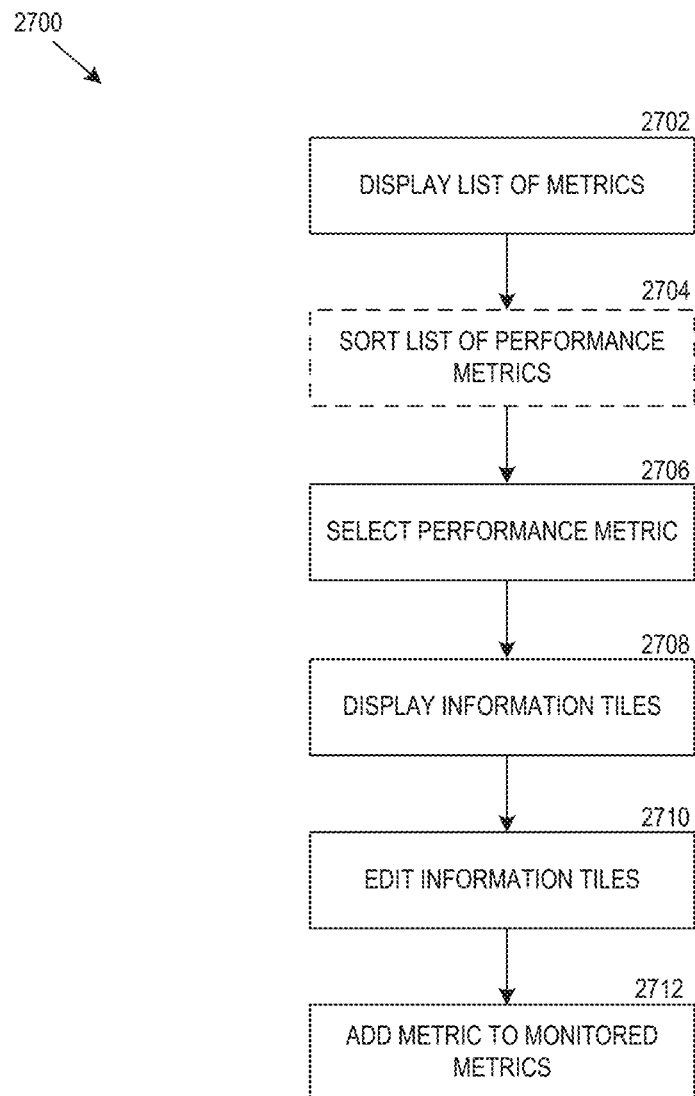
FIG. 27 is a flow diagram illustrating a method for using a catalog of metrics data according to some embodiments of the present disclosure.

FIG. 27 is a flow diagram illustrating a method for cataloging metrics data according to some embodiments of the present disclosure. The process 2700 is for selecting and configuring one or more metrics from a metric catalog for one or more components of an operational environment. In step 2702, a list of metrics is displayed on an interface to a user for selection. For example, the interface may be the metrics-aware UI 258 displayed on a display device. The list of metrics can include metrics related to one or more elements of the components of an operational environment. In some embodiments, the list of metrics is predefined. The metrics can include any suitable metric type, such as, for example, gauges, counters, histograms, and/or any other suitable metric type. In some embodiments, histograms are configured as gauges. In some embodiments, a gauge metric includes any metric that has a value that can go up and/or down across multiple samples, and a counter metric includes any metric that has a value that only increases across multiple samples. Additional and/or alternative metric types can be included.

In some embodiments, each listed metric can be configured to support one or more values per metric. For example, each metric can be limited to a single value per metric to provide simplification of data storage (allowing easy storage of metrics data), simplification of configuration for keys, allowing a single key to be excluded from indexing such that all other keys can correspond to dimensions, and simplification of data ingestion, allowing a single key for input value. In some embodiments, each metric has multiple values per metric.

In an optional step 2704, a user can sort the displayed list of metrics using one or more sorting mechanisms, such as an alphabetic sort, sorting by one or more aspects of the metrics, using a user defined search/sort term, and/or any other suitable sorting mechanism. In step 2706, the user selects one of the metrics from the displayed list.

In step 2708, one or more tiles or charts for the selected metric are displayed on the display device to the user. The one or more tiles can include elements of the selected metric, such as, for example, general information, metric measurement values, related dimensions, tags, transaction and/or other information related to the selected metric.

In step 2710, the user can edit one or more of the tiles presented at step 2708. For example, in some embodiments, a general information tile includes one or more aspects of the selected metrics that can be edited by a user, such as a type of the metric (e.g., gauge, raw number, percentage), a default display of the metric (e.g., line, bar), a unit of the metric (e.g., count, cycles, MB, GB), collection frequency, and/or any other aspect of the metric. For example, a user can edit the general information tile to set a collection frequency at a higher/lower frequency than provided as a default collection frequency.

In step 2712, the selected metric is added to a set of metrics monitored by one or more systems, such as a user dashboard of a SPLUNK® IT SERVICE INTELLIGENCE system. In some embodiments, the selected metric is added to a user workspace, which includes a set of user-selected metrics that are monitored by the user.

Figure 28:
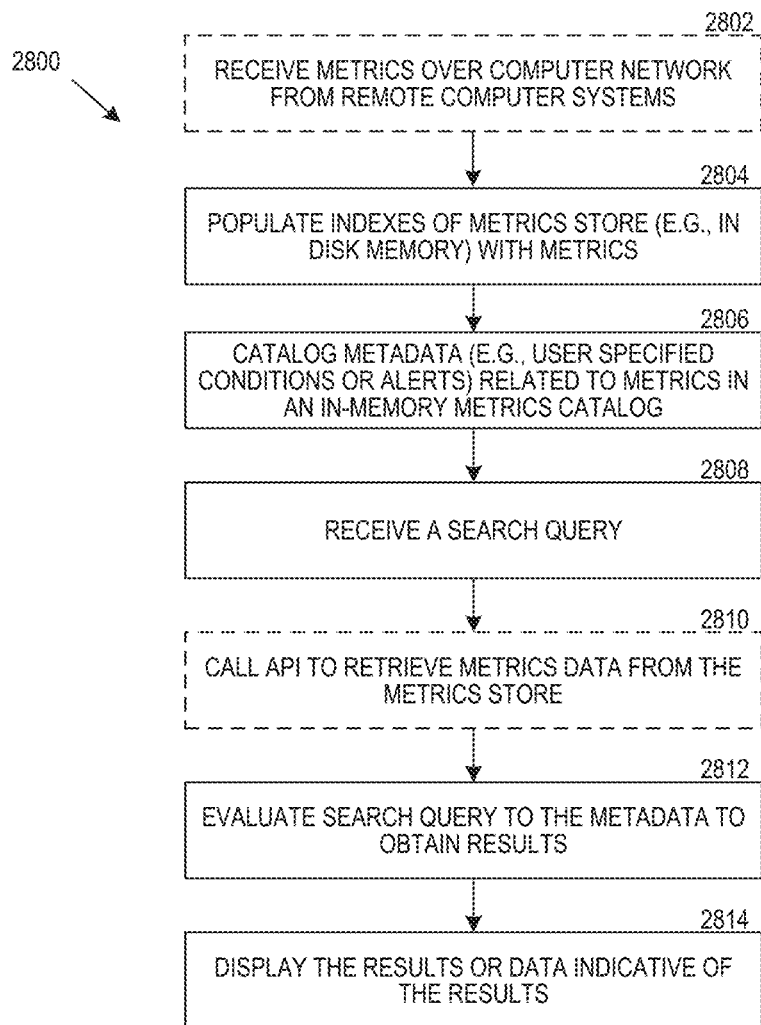
FIG. 28 is a flow diagram illustrating a method for in memory cataloging of data related to metrics in a metrics store according to some embodiments of the present disclosure.

FIG. 28 is a flow diagram illustrating a method for in memory cataloging of metadata related to metrics in a metrics store according to some embodiments of the present disclosure. The method 2800 is performed, at least in part, by a data intake and query system. The data intake and query system can obtain metrics data locally or from remote sources. For example, in step 2802, metrics are received by the data intake and query system over a computer network from remote computer systems.

In step 2804, indexes of the metrics store are populated with the received metrics, where each metric can include dimension values and a measure value. In step 2806, metadata is cataloged in an in-memory metrics catalog. The metadata is typically, but not always, related to the metrics in the metrics store.

In some embodiments, metadata is user specified and can indicate conditions causing the metrics catalog to automatically retrieve metrics data from the metrics store. In another example, the user specified metadata can include a threshold of a measure value for a particular metric, or a range of a measure value, or a preferred measure value for that metric. The metrics catalog can use these conditions to monitor metrics data in the metrics store, retrieve that metrics data for cataloging in the metrics catalog and, as such, make that monitored metrics data readily available for users via an in-memory system that avoids the need to access an in disk metrics store. In another example, the metadata can define a condition causing the display of an alert about a metric. As such, a user can be alerted when a measure value of a metric does or does not exceed a threshold value.

In some embodiments, the metrics catalog can be used to manage the metrics store. For example, a user can add, delete, or edit metrics data of a metrics store. However, rather than actually modifying the metrics store, metadata can be added to the metrics catalog that indicates a change to the metrics store. For example, deleting a metric of the metrics store via the metrics catalog may cause the metrics catalog to create and store metadata flagging that metric as being deleted without actually deleting the metric. The deleted metric will then appear as being deleted from the metrics store when using the metrics catalog, even though the metric has not been modified in the metrics store. In another example, metadata can indicate units (e.g., volts or millivolts) for a metric or type of metrics, which can be used to append related metrics or transform the units associated with that metric or type of metrics via the metrics catalog. In another example, the metadata may indicate a relationship (e.g., hierarchical relationship) between metrics in the metrics store such that the metrics catalog can present metrics data for the related metrics automatically to provide useful insights quickly.

In step 2808, the data intake and query system receives a query including search criteria. The query may be input by the user as an SPL command via a user interface. The data satisfying the search query can already be included in the metrics catalog. For example, data retrieved or derived from the metric store can be stored in the catalog or stored in the catalog. The data retrieved or derived from the metrics store can be obtained in accordance with a schedule such that metrics data is readily available for access from the in-memory catalog rather than needing to access the metric store, which may be in disk (or some other non-volatile memory).

For example, in step 2810, the data intake and query system can call an application programming interface (API) to retrieve metrics data from the metrics store, and the metrics data can then be cataloged in the in-memory metrics catalog. Although FIG. 28 shows metrics data being retrieved after a search query was received, the metrics data retrieved from the metrics store may be retrieved beforehand, in anticipation of the search query. For example, the metadata in the metrics catalog may indicate a metric or type of metric in the metrics store that should be monitored.

Metrics data of that metric can be retrieved from the metrics stored in accordance with the metadata such that a subsequent query regarding that metric can be addressed without needing to access the metrics store.

As such, in step 2812, the search query can be evaluated by applying the search criteria to the metadata or metrics data of the metrics catalog, to obtain results that satisfy the search criteria. Lastly, in step 2814, the results or data indicative of the results can be displayed on a user interface of a display device.

3.8. Metrics Analysis

The metrics analysis component 206 can generate a representation of metrics data for analysis such as one or more charts. Examples of charts include line charts, area charts, and column charts. In some embodiments, the metrics analysis component 206 can add time annotations to metrics data by overlaying discrete notable event streams onto the charts. In some embodiments, the metrics analysis component 206 can enable a user to visually correlate data across different generated charts.

In some embodiments, the metrics analysis component 206 can alert a user about possible problems with the metrics data by integrating alerting existing capabilities of the data intake and query system and/or additional customized alert actions specific to the metrics data. In some embodiments, the metrics analysis component 206 can set alerts by directly interacting with the generated charts.

Once the metrics data has been charted, the metrics analysis component 206 can analyze the data across any combination of all or part of the metrics data and machine generated data in real time. In some embodiments, the metrics analysis component 206 can perform statistical analyses of the metrics data based on the search results to generate advanced analytics on, for example, allocation, distribution, and utilization of the computing resources. In some embodiments, the metrics analysis component 206 can identify statistical outliers and/or anomalies of the metrics data based on standard deviations of the data through the statistical analyses. In some embodiments, the metrics analysis component 206 can forecast upcoming trends of, for example, the computing resources based on the statistical analyses of metrics data. In some embodiments, the metrics analysis component 206 can further perform inline metric discovery from a metrics catalog of metrics data generated by the catalog and search module 206.

3.9. Sharing of the Metrics Analysis

The metrics sharing component 208 can utilize or extend export capabilities of a data intake and query system to share results of a metrics analysis with another device or another user. In some embodiments, the results of the metrics analysis include one or more of reports, dashboards, or metrics charts generated by the metrics analysis component 206 in real time. The results of the metrics analysis can be exported in any format including, for example, CSV, PDF, PNG, and emails.

In some embodiments, the metrics sharing component 208 can integrate a collaboration model that can, for example, connect people, tools, processes, and automation into a transparent workflow with an instant messenger (IM) and push the results of the metrics analysis in the form of images to IM channels, such as web-based group chart services, e.g., HipChat/Slack.

3.10. Examples of the Metrics-Aware User Interface

Figure 30:
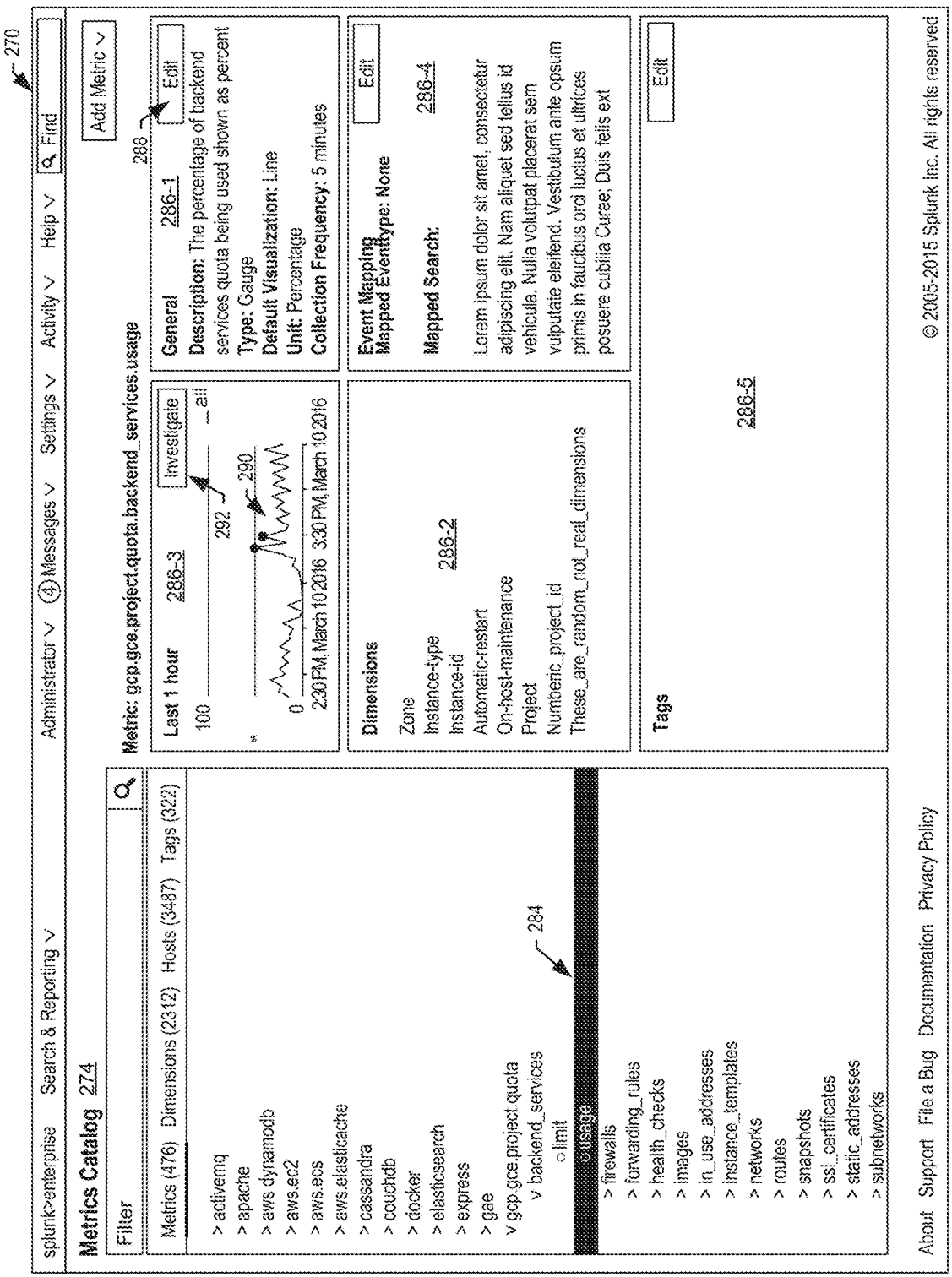
FIG. 30 illustrates a user interface screen of a metric catalog displaying a selected metric sources according to some embodiments of the present disclosure.
Figure 31:
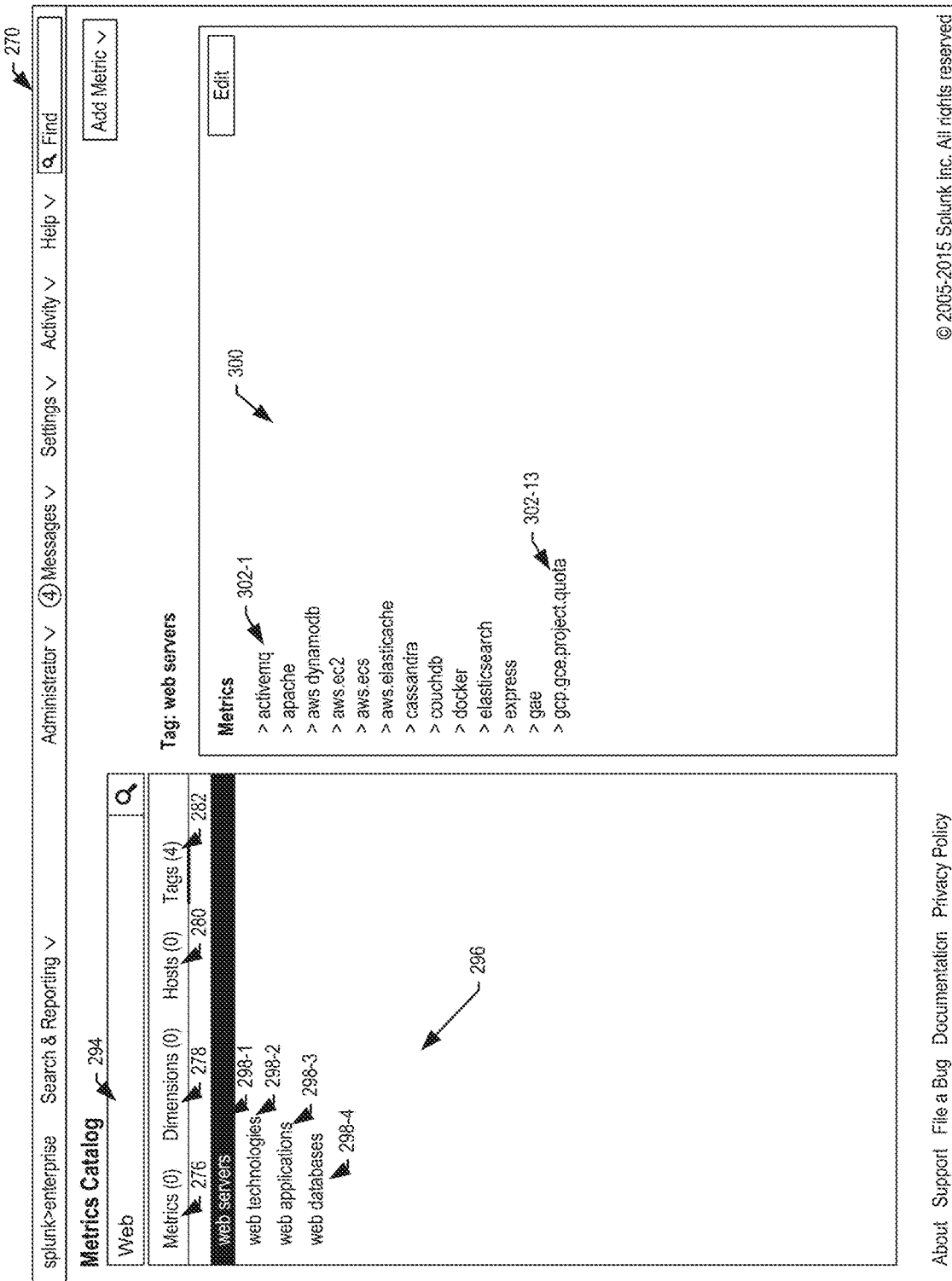
FIG. 31 illustrates a user interface screen of a metric catalog displaying filtering and/or searching of metrics according to some embodiments of the present disclosure.

FIGS. 29 through 31 illustrate a series of user interface screens of a metric selection interface 270. In some embodiments, the metrics-aware UI 258 may include interface 270. The interface 270 is configured to enable selection of a metric as discussed above with respect to the process 2700. The interface 270 displays a metric catalog list 272. The metric catalog list 272 includes one or more metrics, pertaining to architecture, task assignments, task-performance characteristics, resource states, and other components.

In particular, FIG. 29 illustrates a user interface screen of a metric catalog displaying a list of selectable metric sources according to some embodiments of the present disclosure. As shown, each metric in the metric catalog 274 can be grouped by one or more key identification options, such as by application 276, shared dimensions 278, host (or other system) information 280, tags 282, and/or any other suitable field identification options. The applications 276, shared dimensions 278, host information 280, and tags 282 can be determined by the one or more elements of an operational environment. The tags 282 can identify additional information about the metrics such as a class of application, a class of system, or a class of data structure that generates the metrics.

FIG. 30 illustrates a user interface screen of a metric catalog displaying a selected metric source according to some embodiments of the present disclosure. As shown, when a metric 284 is selected, the interface 270 displays one or more tiles 286. Each of the tiles 286 is configured to display a sub-set of information associated with a selected metric. For example, in the illustrated embodiment, the interface 270 includes a general description tile 286-1, a dimensions tile 286-2, a metrics data tile 286-3, an event mapping tile 286-4, and a tag tile 286-5. However, it should be appreciated that fewer, additional, and/or alternative tiles can be included on the interface 270. The general description tiles 286-1 is configured to display general catalog information of a selected metric 284, such as a description of the metric, a type (e.g., a numerical type such as gauge, value, percentage, aggregate value, etc.), a default visualization type (discussed in more detail below), a unit (such as a percentage, MB, GB, clock cycles, etc.), and a collection frequency. The description of the metric is configured to provide a user with a general overview of the event and/or machine-generated data represented by the metric.

In some embodiments, one or more parameters of the general description tile 286-1 can be edited by a user. For example, in the illustrated embodiment, an edit button 288 is included in the general description tile 286-1 to allow editing of the information that the tile contains. A user can customize the general information of the selected metric 284 based on individual and/or system preferences. For example, a user may edit a description of the metric 284, change the type (e.g., change from a gauge to a percentage or other data type), change the default visualization (e.g., line, circle, bar, pie, etc.), change the unit of the metric 284 (e.g., percentage, MB, GB, etc.), change the collection frequency of the metric 284, and/or any other suitable element of the metric 284.

In some embodiments, changes made to the general information of the metric 284 change how the machine-generated data and/or events associated with the metric 284 are processed. For example, in some embodiments, a user can change the collection frequency of a metric 284 using the interface 270. When a user changes the collection frequency of a metric, one or more indexers can be adjusted to increase and/or decrease a storage rate of the associated with machine-generated data. In some embodiments, a search query and/or processing rate of an associated event can be adjusted.

In some embodiments, the value or measurement of the metric 284 can have one or more types, such as a count, a timing, a sample, a gauge, sets, and/or can be calculated for a specific time resolution, such as the number of events within a given time period (e.g., count of 5xx errors for the last minute), sum, mean, percentiles (e.g., upper 90th, lower 10th, etc.), and/or any other suitable value. In some embodiments, the value or measurement of the metric is automatically derived from one or more events, as previously discussed.

In some embodiments, the interface 270 includes a dimensions tile 286-2. The dimensions tile 286-2 includes one or more dimensions (i.e., attributes) of the metric 284. For example, as shown in FIG. 28, the selected metric 284 can include dimensions, such as server/host information, cluster information, instance information, application information, and/or any other suitable dimension. The dimensions can be defined by the metric catalog, the SPLUNK® ENTERPRISE system, by a user, and/or by a component.

In some embodiments, the interface 270 includes a metrics data tile 286-3. The metrics data tile 286-3 is configured to display the machine-generated numerical metrics data of the selected metric 284. The numerical metrics data can be displayed in any suitable visualization 290, such as, for example, as a data graph (line graph, bar graph, scatter plot, etc.), in numeric form, and/or in any other suitable visualization. In some embodiments, the visualization 290 of the metric 284 is defined in the general information tile 286-1, for example, as the default visualization. In some embodiments, the metrics data tile 286-3 is configured to display the visualization 290 over a predetermined time period. In some embodiments, a user can adjust the predetermined time period, for example, to increase/decrease a historical time period and/or view a metric in real-time.

The metrics data tile 286-3 can be configured to allow additional analysis of a selected metric 284, such as through an analysis button 292. Metric analysis is discussed in more detail further below with respect to FIGS. 34 through 43.

In some embodiments, the interface 270 includes an event mapping tile 286-4. The event mapping tile 286-4 illustrates one or more events that are mapped and/or associated with the metric 284. The mapped events can include one or more events processed to generate the numeric metrics data of the metric 284.

In some embodiments, the mapped events can include one or more user selected events. For example, the numerical metrics data of the metric 284 can be provided directly and is not derived from a specific event and/or log. However, the metrics data 284 may correlate and/or be affected by one or more other events. The user can map one or more selected events to the metric 284.

In some embodiments, the interface 270 includes a tags tile 286-5. The tags tile 286-5 can display one or more tags associated with the selected metric 284. As discussed above, the tags provide additional information about the metric 284, such as an associated class of application, a class of system, or a class of data structure, etc. Although specific embodiments of tiles 286 are discussed herein, it will be appreciated that the interface 270 can include fewer, additional, and/or alternative tiles.

FIG. 31 illustrates a user interface screen of a metric catalog displaying filtering and/or searching of metrics according to some embodiments of the present disclosure. In some embodiments, the interface 270 can provide filtering and/or searching of metrics stored in the metric catalog. As shown, the interface 270 includes a search bar 294 configured to receive a search string. The metric store or catalog is searched for one or more metrics 276, dimensions 278, hosts 280, tags 282, and/or other parameters that match the search string. For example, the search string "web" is entered into the search bar 294. In response, the metric catalog is filtered for entries including the term "web." In the illustrated embodiment, a revised metrics list 296 of matching search results is displayed including four identified tags 298 that include the term "web."

In some embodiments, selecting a search result from the list 296, such as tag 298-1, displays a metric listing 300 including one or more metric groups (such as applications 302) each having at least one metric tagged with the selected tag 298-1. In some embodiments, a user can select one or more metrics from the metric listing 272 for customization and/or inclusion in a user dashboard.

FIG. 32 illustrates a user interface screen of a data ingestion interface according to some embodiments of the present disclosure. As shown, selection interface 304 is configured to allow a user to select one or more metrics 306 of interest from the metric catalog. In particular, the selection interface 304 displays a list of user-selectable performance categories 308. Each of the user-selectable performance categories 308 includes the user selectable metrics 306. In some embodiments, the displayed metrics 306 can be selected by a user for inclusion in a user-defined list of metrics. In some embodiments, selection of one or more of the displayed metrics 306 initiates ingestion and monitoring of the metric values associated with the selected metrics 306.

In some embodiments, metrics data for the selected metrics 306 is automatically ingested. For example, each of the displayed metrics 306 can be stored in the metrics catalog and each have a default type, unit, collection frequency, and metrics data source defined in the metric catalog. When a user selects one or more of the metrics 306, the metrics data is collected and/or ingested from one or more default sources at the default collection interval as defined in the metric catalog. As discussed above, a user can change the default collection frequency, type, unit, etc. of the selected metrics 306.

The interface 304 includes selectable collection mechanisms 310. A files & directories collection mechanism 310-1 can be selected to upload a file, index a locale file, or monitor an entire directory. An HEC event collector 310-2 can be selected to configure tokens that client can use to send metrics data over HTTP or HTTPs. A TCP/UP mechanism 310-3 can be selected to configure the data intake and query system to listen on a network port. A scripts mechanism 310-4 can be selected to obtain data from an API, service, or database with a script. Lastly, a distributed management console monitoring 310-5 can be selected for monitoring performance and licensing metrics collected to optimize deployment of the data intake and query system.

As discussed above, pre-aggregation of metrics data can occur before or during data ingestion. For example, ingested data may be pre-aggregated into predefined aggregate time windows to reduce the quantity of data required to be ingested and/or searched. In some embodiments, aggregation is relegated to a data collector (e.g., modular input, etc.) or to a later summary indexing. In some embodiments, pre-aggregation occurs prior to receiving the data. As indicated above, metrics can be pre-aggregated using a StatsD collector or other mechanism prior to storing the data. In some embodiments, one or more metrics values can be stored for one or more metrics. For example, pre-aggregated metrics can be stored with a sum, count, mean, median, min, max, and upper 95th percentile value. An example of data aggregation is provided in TABLE 1.

TABLE 1

| | |
|---|---|
| Servers | 10 |
| Metrics | 10 |
| Aggregations | 7 |
| Total Samples Per Day | 86400/10 = 8640 |
| Total Daily Events | 6,048,000 |
| Days Tracked | 30 |
| Total Events | 181,440,000 |
| Average Event Size | 73 bytes |
| Daily (raw) Index Volume | 420 MB |
| Daily Compressed Volume | 35 MB |
| Total (Original) Compressed Volume | 1050 MB |
| Compressed journal.gz (with indexed extractions) | 3422 |
| Total Index Size | 15 GB | metric time series. Metric schema include a metric name and dimension tags K and the metric time series includes a timestamp and a measure. In some embodiments, a metric time series includes a series of timestamp/value tuples for a specific tuple of a dimension value. For example, CPU statistics for a predetermined number of hosts can be collected every minute such that each host's stream of per-minute timestamp/CPU pairs constitutes a single metric time series.

In some embodiments, gauge style metrics and counter style metrics are treated differently. For example, TABLE 2 illustrates a number of sufficient statistics that can be tracked for every time bucket in a metric series to generate one of a gauge style metric and/or a counter style metric. In TABLE 2, "FP" stands for "fencepost" calculation.

TABLE 2

| Aggregation | Gauge | Gauge (FP) | Counter | Counter (FP) |
|---|---|---|---|---|
| count | count | accum(count) | count | accum(count) |
| sum | sum | accum(sum) | earliest(value), latest(value) | value |
| avg | count, sum | accum(count), accum(sum) | count, earliest(value), latest(value) | accum(count), value |
| std/var | count, sum, sumsq | accum(count), accum(sum), accum(sumsq) | count, earliest(value), latest(value), sumsq(delta(value)) | accum(count), value, accum(sumsq(delta(value))) |
| min/max | min, max | N/A | min(delta(value)), max(delta(value)) | N/A |
| median/per cXX (approx) dc sparklines | digest | N/A | digest(delta(value)) | N/A |

As shown above, aggregating data in ten second buckets enables storage of significantly less data and reduces the total cost of operations (TCO) for metrics classes of data while providing sufficient coverage to analyze and query the metrics data. In some embodiments, one or more alternative protocols, such as Graphite and/or InfluxDB are configured to further reduce the storage requirements.

In some embodiments, the performance of querying data can be increased using indexed extractions, using indexed extractions on pre-aggregated datasets, using report acceleration to aggregate a raw dataset, and querying of one or more systems (such as Whisper) from Graphite as a reference metrics store. In some embodiments, Whisper allows the user to lose granularity over time and has a built in data management function. The number of samples compared will not be an exact match (and in some cases, the oldest bucket for all data has a granularity of 10 m).

For example, in some embodiments, the total difference from an original storage of every measurement (183 GB) vs a storage of pre-aggregated data using, for example, Graphite (784 MB), can be significant. Assuming similar levels of granularity, the aggregated dataset in a data intake and query system is about 182.5 GB for one-year of data versus 784 MB for Graphite, providing about 238 times more data in the data intake and query system.

In some embodiments, the metrics stored in the metric store include one or more data models. For example, in some embodiments, one or more metrics are defined as time series metrics. Time series metrics include a metric schema and a As described further below, queries of metrics data can be sped up using various techniques. For example, a metric-series index (msidx) file can be built at index time from metrics data and then scanned at search time to avoid searching each metric in a metrics store. In some embodiments, the msidx file can store an array of all the numerical values of ingested metrics in a predetermine area. For every metric that is monitored/received, an entry can be written in the msidx file according to one or more standards, where entries can be recorded in one or more areas, such as a source array, source type array, host array, delete array, meta array, and a lexicon including a combination of key values. A search head can scan the msidx file to search one or more metrics, dimensions, and/or other elements stored for each metric without searching each metric. In some embodiments, the search retrieval process leverages the tsats code that provides basic functionality to aggregate values and split by various dimensions.

In some embodiments, metric data ingestion can occur through one or more defined collectors (i.e., collection mechanism) as described above. For some collectors, like a StatsD collector, dimensions can be encoded in the metric name (source). For example, metric data can be collected for a variable collectd.cpu_idle.splunk-idx-01.west-dc.america with a source-type statsd. The variable can be transformed according to, for example, the following process:

props.conf:

[statsd]

Figure 33:
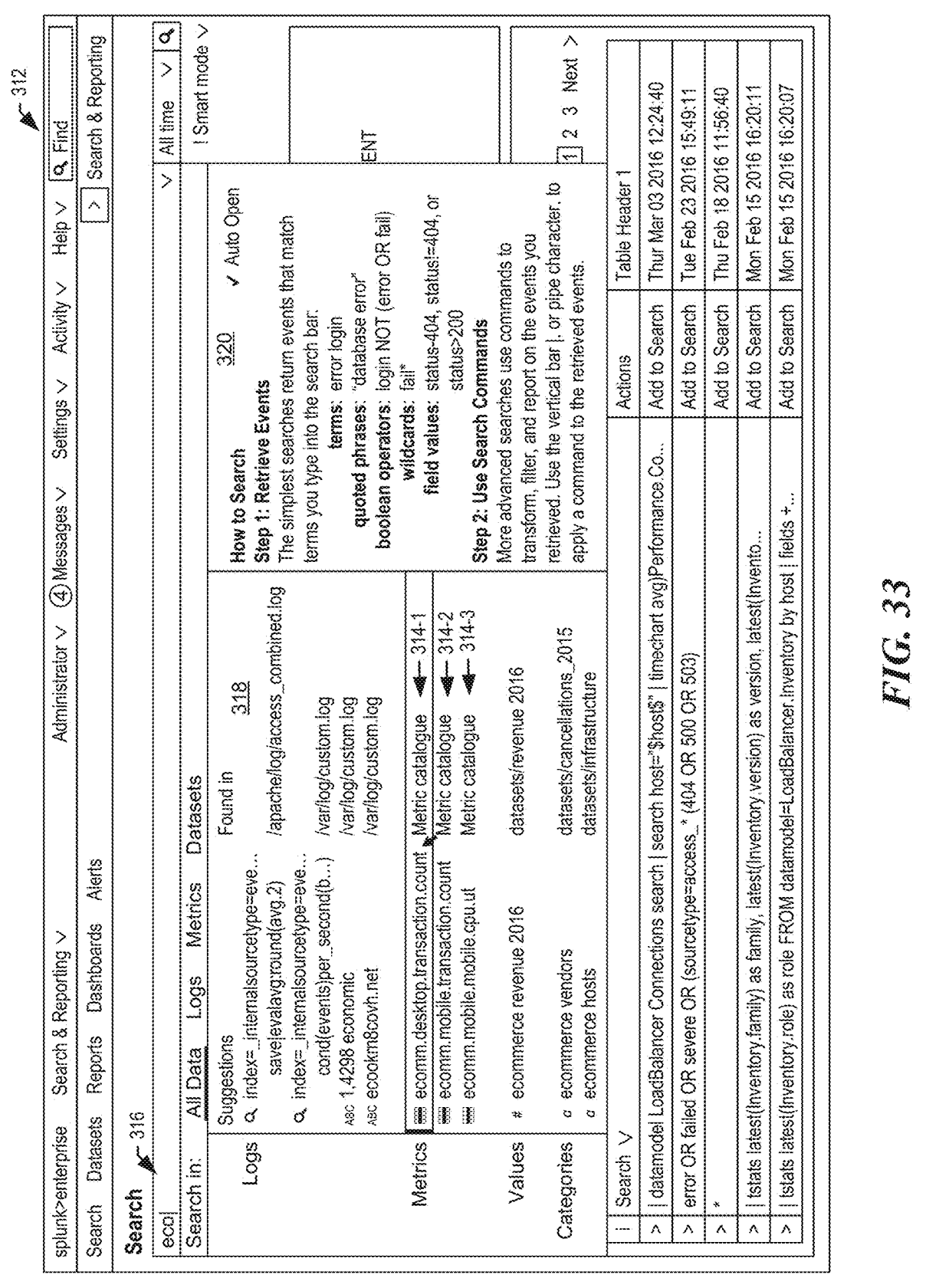

TRANSFORMS-extract dims—extract_host, extract de, extract region, extract name transforms.conf:
[extract_host]
SOURCE_KEY=MetaData:Source
REGEX=^(?:[^.]{1,}.){2} ([^.]{1,})
FORMAT=host::$1
DEST_KEY=MetaData:Host
[extract_dc]
SOURCE_KEY=MetaData:Source
REG EX=^(?:[^.]{1,}.){3} ([^.]{1,})
FORMAT=dc:: $1
WRITE_META=true
[extract_region]
SOURCE_KEY=MetaData:Source
REGEX=^(?:[^.]{1,}.){4} ([^.]{1,})
FORMAT=region::$1
WRITE_META=true
[extract_name]
SOURCE_KEY=MetaData:Source
REG EX=^(?:[^.]{1,}.){1} ([^.]{1,})
FORMAT=source::$1
DEST_KEY=MetaData:Source FIG. 33 illustrates a user interface screen for searching and selecting various types of data including metrics according to some embodiments of the present disclosure. As shown, the search interface 312 can allow a user to search for one or more metrics 314 for selection from, for example, a metrics catalog. The search interface 312 includes a search bar 316. The search bar 316 can receive a search string. The search interface 312 displays search results 318 corresponding to the search string entered by a user into the search bar 316. In some embodiments, the search results 318 include one or more logs, metrics, value, categories, dimensions, or datasets that match the search term. A user can select a metric directly and/or can select a log, dataset, or other result to see one or more metrics associated with the selected result. In some embodiments, the search interface 312 includes a search suggestion block 320 that can display previous and/or suggested search terms.

In some embodiments, the metric store search is a constrained use case of the general tstats search command (e.g., a general search by the search head as described above), referred to mstats. The mstats search provides a constrained search interface for performance events within the metric store. In some embodiments, the mstats command comprises syntax similar to a tstats command, such as, for example:

I mstats [prestats=<bool>] [append=<bool>] [chunk_size=<unsigned int>] <stats-func> . . . FROM <index I*>[WHERE <search-query>] [BY <field-list> [span=<timespan>]]

In some embodiments, the mstats operator may access one or more system files, such as a config system, to identify metric type of "hits" (e.g., counter, gauge, etc.) and can adjust the internal search logic according to the metric type.

Figure 34:
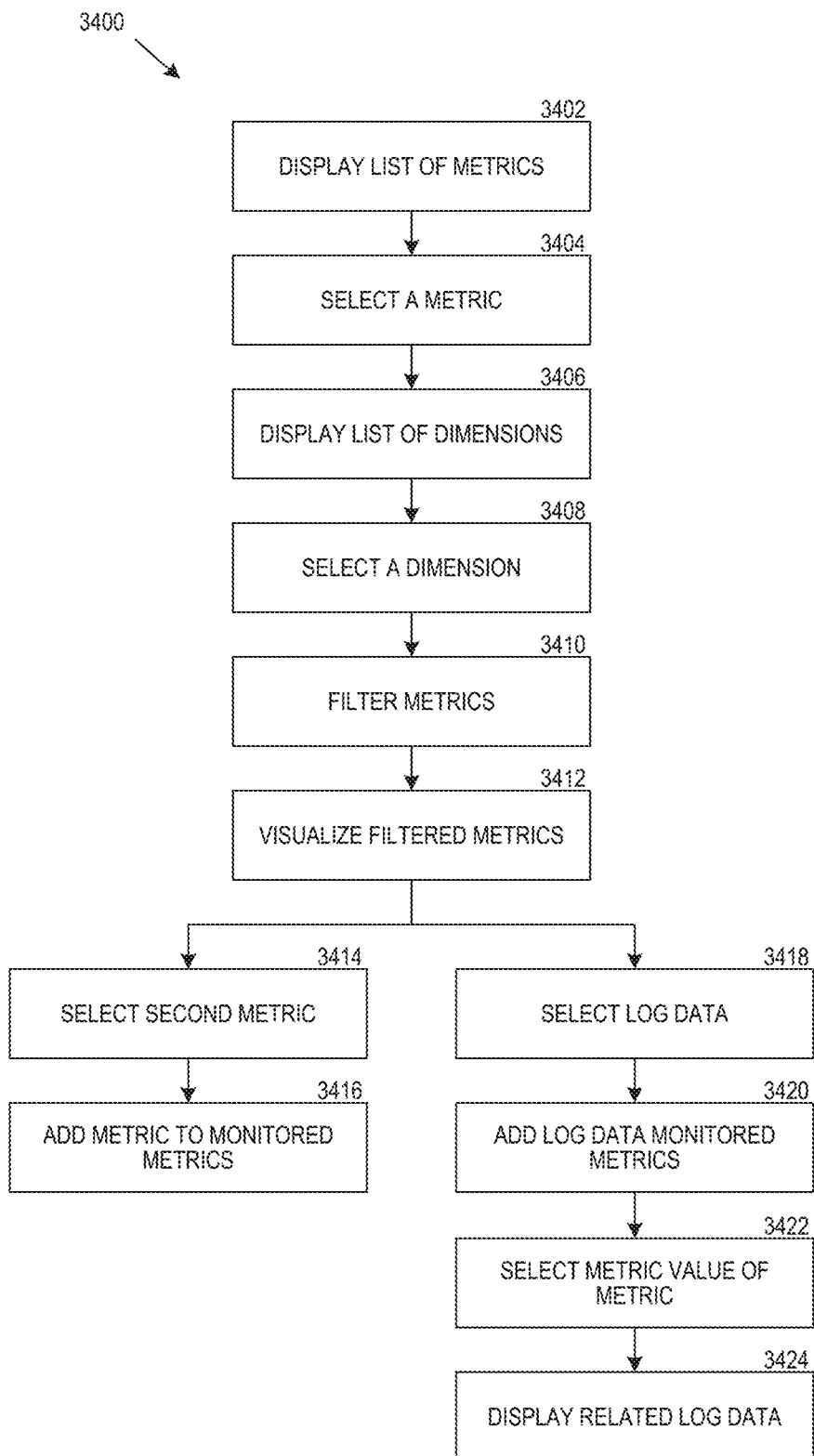
FIG. 34 is a flow diagram illustrating a method for investigating of metrics data according to some embodiments of the present disclosure.
Figure 35:
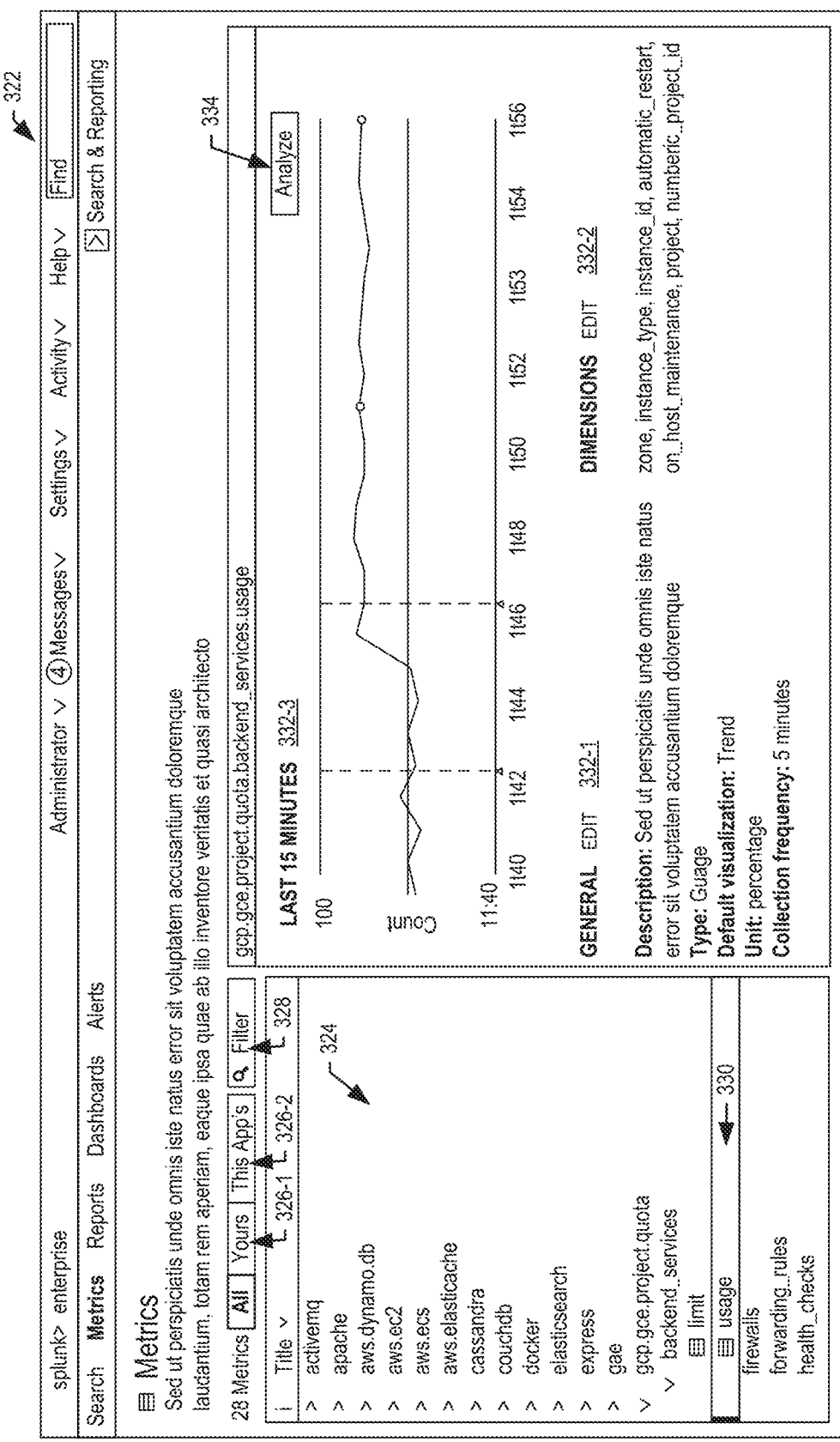
FIG. 35 illustrates a user interface screen of a metric investigation interface for visualizing selected metrics data according to some embodiments of the present disclosure.

FIG. 34 is a flow diagram illustrating a method for analyzing one or more metrics selected from a user interface. In step 3402 of the method 3400, multiple metrics are provided to a user on a display of a display device. As discussed above, each metric can be associated with one or more machine generated data, such as data extracted from one or more events. In some embodiments, the metrics are provided to the user in response to one or more user search requests. In other embodiments, metrics are displayed on a user dashboard. In step 3404, the user selects one metrics.

In step 3406, multiple dimensions related to the selected metric can be provided to the user on the display of the display device. The dimensions can include any suitable dimension associated with the metric, such as, for example, server information, source information, metric status, metric agent/ownership, and/or any other suitable dimensions. In step 3408, the user selects one or more of the displayed dimensions.

In step 3410, the metrics associated with the selected metric name are filtered to form a filtered metrics data set based on the selected dimension. For example, the metrics associated with the selected metric name can be filtered to include only those metrics corresponding to one or more of the selected dimensions, such as metric values for one or more selected servers or other components.

In step 3412, the set of filtered metrics data is provided in a visualization. The filtered metrics data set includes metric values that correspond to the one or more selected dimensions. The time period can be based on the selected dimensions, such as, for example, selecting a default time window associated with a selected dimension. In some embodiments, the time period is a default time period defined for the selected metric. Each metric value is associated with an instance in time that data is collected within the time period.

In some embodiments, a user can select one or more additional metrics for analysis. In step 3414, another metric name can be selected from the metric catalog. The subsequent metric can include a metric related to the earlier selected metric, one or more of the selected dimensions, and/or an unrelated metric. In step 3416, a set of metric values (filter and/or unfiltered) of the subsequent metric are displayed with the filtered metrics data set of the earlier selected metric. The values for each of the two metrics can be displayed on the same graph and/or on separate graphs.

In some embodiments, a user can select one or more events to include in an analysis. For example, in step 3418, multiple events can be provided to a user on a display device for selection by the user. The events can be presented as a list superimposed on the visualization of the selected metrics. In some embodiments, the events include one or more events that are processed to generate the metric values of one or more of the selected metrics.

In step 3420, a visualization of the selected events is provided with the visualization of the metrics. In some embodiments, a visualization of the selected events is overlaid on the visualization of the selected metric. In step 3422, a user selects one or more of the metric values of the metric. In step 3424, log data for a selected event corresponding to the selected metric value is displayed. In some embodiments, the log data is displayed in a different graphical user interface position than the metrics.

In some embodiments, the method 3400 is initiated by a user selection to analyze one or more metrics, such as, for example, selecting the analysis button 292 of the interface 270 discussed above. In other embodiments, the process 3400 is automatically initiated, for example, by a user dashboard or other interface configured to automatically provide analysis of one or more metrics to a user.

The method 3400 provides efficient aggregation, storage, and analysis of metrics. The method 3400 can provide stream-process time-series metrics to one or more user interfaces, as discussed in more detail below. In some embodiments, the method 3400 can organize and present metrics data to allow a user to deal with voluminous metrics data, automatically correlate various dimensions and/or numerical measure dimensions in the metrics, and/or to lower latency and provide higher search concurrency requirements.

FIGS. 35 through 43 illustrate a series of user interface screens of an analysis interface. A selection interface screen 322 includes a metric list 324 including multiple metrics that can be selected by the user. In some embodiments, the selectable metrics are grouped in one or more groups, such as, for example, by application groups. A user can select one or more of the displayed metrics for further analysis and/or viewing.

In some embodiments, the metric list 324 can be sorted by one or more selected parameters, such as, for example, user defined metrics 326-1, application defined metrics 326-2, one or more dimension terms, and/or any other suitable sorting parameters. In some embodiments. the one or more dimensions can be entered into a search bar 328 as a search string. Dimensions matching the entered search string are displayed in a list for user selection. In other embodiments, the search bar 328 is replaced with a drop-down menu, radio buttons, and/or any other suitable selection interface.

In some embodiments, when the metric 330 is selected, the interface 322 displays one or more charts or tiles 332 associated with the selected metric 330. The tiles 332 can include a general information tile 332-1, a dimensions tile 332-2, a metrics data tile 332-3, and/or any other suitable information tile. The general information tile 332-1 is similar to the general information tile 286-1, the dimensions tile 332-2 is similar to the dimensions tile 286-2 and the metrics data tile 332-3 is similar to the metrics data tile 286-3 discussed above and, as such, similar descriptions are not repeated herein.

In some embodiments, the analysis interface 322 is configured for detailed analysis of one or more selected metrics in the metric list 324. In the illustrated embodiment, the metrics data tile 332-3 includes a selectable analyze option, such as an analyze button 334, for generating one or more additional interfaces configured to provide detail analysis of the selected metric 330.

Figure 36:
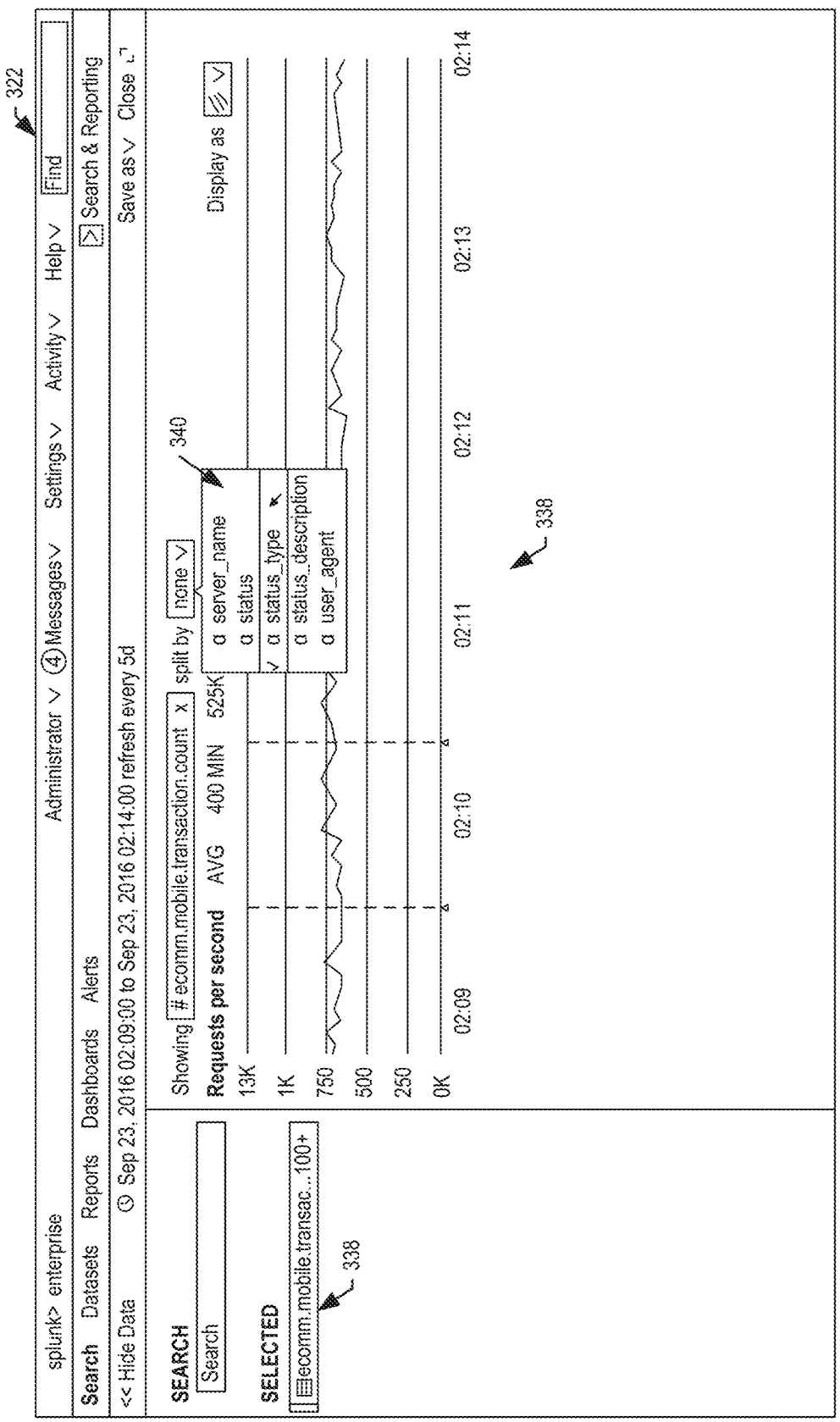
FIG. 36 illustrates a user interface screen of a metric investigation interface for customizing a visualization of metrics according to some embodiments of the present disclosure.

When analysis of a selected metric is initiated (for example, by user selection of the analyze button 334), an investigation interface 322 is displayed including a metrics data tile 336 for the selected metric 338, as shown in FIG. 36. One or more dimensions associated with the selected metric 338 are displayed for user selection. For example, in the illustrated embodiment, a list 340 of five dimensions associated with the selected metric 338 is displayed.

Figure 37:
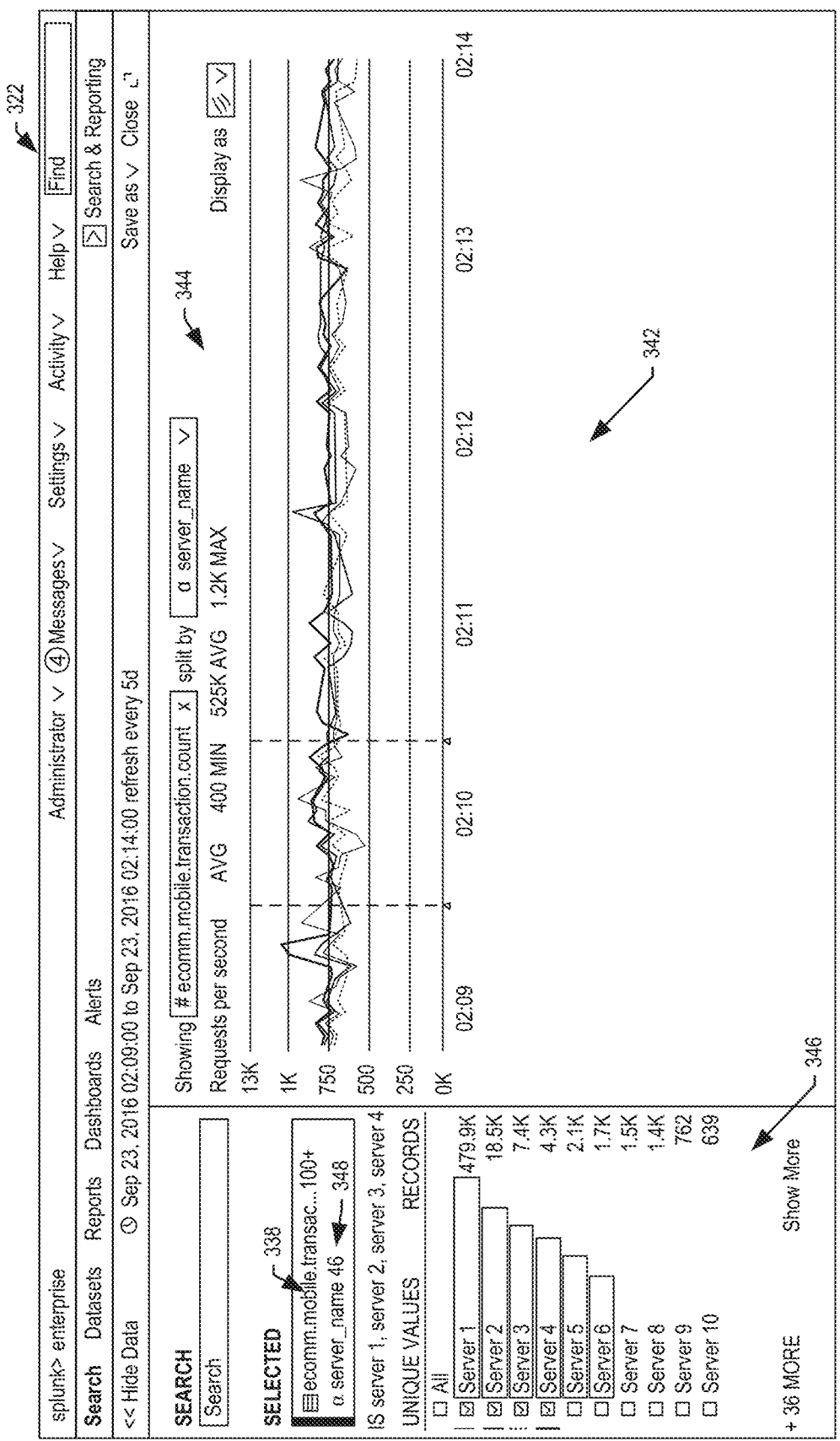
FIG. 37 illustrates a user interface screen of a metric investigation interface including a visualization of metrics from multiple sources according to some embodiments of the present disclosure.

When one or more of the associated dimensions of the list 340 are selected, the metrics data (e.g., metric values) associated with the selected metric 338 is filtered to form filtered metrics data, as shown in FIG. 37. A filtered data set tile 342 is displayed including a filtered metric visualization 344. In some embodiments, the selected dimension includes one or more additional sub-dimensions 346 that can be selected by a user to further filter the metrics data. For example, in the illustrated embodiment, the selected dimension 348 "server_name" has ten sub-dimension options 346 (i.e., the names of ten servers are displayed). The first four of the sub-dimension options have been selected by a user to filter the metrics data of the selected metric 338. Four metric visualizations 344 are displayed corresponding to the four selected servers.

Figure 38:
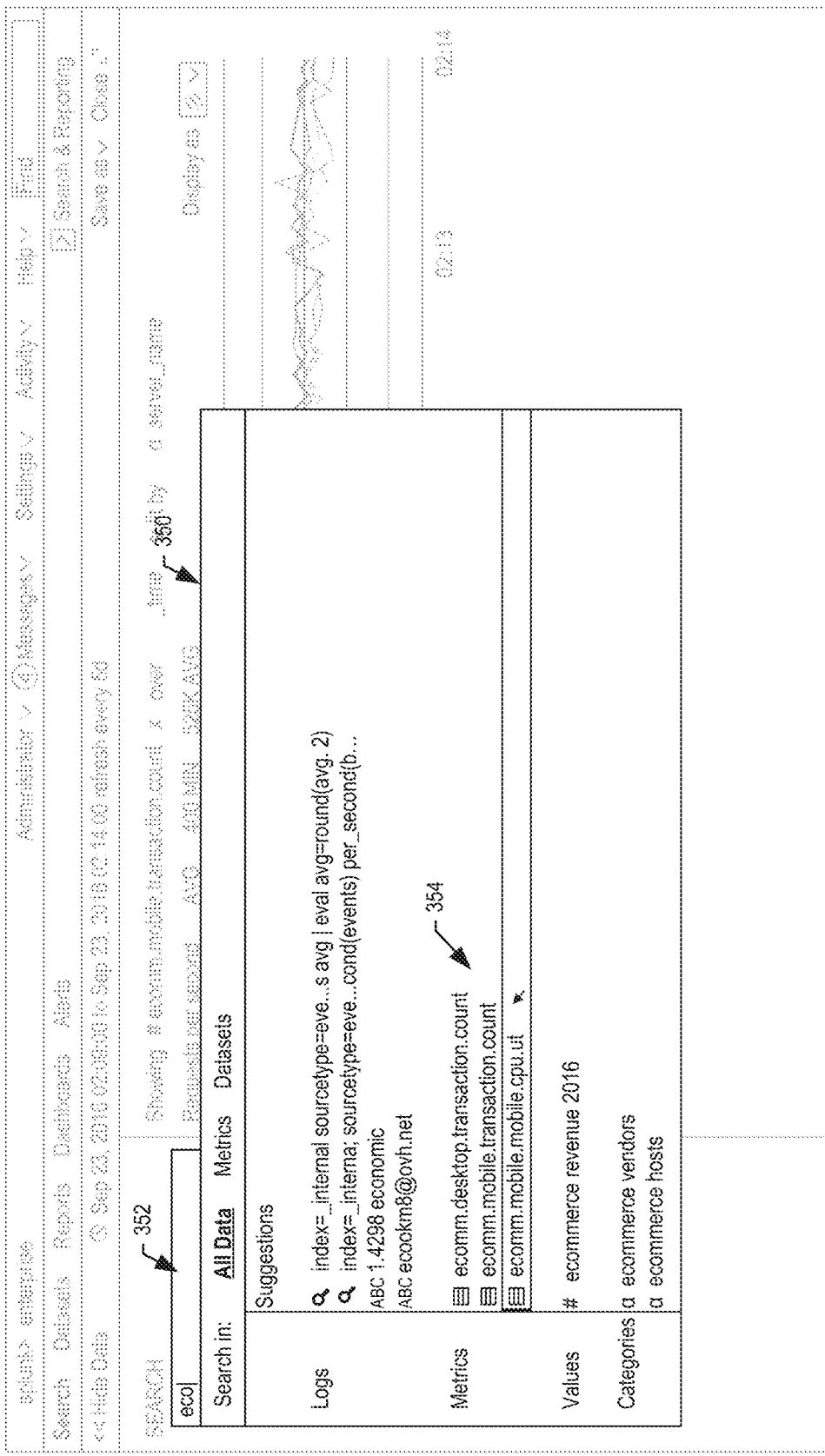
FIG. 38 illustrates a user interface screen of a metric investigation interface according to some embodiments of the present disclosure.

In some embodiments, the filtered metric visualization 344 includes an x-axis defining a time period including a plurality of values in the metrics data associated with an instance in time that data is collected. For example, in the illustrated embodiment, the filtered metrics data is displayed over a plurality of minutes, with each minute including a plurality of transaction count values (the selected metric 338) associated with an instance in time (e.g., a second) that the metrics data is collected. Although a specific embodiment is illustrated, it will be appreciated that any suitable time period can be defined for the filtered metrics data based on the selected dimensions. FIG. 38 illustrates a search interface 350 including a search bar 352 configured to allow a user to search for metrics 354. The user can select one or more metrics 354 for detailed analysis.

Figure 39:
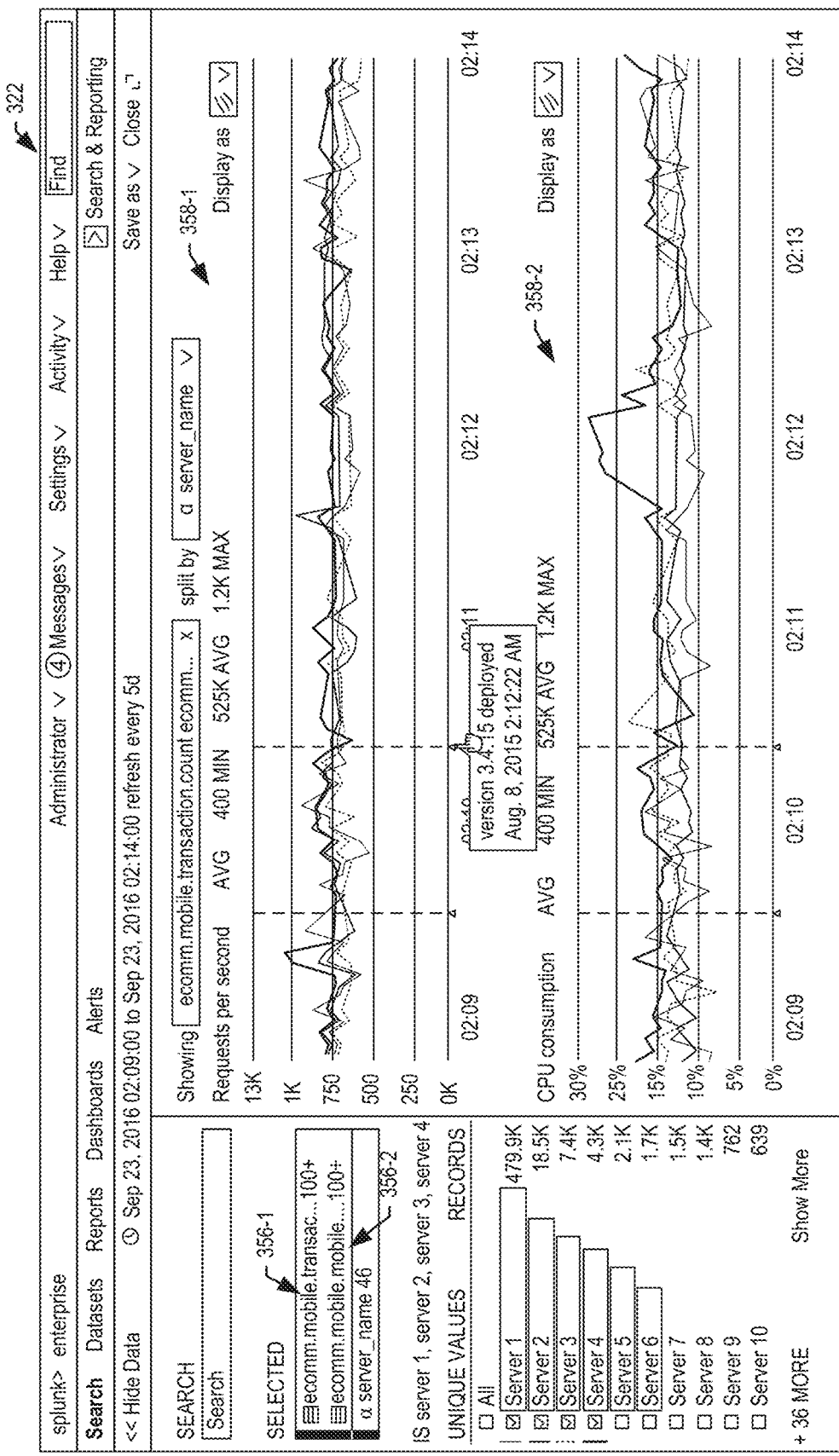
FIG. 39 illustrates a user interface screen of a metric investigation interface according to some embodiments of the present disclosure.

As shown in FIG. 39, in some embodiments, multiple metrics 356 can be displayed on the interface 322. In some embodiments, the display of a first metrics data block 358-1 and a second metrics data block 358-2 are adjusted to scale one or more axes (such as a time axis or a value axis) to display corresponding values for the respective selected metrics 356-1 and 356-2.

For example, in some embodiments, a first metric 356-1 and a second metric 356-2 are selected by a user using the interface 322. The first metric 356-1 has a first plurality of metric values associated therewith, each corresponding to a measurement of the metric 356-1 at an instance of time that the data is collected. The first metric 356-1 has a first collection frequency. The second metric 356-2 has a second plurality of metric values associated therewith, each corresponding to a measurement of the metric 356-2 at an instance in time the data is collected. The second metric 356-2 has a second collection frequency. The first collection frequency and the second collection frequency can be different.

When only one of the first and second metrics 356-1 and 356-2 are selected for display, the selected metric 356-1 or 356-2 can be displayed with a time axis derived from the collection frequency thereof and a default time range of interest. When two or more metrics 356-1 and 356-2 are selected for simultaneous display, the time axis and/or default time range of the selected metrics 356-1 and 356-2 is adjusted such that each selected metric 356-1 and 356-2 is displayed in an overlapping time frame.

Although embodiments are discussed herein with overlapping time axes, it will be appreciated that the first metric 356-1 with the second metric 356-2 can be displayed with non-overlapping time ranges. For example, in some embodiments, the second metric 356-2 may be related to the first metric 356-1 at some time delay X, such that a first metric 356-1 value at time t0 correlates to a second metric 356-2 value at time t0+X.

Figure 40:
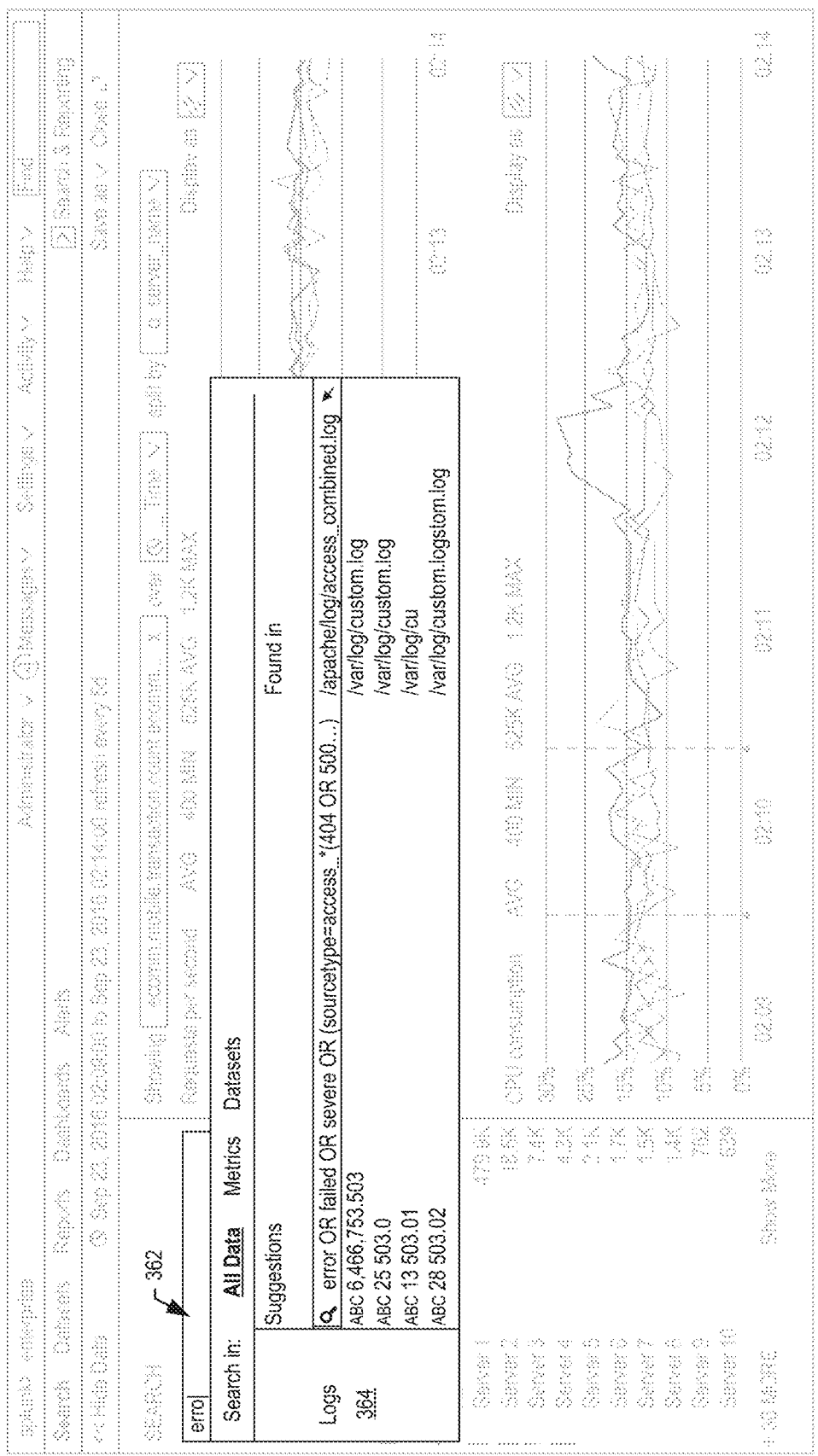
FIG. 40 illustrates a user interface screen of a metric investigation interface including query auto-completion according to some embodiments of the present disclosure.

FIGS. 40 through 43 illustrate an investigation interface 360 configured to display a plurality of metric values and a plurality of log values associated with a selected metric. As shown in FIG. 40, a user can search for one or more logs. For example, in some embodiments, a user can enter one or more search terms into the search bar 362. A list 364 of logs that match the one or more search terms is displayed. A user can select one or more of the displayed search terms.

Figure 41:
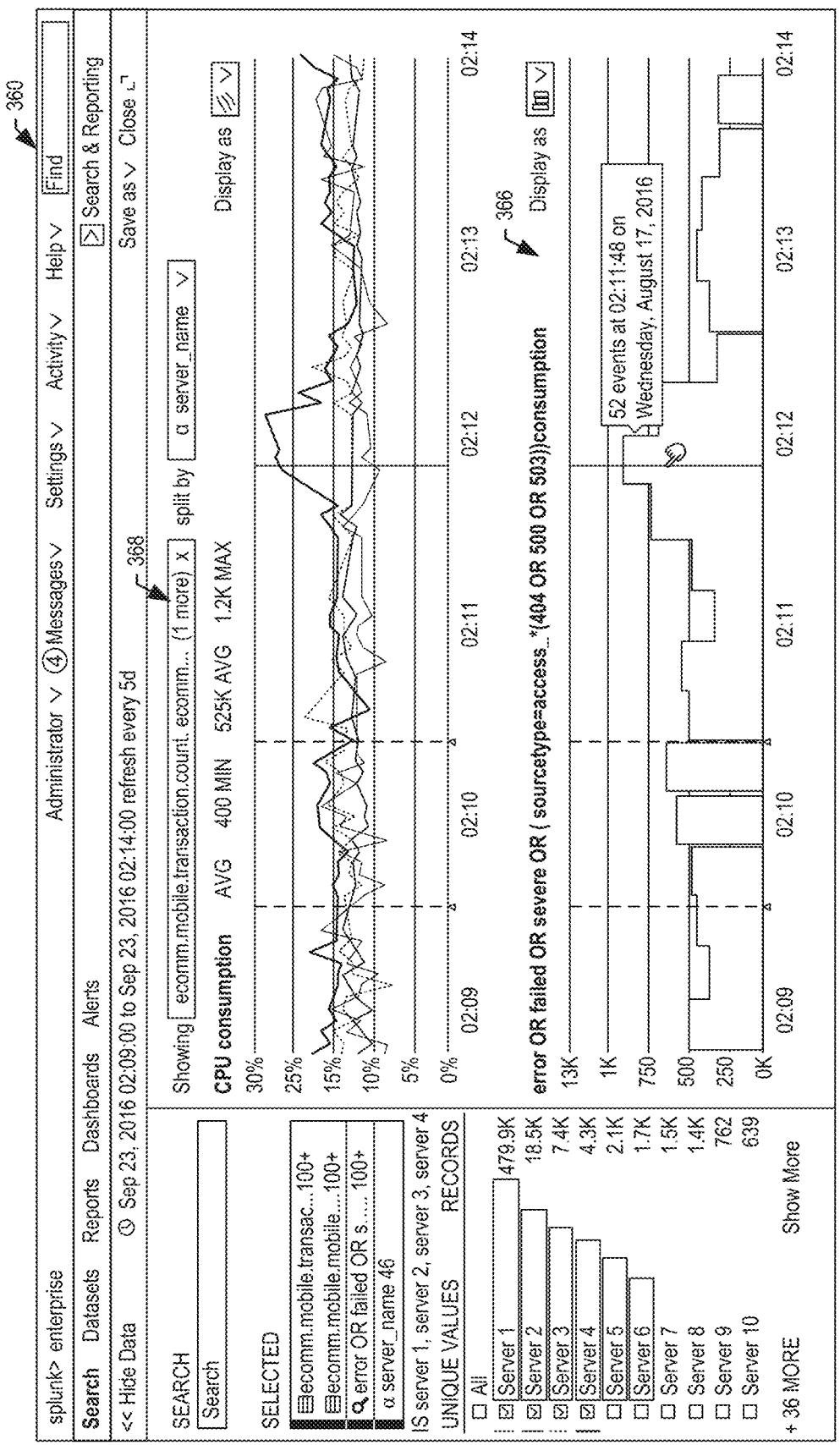
FIG. 41 illustrates a user interface screen of a metric investigation interface including visualizations of metrics data according to some embodiments of the present disclosure.
Figure 42:
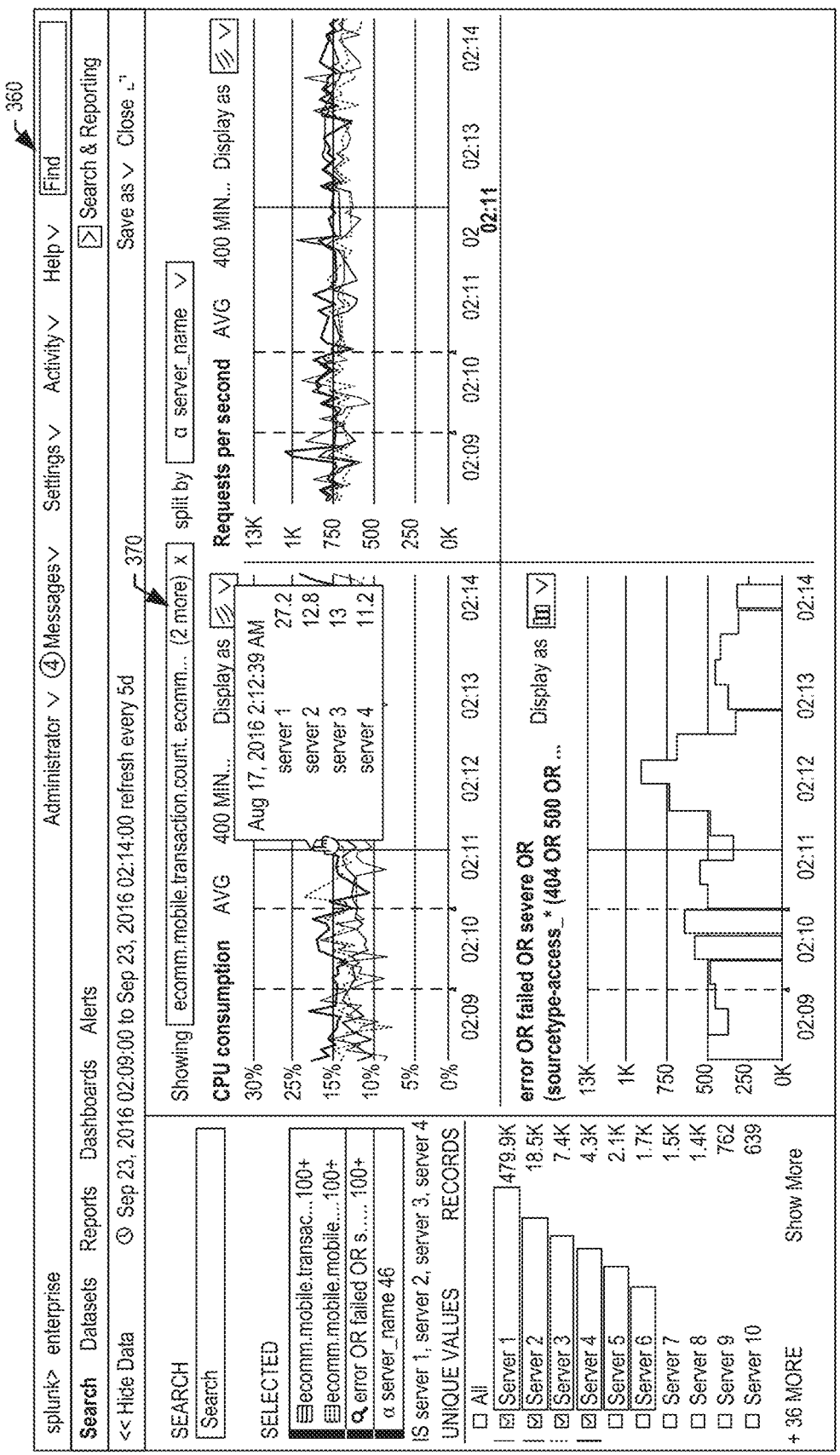
FIG. 42 illustrates a user interface screen of a metric investigation interface including searchable visualizations of metrics data according to some embodiments of the present disclosure.
Figure 43:
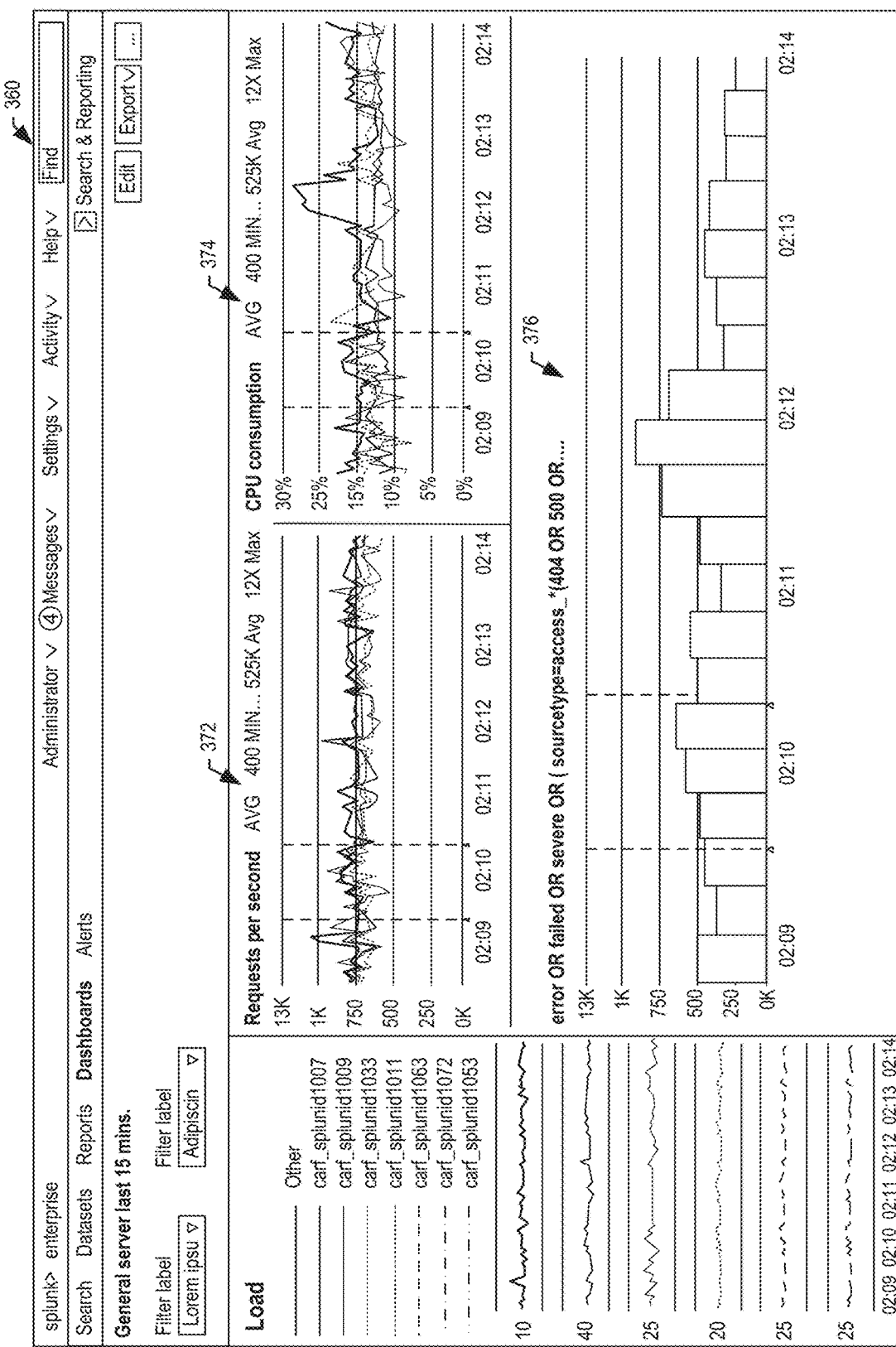
FIG. 43 illustrates a user interface screen of a metric investigation interface including various visualizations of metrics data according to some embodiments of the present disclosure.

FIG. 41 illustrates one embodiment of the interface 360 including displayed log data 366 corresponding to metric values for a selected metric 368. In some embodiments, the log data includes a listing of log events that can be displayed when a user hovers and/or otherwise interacts with the displayed log data 366. As shown in FIGS. 42 and 43, the log data can be displayed with and/or correlated with two or more selected metrics 370. In some embodiments, as shown in FIG. 43, the selected metrics 372, 374 and/or log data 376 can be added to a user dashboard.

Figure 44:
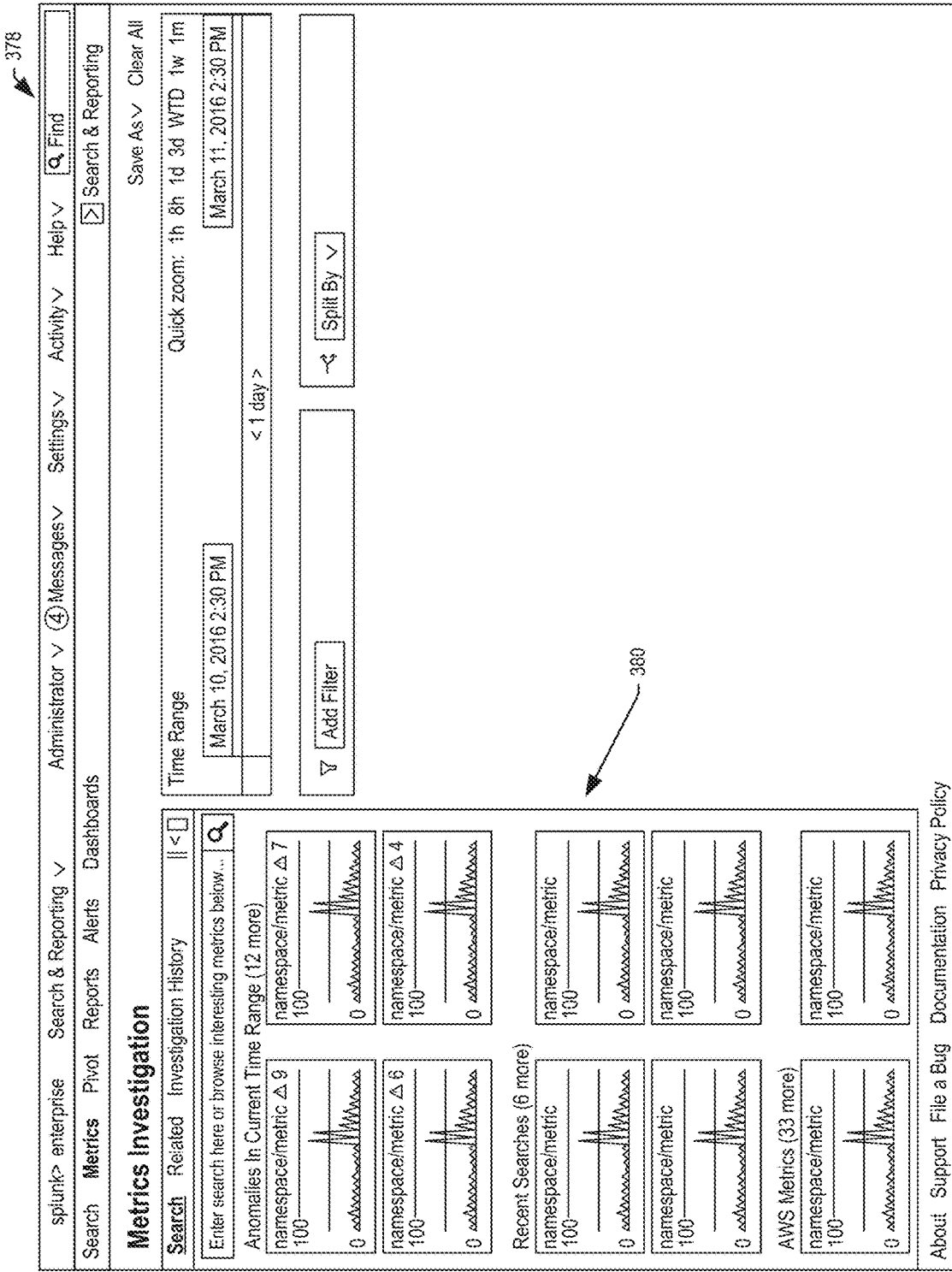
FIG. 44 illustrates a user interface screen of a metric investigation interface including metrics summaries according to some embodiments of the present disclosure.

FIGS. 44 through 56 illustrate one embodiment of a user dashboard and method for further investigation of one or more selected metrics. FIG. 44 illustrates a user dashboard 378 having a plurality of metric charts 380 displaying the status of multiple metrics. The metrics can be selected by a user (for example, according to the analysis process 3400 discussed above), automatically selected by a SPLUNK® ENTERPRISE system, and/or selected by one or more additional users and/or system components. In some embodiments, the user dashboard 378 can be used to address one or more service scenarios to identify and resolve service issues within an operational environment.

Figure 45:
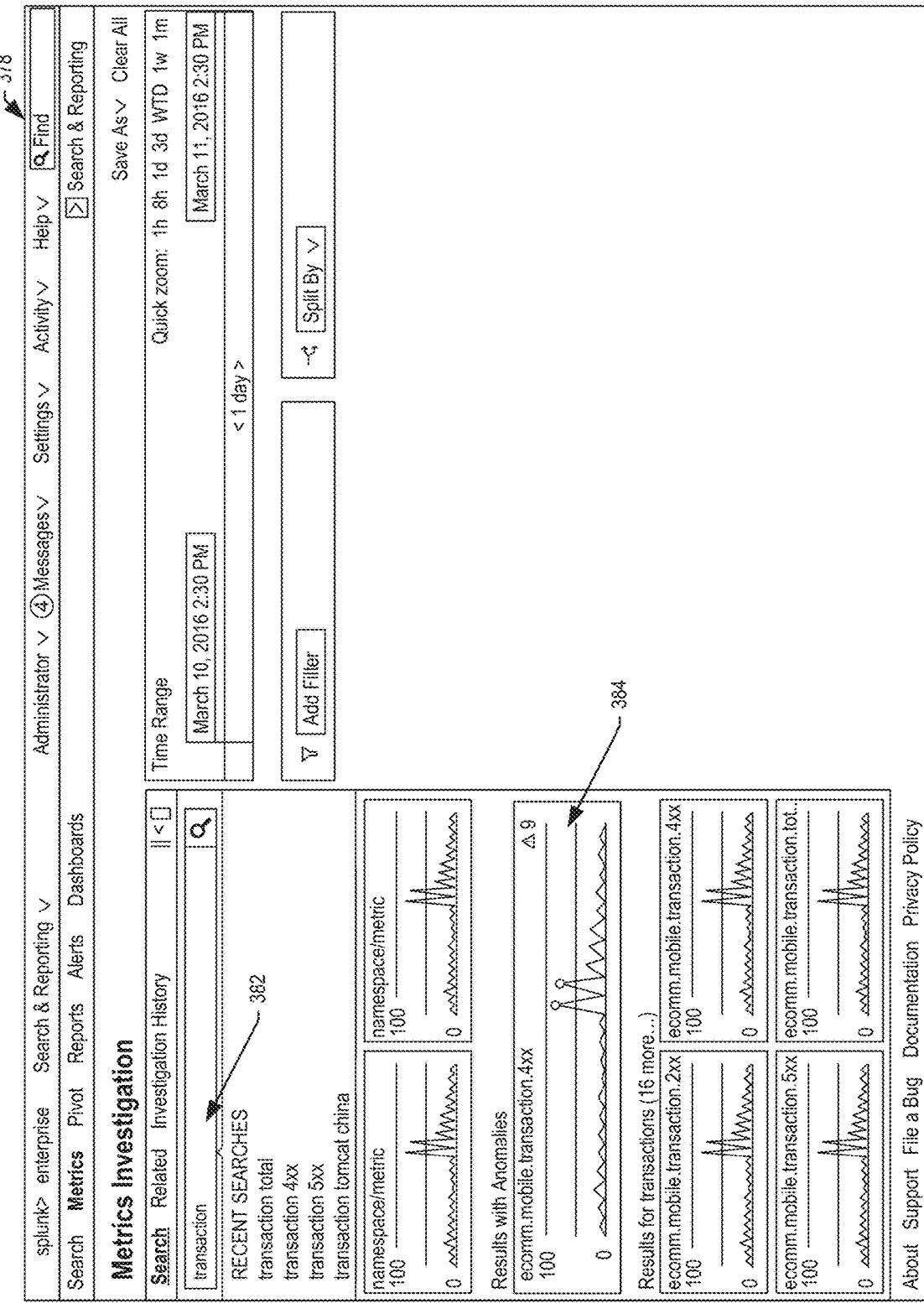
FIG. 45 illustrates a user interface screen of a metric investigation interface including outlier detection according to some embodiments of the present disclosure.
Figure 46:
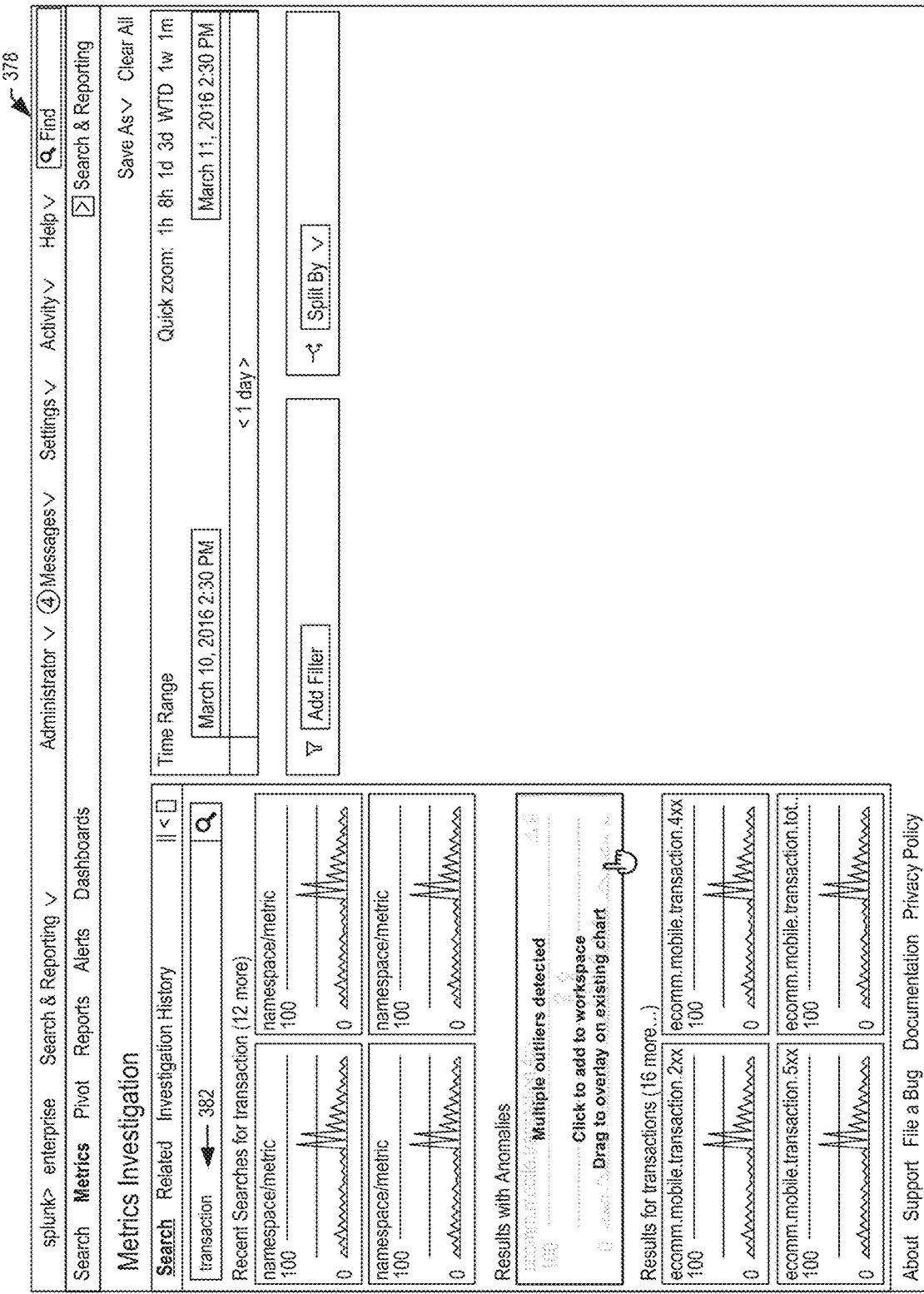
FIG. 46 illustrates a user interface screen of a metric investigation interface including query auto-completion according to some embodiments of the present disclosure.
Figure 47:
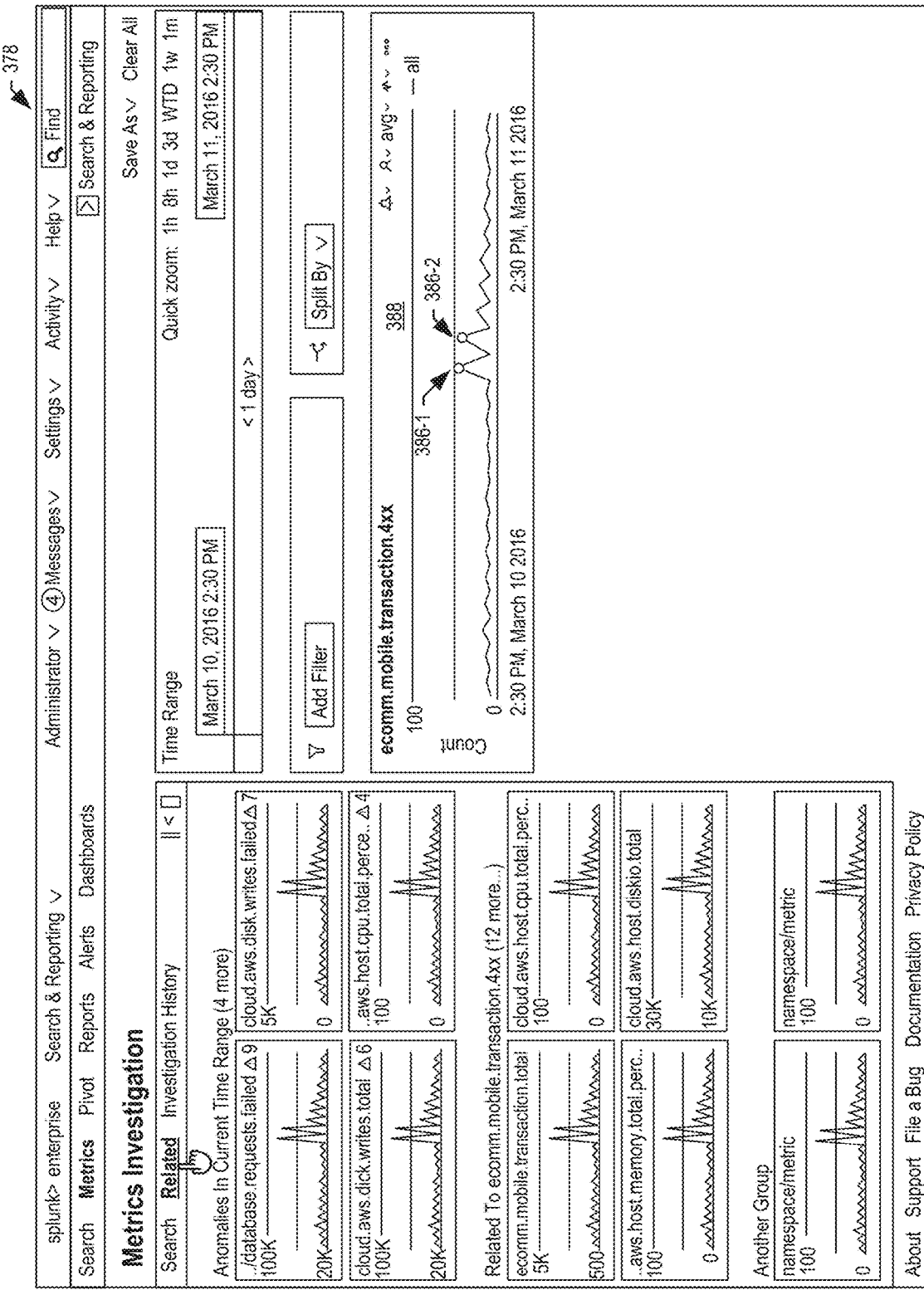
FIG. 47 illustrates a user interface screen of a metric investigation interface including visualizations of related metrics according to some embodiments of the present disclosure.
Figure 48:
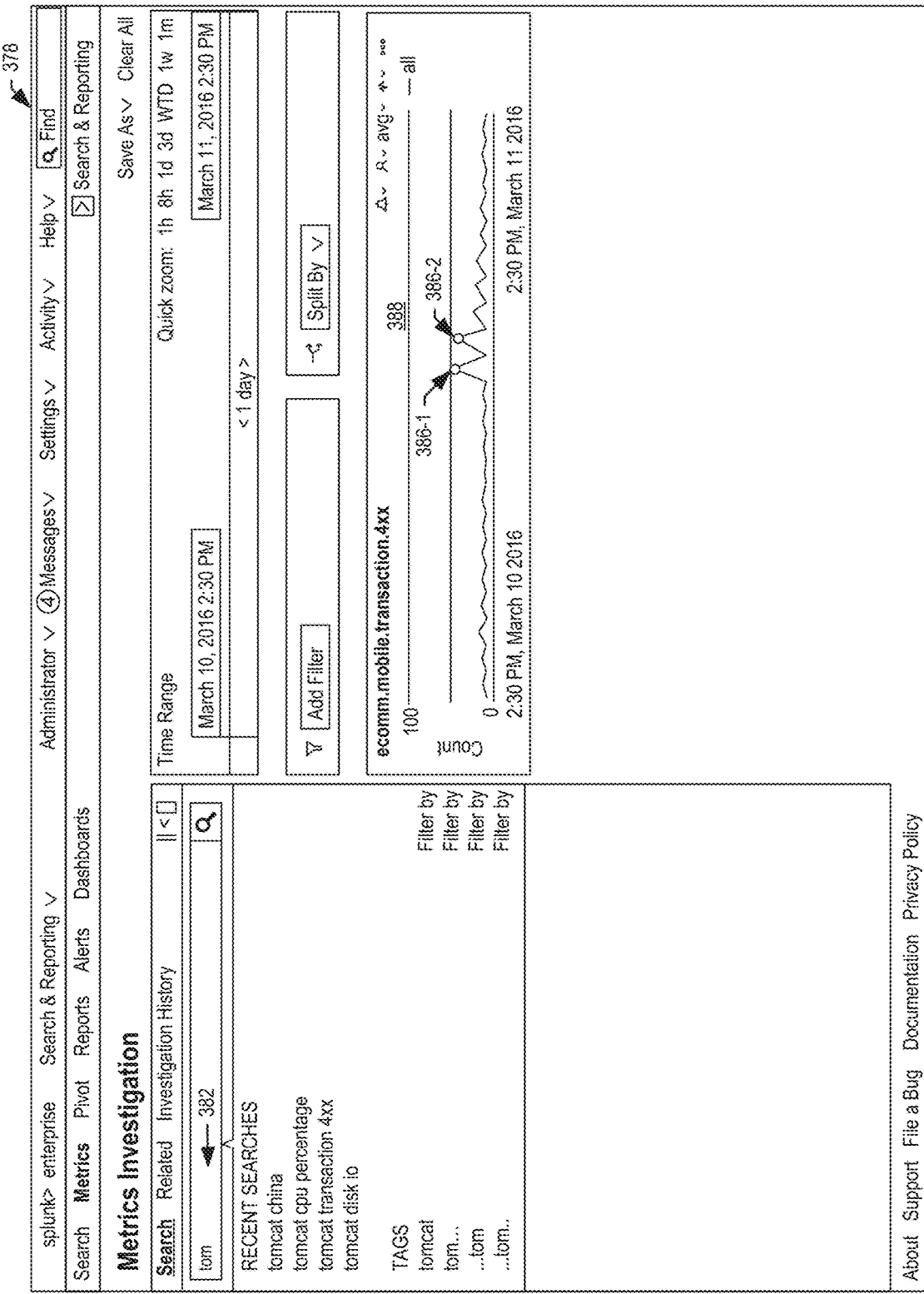
FIG. 48 illustrates a user interface screen of a metric investigation interface a visualizations of a search according to some embodiments of the present disclosure.
Figure 49:
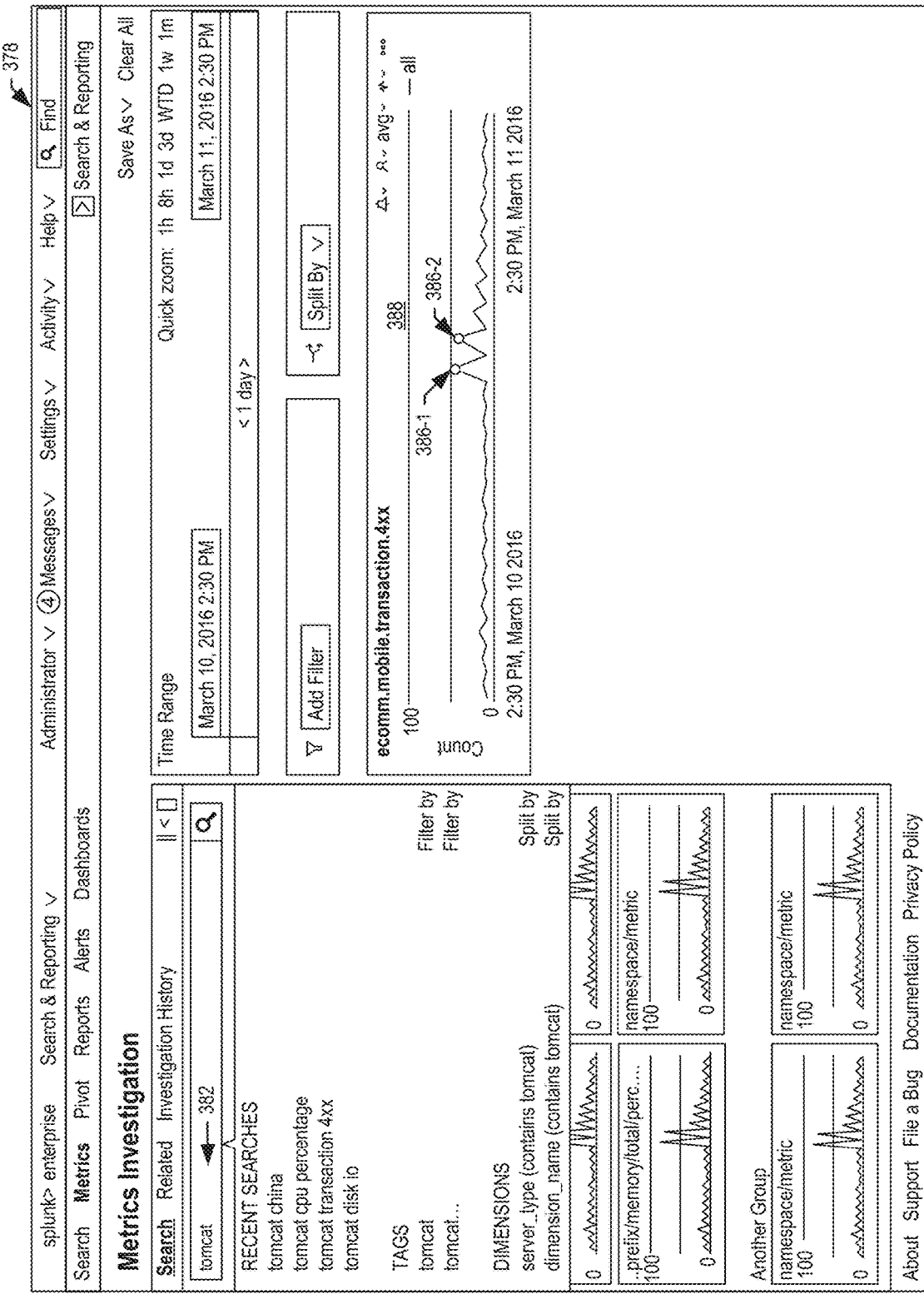
FIG. 49 illustrates a user interface screen of a metric investigation interface including dimensions of metrics data that can be split for visualizations according to some embodiments of the present disclosure.

In some embodiments, the user dashboard 378 is configured to monitor the one or more metric charts 380 to identify notable events, such as service anomalies, forecast changes, and/or other notable events. If a notable event is detected, the SPLUNK® ENTERPRISE system can generate an e-mail, chat message, or other communication to notify a user associated with the user dashboard of the notable event. In some embodiments, the communication includes a link to an investigative window, such as the investigation interface 380 illustrated in FIG. 47. In other embodiments, the user can search for one or more metrics identified with notable events. For example, as shown in FIGS. 45 and 46, a search bar 382 is included in the user dashboard 378. A user can enter a metric dimension, such as a metric name, in the search bar 382. In some embodiments, the search results are configured to highlight one or more metrics 384 with one or more notable events.

In some embodiments, one or more indicators 386 are overlaid on the metric chart 388 for the selected metric. The one or more indicators 386 identified one or more time periods corresponding to notable events of the selected metric. In the illustrated embodiment, the indicators 386-1 and 386-2 include dots, but it will be appreciated that the indicators can include any suitable indicator, such as a line, dot, arrow, and/or other indicator. In some embodiments, the metric visualization 388 can include additional information, such as, for example, a baseline visualization (not shown) overlaid on the chart to identify the typical trends corresponding to the time of day for the anomalies.

Figure 50:
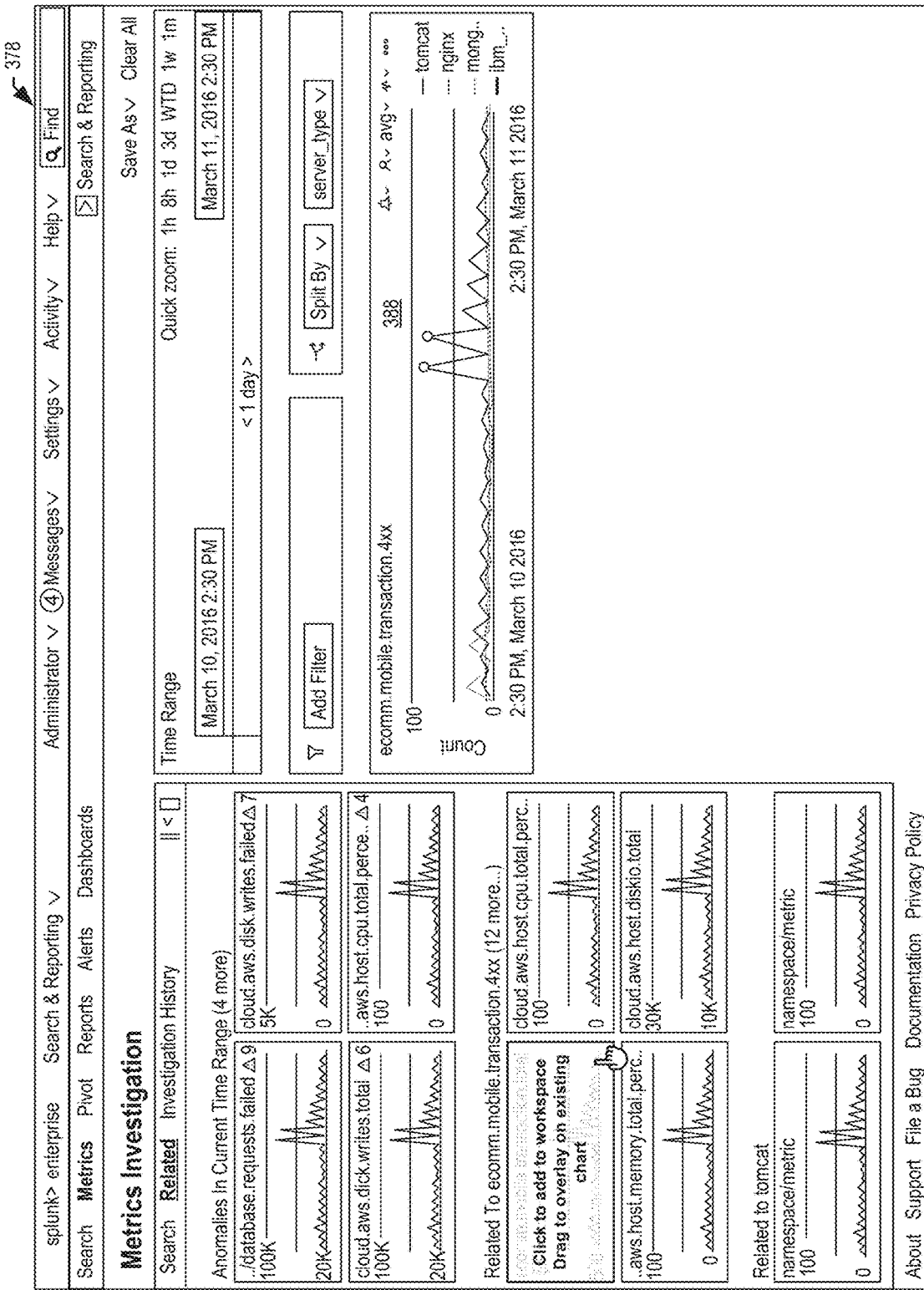
FIG. 50 illustrates a user interface screen of a metric investigation interface including a mechanism to add a workspace on an existing chart according to some embodiments of the present disclosure.

In some embodiments, the user dashboard 378 is configured to allow a user to filter the metrics data corresponding to the metric chart 388. For example, in some embodiments, the search bar 382 is configured to receive one or more dimensions. As discussed above with respect to process 3400, one or more dimensions can be selected to filter metric values of a selected metric. FIG. 50 illustrates the user dashboard 378 having a metric sorted by application. In some embodiment, sorting the metric by application (or other dimension) allows a user to quickly understand whether the anomaly is consistent across an entire platform (e.g., across all servers) or is an instance specific problem.

Figure 51:
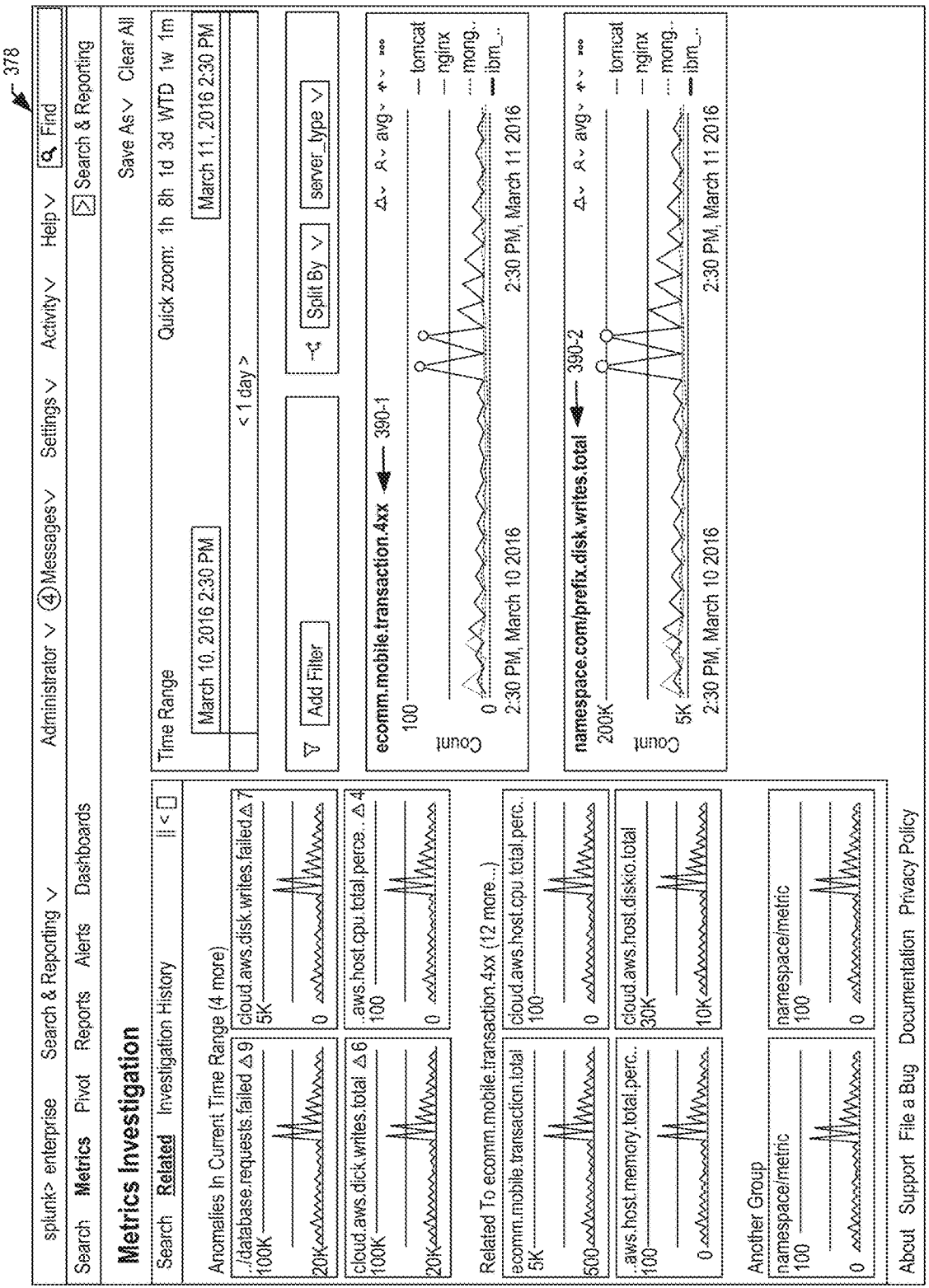
FIG. 51 illustrates a user interface screen of a metric investigation interface including separate visualizations of metrics data from different sources according to some embodiments of the present disclosure.
Figure 52:
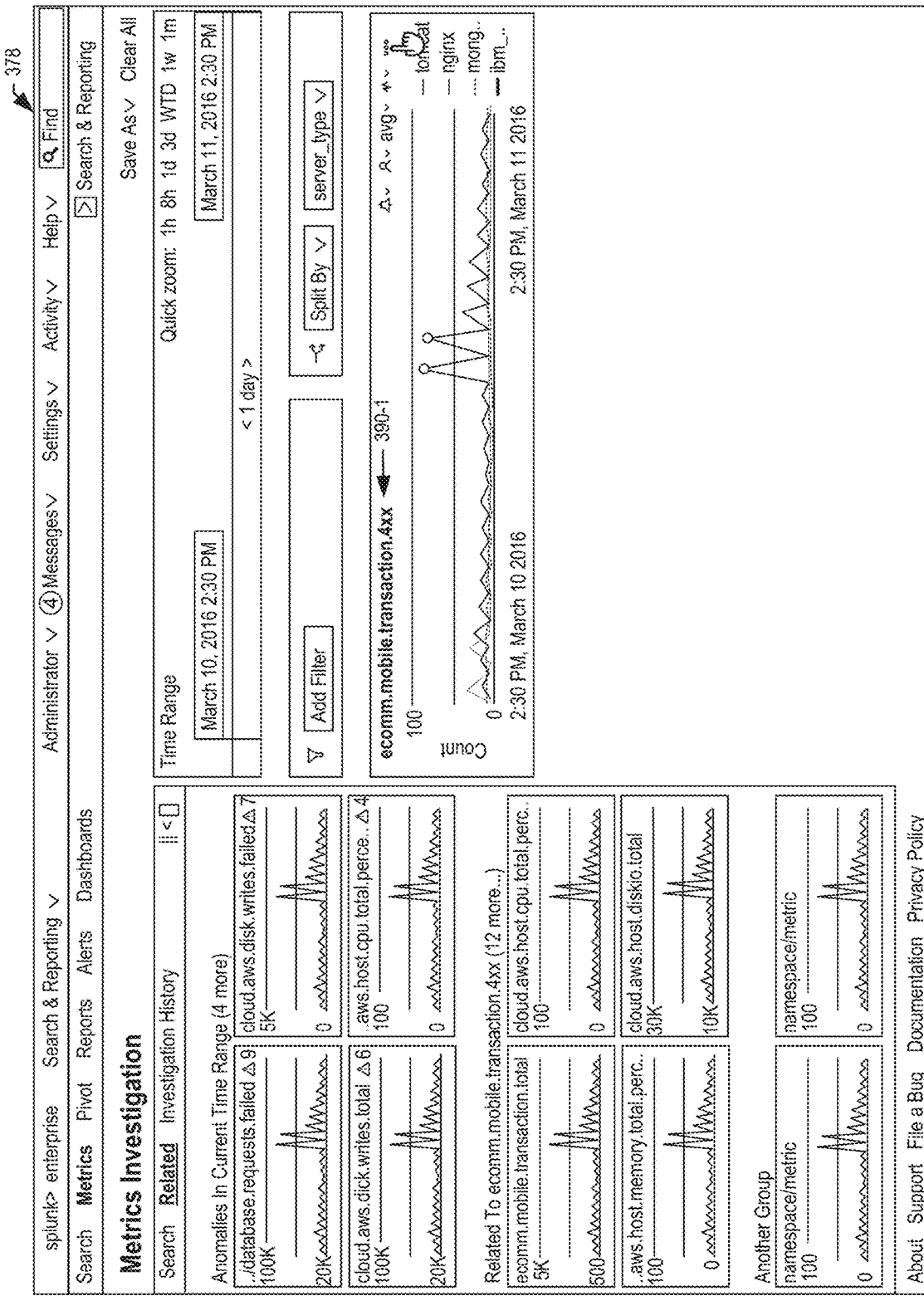
FIG. 52 illustrates a user interface screen of a metric investigation interface including query auto-completion according to some embodiments of the present disclosure.
Figure 53:
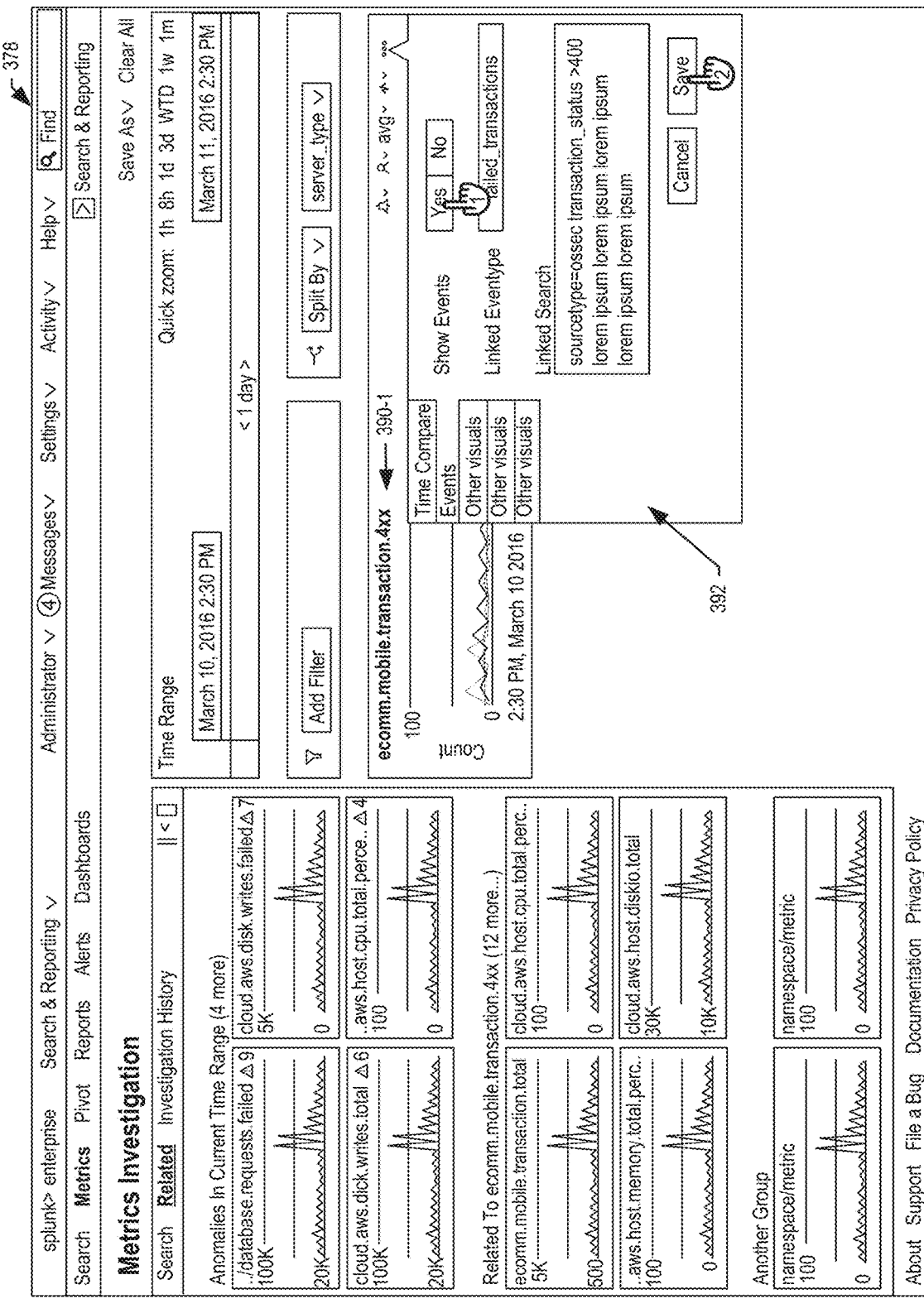
FIG. 53 illustrates a user interface screen of a metric investigation interface including an interface for customizing visualizations according to some embodiments of the present disclosure.

In some embodiments, one or more additional metrics can be selected and added to the user dashboard 378 to allow a user to understand how an environment has changed that may affect performance. In some embodiments, additional metrics are added over a common time window to be compared against the currently displayed metric 388 and/or added for a historical time window (such as yesterday/last week/last month). Each of the additional metrics and/or time windows can be added to the same window on the user dashboard 378. In some embodiments, a user may select one or more related metrics, such as available server counts, counts of transactions sent and responded to by each server, OS resource usage (e.g., CPU, Memory, Disk I/O, Network I/O) for each server, ingress/egress traffic and/or connections from each component, count of successful verse failed transactions by a server, and/or any other suitable related metrics. FIG. 51 illustrates a first metric 390-1 correlated with a second metric 390-2.

In some embodiments, the user dashboard 378 can allow a user to quickly visualize metric trends for one or more metrics for any selected time window, including historical and/or current time windows. In some embodiments, the metrics are presented such that a user can explore millions of time series data points from multiple data sources (such as REST API, Pub/Sub Subscriptions, JMX monitoring, scripted inputs, OSS Agents via TCP/UDP, etc.) and provide a quick time to value when generating visualization for a selected metric.

As discussed above, in some embodiments, the selected metrics 390-1 and 390-2 can have multiple collection frequencies and/or time resolutions (e.g., 15 seconds, 30 seconds, 1 minute, 5 minutes, etc.) depending on the technology and/or software component monitored, which can result in a different number of data points for the same time window for two or more metrics 390-1 and 390-2.

Figure 54:
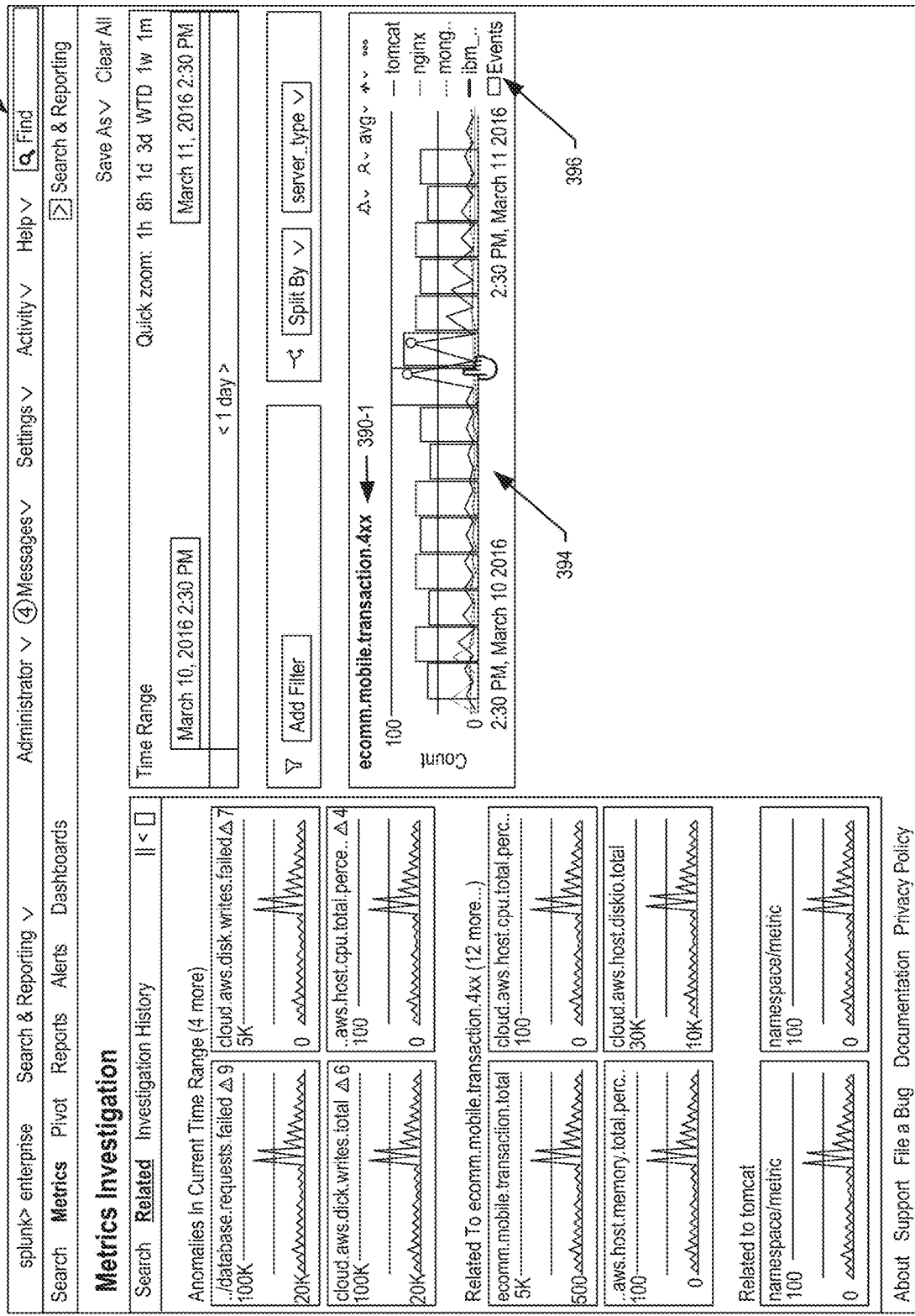
FIG. 54 illustrates a user interface screen of a metric investigation interface including various dimensions of overlaid visualizations according to some embodiments of the present disclosure.

In some embodiments, one or more events can be overlaid on a first metric 2202$i$ and correlated with the plurality of metric values of the first metric. For example, as shown in FIGS. 52 through 55, in some embodiments, a user dashboard 378 can include an overlay options box 392 configured to allow a user to overlay events corresponding to the metric values of the first metric 390-1. FIG. 54 illustrates an event visualization 394 (shown as a bar graph) overlaid on the first metric visualization 390-1. In some embodiments, a portion of the events visualization 394 and/or the first metric visualization 390-1 can be selected by a user to display log data associated with the selected events 396.

Figure 55:
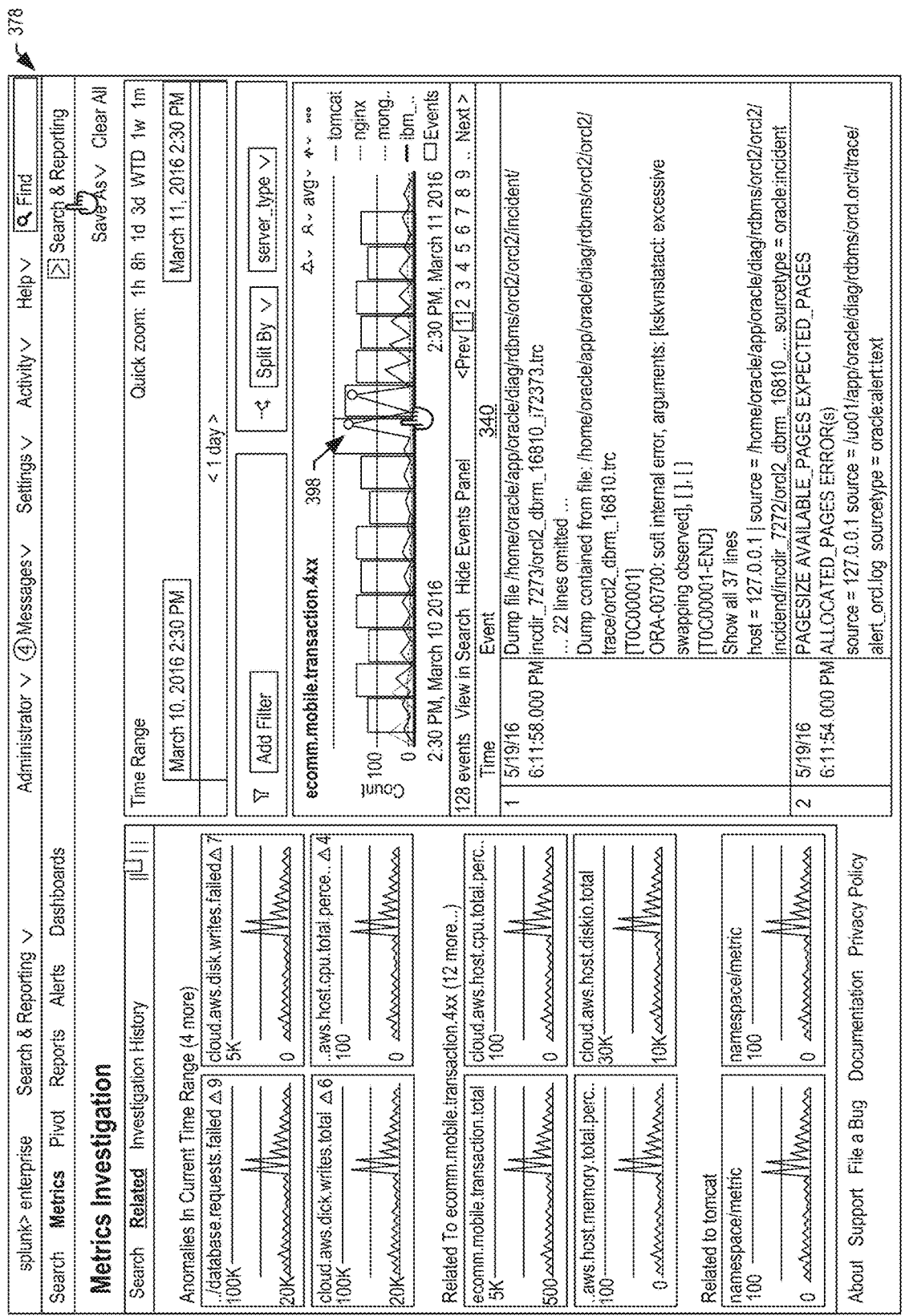
FIG. 55 illustrates a user interface screen of a metric investigation interface including a list of events selected from a visualization according to some embodiments of the present disclosure.

For example, as shown in FIG. 55, a user can select a first bar 398 of the events graph. A log file window 340 displays the log file associated with the time period corresponding to the selected bar 398 of the events graph. In some embodiments, multiple log files corresponding to the same time period can be displayed concurrently and/or sequentially in the log file window 340.

Figure 56:
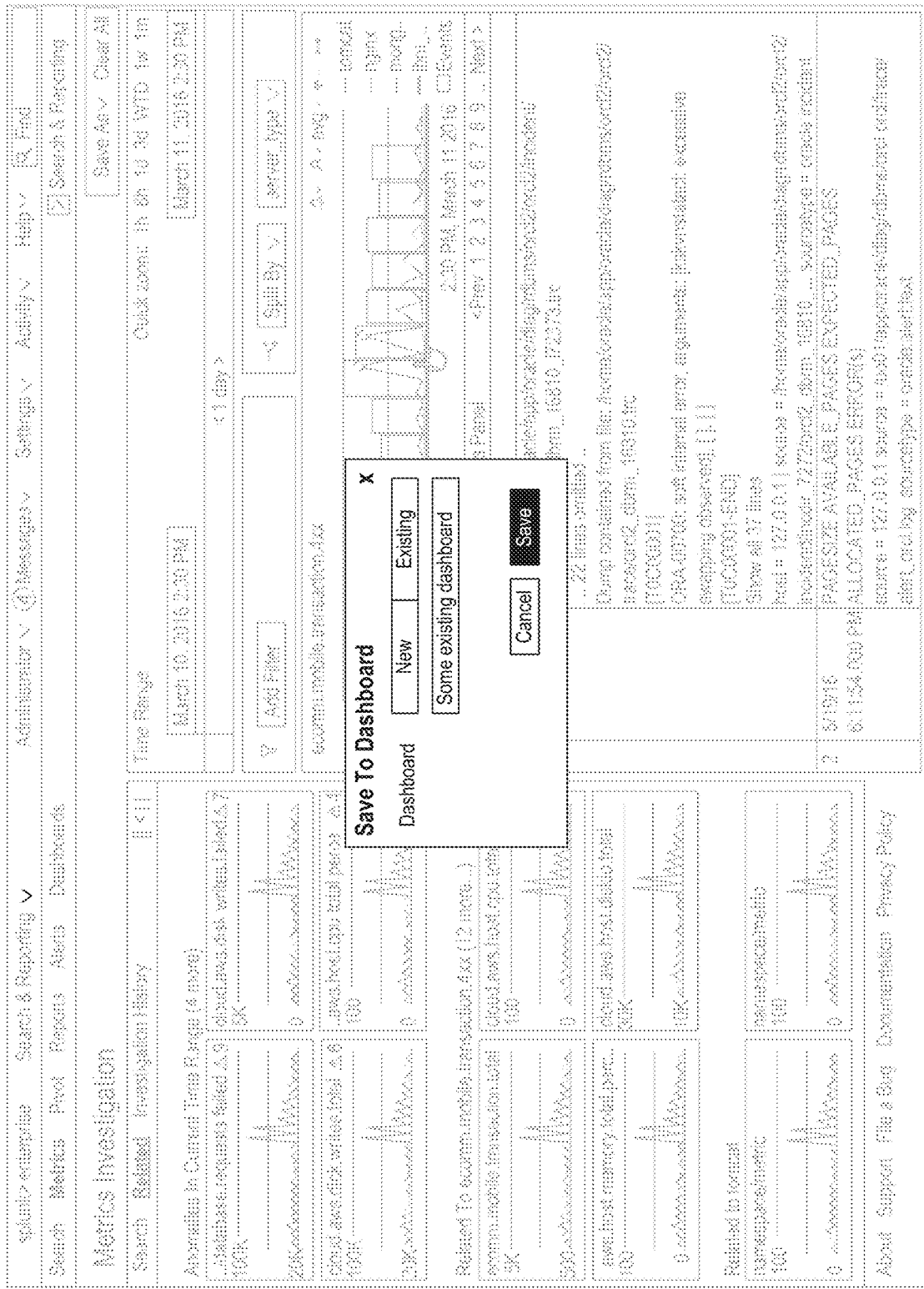
FIG. 56 illustrates a user interface screen of a metric investigation interface including an overlaid pop-up screen for saving an analysis to a dashboard according to some embodiments of the present disclosure.

As shown in FIG. 56, in some embodiments, a user can save a selected combination of metrics, events, log files, and/or other overlaid data to a user dashboard for future review and/or monitoring.

In some embodiments, the user dashboard 378 illustrated in FIGS. 44-66 can be used to investigate a cause of one or more service issues. For example, in one embodiment, a service interruption may occur that impacts a percentage of end-users in a production environment. An operational engineer (and/or other IT professional) can interact with the user dashboard 378 to identify the root cause of the service interruption. A specific use case is discussed herein with respect to FIGS. 44-56, although it will be appreciated that the user dashboard 378 can be used to review, analyze, investigate, and/or otherwise interact with one or more metrics to identify service anomalies, forecast service requirements, and/or perform additional IT tasks.

In some embodiments, the SPLUNK® ENTERPRISE system detects one or more notable events in one or more monitored performance characteristics, such as a lower than expected transaction throughput. The SPLUNK® ENTERPRISE system can generate a communication, such as an e-mail, a chat message, a text message, and/or other communication to one or more users who have selected transaction throughput as a monitored metric. For example, in some embodiments, an operations engineer has previously added a throughput metric (or related metric) to their user dashboard. The user can access a user dashboard 378, for example, through a supplied link to review the notable event(s).

In some embodiments, when the user opens the user dashboard 378, a metric is displayed to the user and notable event can be identified with one or more identifiers. In some embodiments, a baseline visualization is overlaid on the chart of the metric to show typical and/or forecasted behavior of the metric. In some embodiments, a user can sort the metric according to one or more dimensions to isolate problems specific to individual dimensions, such as individual servers or server clusters. In some embodiments, if no numeric outliers are identified, a user can investigate degradations across an operational environment.

In some embodiments, a user can review common metrics for a similar or identical time window as compared to the first metric to understand how the environment has changed. For example, in some embodiments, a user can add one or more additional metrics, such as a second metric, over the same time period. In some embodiments, a historical view of the first metric and/or the second metric can additionally and/or alternatively be added to the user dashboard 378. In some embodiments, the additional and/or alternative metrics can be used to identify the behavior change in the environment that resulted in the increase in transaction volume.

In some embodiments, the user can explore the multiple metrics and/or apply one or more aggregations of the selected metrics to diagnose a critical problem or to be proactive in isolating abnormal behaviors for any components in the environment. In some embodiments, the selection of one or more metrics can allow a user to isolate a problem, such as, for example, CPU usage being higher for a current concurrent workload than traditionally experienced. In some embodiments, a user can use the current and/or historical metrics to project additional capacity based on typical peak workloads and current workloads.

In some embodiments, the user dashboard 378 is configured to allow a user to automatically add comments to a ticket generated that includes one or more of the selected metrics.

In some embodiments, the user dashboard 378 is configured to provide quick visualization of one or more metric trends for any selected window of time. Historical analysis and/or real-time analysis can be used to identify production problems or analyze performance runs. In some embodiments, the SPLUNK® ENTERPRISE system is configured to allow a user to quickly access a user dashboard 378 and/or investigation interface 366 by access, for example, a link in a ticket.

In some embodiments, the user dashboard 378 is configured to provide exploration and/or visualization of millions of time series data points from multiple data sources and provide a quickest time value in generation a visualization for each selected metric. In some embodiments, the context of a metric is configured to dynamically update based on a selected time window and one or more applied filtered dimensions associated with the metric.

In some embodiments, the user dashboard 378 and/or an investigation interface 322 are configured to allow a user to review one or more resources, such as, for example, CPU and Memory usage in an operational environment. The user dashboard 378 is configured to provide a quick indicator of the count of one or more applications in a predetermined time window. A metric investigation process (such as the process 3400) can be used to filter all available metrics relevant to the selected applications and/or metrics related to components interacting with the selected applications. In some embodiments, the SPLUNK® ENTERPRISE system provides one or more visualizations to provide context with respect to each selected metric.

In some embodiments, the user dashboard 378 and/or an investigation interface 322 allow a user to quickly eliminate non-problem metrics or systems and focus only on those metrics and/or systems that show non-normal behavior. In some embodiments, aggregations can be applied to the selected metrics to characterize metric trends (e.g., sudden, consistent, progressive, periodic, etc.) across one or more components. The user dashboard 378 allows a user to quickly compare how/if any metrics have changed over a time period by selecting different time periods for the same metrics to isolate one or more problems.

In some embodiments, the user dashboard 378 is configured to allow analysis of aggregate values to reduce investigation time. One or more algorithms can be applied to the metrics and/or selected numeric datasets to highlight abnormal behavior and/or outliers. In some embodiments, a baseline visualization can be added to the metrics to highlight normal usage during the time period to understand the context of one or more outliers. Detecting and visualizing numeric outliers can provide additional focus for analysis, such as specific data points or time windows.

In some embodiments, the user dashboard 378 is configured to provide easily accessible summary aggregation information, such as, for example, by hovering a cursor (or other input) over one or more points on a metric visualization. Additional information, such as a median, min, max, percentile (e.g., 10th, 50th, 90th, etc.), count of data points, and/or other summary aggregation information can be automatically calculated and displayed for selected metric values.

In some embodiments, multiple metric visualizations can be added to a user dashboard 378 to allow for correlation and impact analysis. For example, the impact that one or more metrics have on other metrics can be investigated to determine the source of an increased resource usage.

In some embodiments, the user dashboard 378 is configured to allow a user to proactively monitor and analyze different metrics across different technology domains based on a subject matter expertise to proactively monitor technologies and diagnose problems. In some embodiments, the user dashboard 378 can provide a list of technologies that can be selected by a user. When a user selects a technology, a predetermined group of metrics can be presented to the user for analysis and review. In some embodiments, a baseline is automatically added to each of the predetermined group of metrics to eliminate the need for a user to manually compare trends of each metric over time. Additional metrics can be added to the user dashboard 378 by the user to further refine and/or analyze performance trends. In some embodiments, a user can generate a new dashboard 378 based on an investigation and/or modification of an existing technology selection. The user dashboard can be shared with additional users of the SPLUNK® ENTERPRISE system.

In some embodiments, a user can assign an alert to one or more metrics using the user dashboard 378. For example, in some embodiments, an alert can be added to a time series dashboard (i.e., a dashboard containing time series metrics) to generate a message to the user if one or more monitored metrics fall outside of a predetermined range. In some embodiments, the alert conditions include, but are not limited to, alerts such as: "Greater than," "Lesser than", and "equal to" a threshold or value and include normal, caution, or critical thresholds. In some embodiments, a status of an alert in the critical threshold (or the caution threshold) is automatically displayed on a user dashboard 378. In various embodiments, the thresholds can be static and/or adaptive thresholds.

In some embodiments, alerts can be sent to multiple users. Event suppression and/or notification can be configured and managed by single user of the SPLUNK® ENTERPRISE system and/or can be managed on a user-by-user basis.

In some embodiments, the SPLUNK® ENTERPRISE system is configured to provide future forecasts for one or more selected components based on historical metrics. For example, in some embodiments, the SPLUNK® ENTERPRISE system can scale over a high volume of metric queries to adjust a component forecast as additional metric values are collected.

3.11.1. Real Time Searches

The disclosed embodiments include various enhancements that improve the speed and performance of different types of searches. For example, the use of tstats queries improves over traditional stats queries because processing may only look at the indexed fields of tsidx files. Hence, the tstats command can perform rapid statistical queries of indexed fields in tsidx files. In some embodiments, the indexed fields can be from normal index data, tscollect data, or accelerated data models. Similarly, mstats commands can be used to improve the speed and performance of statistical queries of metrics data as described further below.

The disclosed embodiments also include various enhancements that improve the speed and performance of real-time searches. A real-time search enables searching and displaying a continuous view of metrics or non-metrics data as it streams into the data intake and query system. With real-time searching, data is searched before it is indexed. For example, real-time search results can be displayed in dashboards as the data streams in. Unlike searches based on indexed data (e.g., historical searches), time bounds for real-time searches can continuously update. For example, a user can specify a time range that represents a sliding window of data, and the data intake and query system uses this window to accumulate data that is viewable upon reaching the end of the window. In some embodiments, a user can disable real-time searches for a particular indexer, or grant the ability to use real-time search to specific users or roles. In some embodiments, a user can specify alerts that run continuously in the background for real-time searches.

In real-time searches, streams of pipelined data are received by index processors, which can handle the data in different ways. The index processors index the data in accordance with the techniques described herein. The indexed data is the basis for subsequent historical searches. In addition to indexing data, for active real-time searches, separate real-time search processes connect the index processors to a management port, to route the data satisfying the real-time searches as streams from the index processors to the management port. For example, an index processor may evaluate streaming events to determine whether any of those events have a certain index value, source value, and IP value that satisfy an active real-time search.

The pipelined data typically includes numerous field/key values that can be evaluated by the index processors for real time searches. Examples include source, source type, host, or any arbitrary field/key. In the context of log data, a source may indicate the log file on which log data is written to, a host may indicate the machine running an application from which the log data is generated, and a source type may indicate a grouping used to, for example, identify configuration files for subsequent processing of the log data. In contrast, in the context of metrics data, the source can indicate a metric name such as a computing resource (e.g., CPU sensor) and its associated measurement (e.g., temperature).

The data satisfying real-time search criteria is communicated over a communications link to a real-time communicator. This process acts as a real-time filter that reduces the amount of data communicated to the real-time communicator. In some embodiments, the real-time communicator is a process separate from the index processor that sends the identified data to the real-time communicator. In some embodiments, the communications link is HTTP-based or uses any standard network protocol. Specifically, data including values matching a predicate of a real-time search is queued and serialized by one or more index processors, communicated over communications links to one or more real-time communicators, de-serialized by the real-time communicators, queued and reported or communicated to a search head for reporting.

Hence, real-time communicators collect data satisfying real-time search criteria. In some embodiments, a real-time communicator can perform aggregations or statistical functions on collected data and post the aggregates or statistical results as real-time search results. In some embodiments, a real-time communicator can communicate the collected data to a search head, which can aggregate the data with other collected data or perform statistical operations on the collective data to obtain search results. The aggregated data or results of the statistical operations are then reported as search results.

In some embodiments, a number of real-time search processes can be run concurrently by using indexed real-time searches, which lessen the impact of performance on an indexer. An indexed real-time search runs like a historical search, but also continually updates with new data as it is recorded. An indexed real-time search can be used when up-to-the-second accuracy is not needed because the results returned by indexed real-time searches lag behind a real-time search.

The amount of data being serialized by index processors can negatively affect the performance of real-time searches. As such, it is desirable to minimize the amount of data needing to be serialized and communicated to a real-time communicator. The real-time filtering by the index processor helps minimize what data is actually serialized and communicated to the real-time communicator. As such, the real-time search results can be populated with relevant data without having to transfer all streamed data by the network processors. Although this real-time filtering is computationally costly, the overall performance of a real-time search is improved because less data is being serialized, communicated, and de-serialized.

The metrics store system 200 includes enhancements that further improve the performance of real-time searches. In particular, real-time searches can include enhancements that reduce overhead and can perform statistical queries completely in memory to reduce I/O processing. The enhancements can improve individual and concurrent real-time searches. In some embodiments, the metrics store system 200 can also enable real-time searching with backfilling powered by mstats to perform statistical queries on indexed metric data.

The streams of pipelined data received by index processors can be further processed to reduce the amount of data serialized for communication to real-time communicators. Specifically, in addition to indexing data, the index processors or a separate summarization processor can perform aggregation or statistical functions to create a summarization data structure that captures sufficient aggregate or statistical data for reporting search results while reducing the amount of data being communicated to real-time communicators.

The real-time filtering by index processors reduces the amount of data that needs to be communicated to the real-time communicators by identifying data that satisfies real-time search criteria. The filtered data is processed by index processors or separate summarization processors to further reduce the amount of data needing to be communicated to real-time communicators. For example, the filtered data can be processed by aggregation or statistical functions to further reduce the amount of data that needs to be communicated. The resulting summarized data is serialized, routed to a real-time communicator over the communications link, and is de-serialized by the real-time communicator.

Thus, the real-time communicator can collect summarized data satisfying real-time search criteria. As a result, the real-time communicator and/or a search head need not perform aggregations or statistical functions on the data it collects. Instead, the real-time communicator can report the summarized data as real-time search results or, in the context of a distributed search, the search head implementing map-reduced techniques can harmonize the summarized data with partial search results from other sources to obtain the final real-time search results.

In some embodiments, the disclosed embodiments can include auto-aggregation functions for preselected metrics or any metrics data. For example, the auto-aggregation functions can aggregate metrics data automatically to respond quickly to real-time searches and/or historical searches. Thus, the enhanced processes disclosed herein for handling real-time search results is improved because the aggregation or statistical operations can be performed in memory to reduce overhead and the need to communicate data otherwise required for real-time searches. These disclosed techniques also improve scalability of real-time searches as a result of lower overhead and I/O processing.

Figure 57:
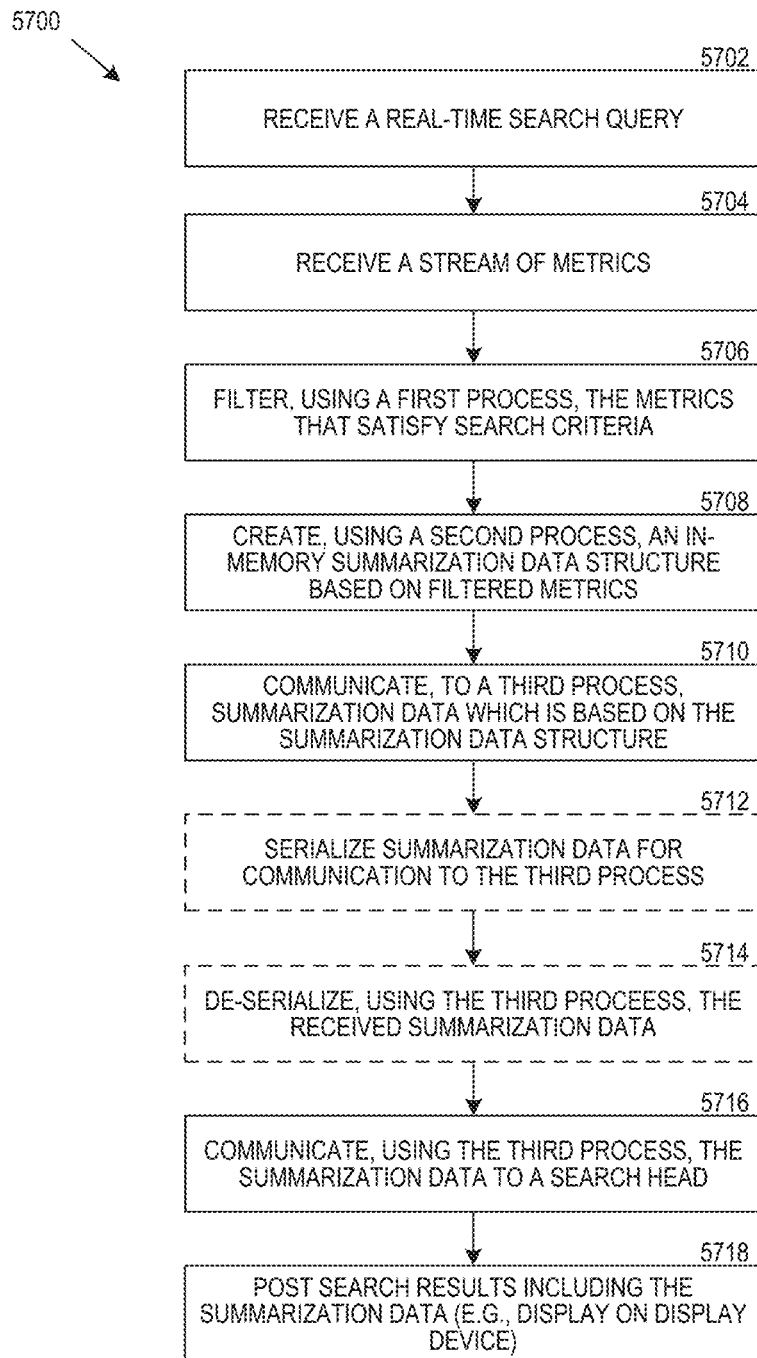
FIG. 57 is a flow diagram illustrating a method for performing real-time searches according to some embodiments of the present disclosure.

FIG. 57 is a flow diagram illustrating a method for performing real-time searches according to some embodiments of the present disclosure. Although described in the context of metrics data, the method illustrated in FIG. 57 can be implemented with any type of data including time-indexed events. The method 5700 is performed, at least in part, by a data intake and query system. Moreover, many or all of the steps of the method 5700 are performed in real time.

In step 5702, the data intake and query system receives a real-time search query including search criteria. In step 5704, the data intake and query system receives a stream of metrics. In some embodiments, the real-time search query is automatically generated and executed without user input as an auto-aggregation function.

In step 5706, a first process (e.g., index processor) can filter the stream of metrics to obtain filtered metrics satisfying the search criteria. In some embodiments, the metrics being evaluated by the index processor are also indexed in the metrics store.

In step 5708, a second process (e.g., index process or summarization processor) can create an in-memory summarization data structure based on the plurality of filtered metrics. In some embodiments, the summarization data structure includes aggregate or statistical data derived from the plurality of filtered metrics.

In step 5710, the summarization data structure is communicated to a third process (e.g., real-time communicator). For example, in step 5712, the second process serializes the summarization data for communication to the third process. The, in step 5714, the third process de-serializes the received summarization data. In some embodiments, the summarization data is communicated from the second process to the third process over an HTTP-based communications link.

In step 5716, the third process can communicate the summarization data to a search head. In step 5718, the search head can post search results including the summarization data, for example, by causing a display device to display the search results. In some embodiments, the summarization data constitutes partial search results, which are aggregated by the search head with other partial search results to produce final search results that satisfy the real-time search query.

3.11.2. Accelerated Searches of Metrics Data

To speed up certain types of metrics queries, some embodiments of the data intake and query system can create "metrics acceleration tables," which contain metrics data and/or data related to metrics data. The data can include key values of metrics data. Examples of keys include metric names, meta keys, dimensions, or measurements. A metrics acceleration table may be populated as a result of a search query applied to metrics data. The data intake and query system can then use the metrics acceleration table to accelerate subsequent queries related to results of the original search query.

The data intake and query system can accelerate subsequent metrics queries by using data contained in the metrics acceleration table to return search results while avoiding processes otherwise required to obtain initial metrics search results. In other words, subsequent queries take advantage of earlier queries by using the metrics acceleration table to skip processing steps of earlier queries. For example, the data intake and query system may receive a search query for metrics that have specified dimension values. A metrics acceleration table produced in response to the search query can be used for subsequent statistical queries about the metrics having the specified dimension values.

The metrics acceleration tables are populated at search time. The basis for the metrics acceleration tables are metric-series index (msidx) files that can be populated at index time. The msidx files may be self-contained files populated with key values extracted from ingested metrics to facilitate searching metrics data. Search queries can be more quickly processed by scanning the msidx files. In other words, the msidx files provide a rapid alternative compared to searching each metric individually. The acceleration tables, which are based on the msidx files, accelerate subsequent queries related to search results of earlier queries that used the msidx files to obtain the search results. As a result, the acceleration tables provide a further rapid alternative compared to using the msidx files.

Figure 58:
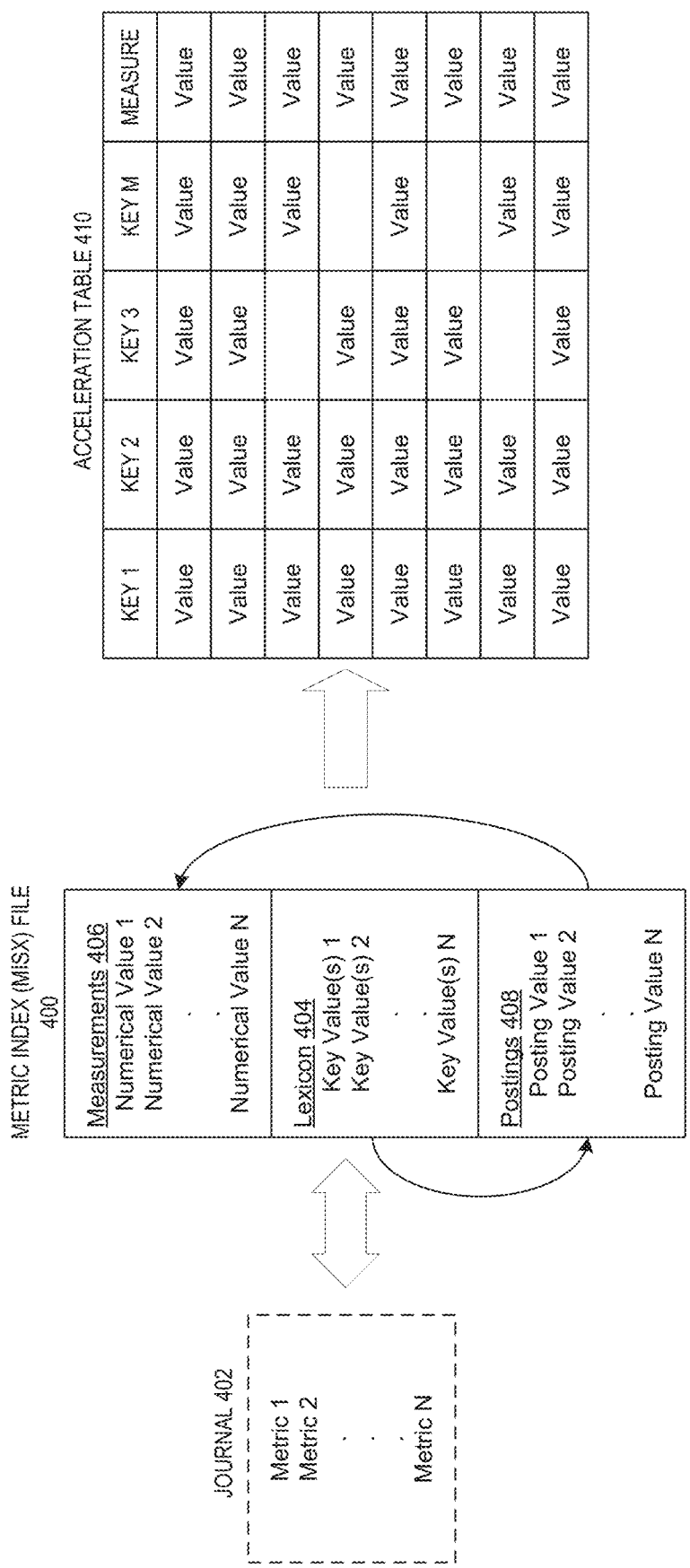
FIG. 58 is a block diagram illustrating examples of a msidx file, optional companion journal, and an acceleration table, used to process queries for metrics data according to some embodiments of the present disclosure.

FIG. 58 is a block diagram illustrating examples of a msidx file, optional companion journal, and an acceleration table used to process queries for metrics data according to some embodiments of the present disclosure. In some embodiments, the msidx file 400 can associate key values of metrics with references to locations of the metrics stored in an optional companion journal 402. For example, at index time, ingested metrics can be processed to extract key values (e.g., meta values, user defined values, measure values). The msidx file 400 can be populated with the extracted key values, and map the key values to the metrics maintained in the companion journal 402. Then, in response to a query, the msidx file 400 is searched for data satisfying query criteria, and metrics or related data can be extracted from the companion journal 402 and returned as query results. The data from the companion journal 402 may be extracted in accordance with configuration files for identified metrics. For example, the configuration files may define extraction rules that are specific to a source or source type of metric, and those extraction rules can be used to extract data from the metrics.

In some embodiments, each "bucket" of metrics includes its own msidx file. In some embodiments, each bucket contains its own companion journal. As such, processing a search query may require scanning the msidx files of multiple buckets to obtain search results. In some embodiments, to speed up searches, bloom filters can be used to narrow the set of msidx files that must be searched to obtain search results.

An advantage of maintaining the separate companion journal 402 is that the msidx file can be more compact compared to the companion journal 402 because it only includes some data of the companion journal 402 and/or references to data contained in the companion journal 402. This is particularly advantageous when the companion journal 402 contains large amounts of raw data. However, in some embodiments, the companion journal 402 is unnecessary to process queries if all the relevant metrics data is contained in the msidx file 400. For example, unlike events that include raw data, metric data is typically structured data such that it excludes raw data. As a result, the data intake and query system would not need to use the optional companion journal 402 to process queries if the msidx file contains all the data satisfying query results.

The structure and contents of a msidx file can facilitate rapid processing of metrics queries. In some embodiments, a msidx file is structured to include distinct sections (e.g., distinct portions of the msidx file). For example, a msidx file may include a section that contains an array of time values for metrics data, and/or a section that contains an array of metrics identifiers and location information for the metrics stored in a companion journal. However, again, including references to metrics in a companion journal may be unnecessary if all the meaningful metrics data is included in a msidx file.

Structuring a msidx file to include distinct sections of metrics data can facilitate processing queries by limiting the sections that are searched in response to a query and mapping the searched sections to other sections of the msidx file that contain query results or data indicative of the query results. For example, the msidx file 400 includes a lexicon section 404 ("lexicon 404") that contains key values extracted from metrics data at index time. For example, the lexicon 404 may include each key values for required dimensions, optional dimensions, user specified dimensions, meta keys, keywords, or combinations thereof. In response to a query, the lexicon 404 may be the only section of the msidx file 400 that is searched for data indicative of results. The lexicon 404 can be mapped to other sections of the msidx file 400 to retrieve the results.

The msidx file 400 includes a distinct measurements section 406. The measurements section 406 includes all of the numerical values of the metrics data. Although the lexicon 404 could include all these numerical values, the cardinality of the numerical values is so great that it could bloat the lexicon 404 and reduce the efficiency of searching the lexicon 404. For example, each measurement can be a precise floating point numerical value with multiple decimal places. As a result, there would be very few repeating measurement values among the metrics, except possibly for a value such as zero. Moreover, in practice, a user would rarely search for a specific measurement value. As such, keeping the measurement values in the lexicon 404 would have little benefit and could hinder searches. As such, the msidx file 400 has a distinct section that contains an array of all the numerical values extracted from metrics data at index time and recorded in the measurements section 406 to overcome these drawbacks. For example, the measurements section 406 may include a row for each numerical value entry of ingested metrics. In some embodiments, maintaining the numerical values in a separate array allows for implementing compression techniques such as delta-of-delta timestamps and XOR-based compression of the floating point values to reduce storage requirements and enable storing data in-memory, reducing latency, and improving query throughput.

The msidx file 400 may also include a posting section 408 ("postings 408") that maps key values of the lexicon 404 to other sections of the msidx file 400 such as the measurements section 406. The sections of the msidx file 400 can be structured to map entries in one section to entries in another section. In particular, row entries of one section can correspond to row entries of another section. For example, the lexicon 404 may include N entries in N rows. The postings 408 may also include N entries in N rows such that the kth row of the lexicon 404 corresponds to the kth row of the postings 408. As such, values of different sections that correspond to each other can be inferred from the structure and order of the entries in those sections.

In some embodiments, entries of sections may contain explicit references to other entries in other sections of the msidx file 400. For example, the lexicon 404 can include N entries in N rows, and the postings 408 can include N entries in N rows, each including an identifier to a numerical value of the measurements 406. In some embodiments, the postings 408 may include references to metric identifiers and/or references to locations of corresponding metrics stored in the journal. Thus, the structure and/or content of the msidx file 400 and its sections can create implicit and/or explicit paths to metrics data contained in the msidx file 400 or elsewhere (e.g., the companion journal 402).

During search time, a query may include criteria that specifies key values (e.g., user defined dimension value pairs) contained in the lexicon 404 of the msidx file 400. The lexicon 404 is scanned to identify the specified key values. The relative locations of lexicon entries that contain the specified key values can be used to identify corresponding entries in the postings 408, which can include references to numerical values of the measurement 406 or metric identifiers in another section (not shown).

For example, the criteria of a search query may include the value "device.voltage" for a "name" dimension. The lexicon 404 of the msidx file 400 can be searched for the specified dimension values. The second entry of the lexicon 404 may include a specified dimension values, and the corresponding second entry of the postings 408 may identify three metrics taken at times 0, 10, and 20 that have a value of "device.voltage" for the name dimension. The measurements identifiers in the second entry of the postings 408 can be used to identify the corresponding numerical values of 0.7, 0.8, and 1.2 of the measurements 406. As such, the numerical values that satisfy the query can be retrieved using the msidx file 400. Thus, when the data intake and system receives queries, it will scan the msidx files 400 for criteria without needing to search a companion journal file.

In some embodiments, the process for searching metrics detailed above is repeated for each and every query. Hence, even though the use of msidx files enhances searching by avoiding the need to search a journal of metrics, using the msidx files for searching over the same metrics can be inefficient. For example, a first search query may specify a source name, and msidx files can be used to retrieve metric values associated with that source name. A second search may specify a statistical analysis to be performed of metrics that contain the specified source name of the first search query. As such, performing the second query would require at least the same steps performed for the first search query, and additional steps to complete the statistical process.

Accordingly, performing the second subsequent query is inefficient because it fails to take advantage of the execution of the first query.

To speed up certain types of metrics queries, acceleration tables that contain metrics data and/or data related to the metrics data can be created from earlier search queries based on msidx files. FIG. 58 includes an example of an acceleration table 410. The mechanism that creates the acceleration table 410 can be initiated automatically or manually by a user per search, and/or per bucket. For example, a user can set a data model that can automatically generate and use acceleration tables to perform specialized searches. In another example, a user can submit a command through a user interface to accelerate query processing by using acceleration tables. Then, upon receiving search queries, the system can generate and subsequently scan acceleration tables to accelerate searches. For example, a user can append a first SPL search command with a second SPL command causing the system to operate on an acceleration table created by the first SPL search command, to obtain search results that avoid consulting the msidx files, configuration files, extraction rules, etc.

At search time, the acceleration table 410 is generated based on msidx file 400. Specifically, the acceleration table 410 is populated with search results including key values for a set of metrics. The search results are obtained based on the msidx file 400 in accordance with the query process above. The acceleration table 410 is enriched with other key values that were not part of the search results. The other key values were obtained from the same set of metrics. Hence, the size of the acceleration table 410 depends on the key values included in the search results and other key values that were not included in the search results. The other key values used to enrich the acceleration table 410 are identified using configuration files of the set of metrics. As indicated above, different types of data may be associated with different configuration files that define different extraction rules used to extract values from that data. Hence, different configuration files may be processed to populate the acceleration table 410.

In particular, the configuration files for metrics identified at search time can be used to populate an acceleration table by applying the extraction rules of the configuration files to the identified metrics. For example, the data intake and query system could retrieve different configuration files for different source types of identified metrics. Some or all the extraction rules defined by the configuration files can be used to extract some or all the key values that are extractable. The acceleration table 410 is thus, for example, populated with search results and all other key values associated with the metrics data of the search results.

As shown, the acceleration table 410 can have a columnar structure where metrics data is stored in columns instead of rows. Specifically, each column may correspond to a key of the metrics identified at search time. In some embodiments, the acceleration table 410 may include cells that are empty. For example, the identified metrics may be associated with different source types that have different configuration files defining different extraction rules. As a result, some cells of the acceleration table 410 are empty because different extraction rules are not relevant to all the identified metrics. Moreover, since the acceleration table 410 includes at least some columns that can map to the rows of the msidx file 400, the msidx file 400 itself can be derived from the acceleration table 410, if desired.

The contents of the acceleration table 410 form a lexicon, which can be scanned at search time to process certain types of queries. Since the acceleration table 410 includes all the key values for a set of metrics, it does not need to include references to the metrics data recorded in the msidx file 400 or the companion journal 402. Thus, scanning the acceleration table 410 to obtain query results eliminates the need to scan the msidx file 400 and/or the companion journal 402. As a result, processing queries related to metrics data contained in the acceleration table 410 is quicker because there is no need to consult the msidx file, the companion journal 402, configuration files, extraction rules, etc.

Specifically, the data intake and query system can process subsequent queries quickly by using data contained in the acceleration table 410 rather than searching the metrics data all over again in the msidx file 400 or the companion journal 402 via the msidx file 400. For example, a user may seek to perform an aggregation or statistical analysis of metrics that include particular values in particular keys. To this end, the system can examine entries in the acceleration table 410 to perform the statistical analysis on the specific values in the specific keys without having to examine the individual metrics or perform data extractions at search time. Thus, rather than perform another search and extraction process involving the msidx file 400 or the companion journal 402, the acceleration table can be used alone.

For example, criteria of a first search query may specify a "device.voltage" value for a "name" dimension. The data intake and query system could return metric data that satisfies the search query and transparently populate an acceleration table with the search results and all other key values of metrics that include the "device.voltage" value in the "name" dimension. Then, the data intake and query system may receive a query specifying criteria including a count of metrics that have a "device.voltage" value for the "name" dimension.

Without the acceleration table 410, the data intake and query system would need to search and/or extract metrics data satisfying the criteria and then perform a count of specified key values to obtain search results. However, with the acceleration table 410, the data intake and query system can examine entries in the acceleration table 410 to count instances of "device.voltage" in the "name" dimension without having to examine the msidx file 400 or the individual metrics recorded on the companion journal 402, or perform data extractions at search time.

In some embodiments, the data intake and query system can maintain a separate acceleration table for each bucket that stores metrics for a specific time range. A bucket-specific acceleration table includes entries for specific key value combinations that occur in metrics in the specific bucket. In some embodiments, the data intake and query system can maintain a separate acceleration table for each indexer. The indexer-specific acceleration table includes entries for metrics in that are managed by the specific indexer. Indexer-specific acceleration tables may also be bucket-specific. However, the disclosed embodiments are not so limited. Instead, acceleration tables can be defined based on any range or parameter used to limit a search operation.

In some embodiments, an acceleration table can include references to metrics from which key values can be extracted. If the data intake and query system needs to process all metrics that have a specific key-value combination, the data intake and query system can use the references in the acceleration table entry to directly access the metrics in the journal. For example, when the acceleration tables do not cover all of the metrics that are relevant to a search query, the system can use the acceleration tables to obtain partial results covered by acceleration tables, but the system may also have to search through metrics data that is not covered by the acceleration tables to produce the remaining results. These remaining results can then be combined with the partial results to produce a final set of results for the query. In some embodiments, the msidx files or acceleration tables can be cached in the memory for a faster search.

Figure 59:
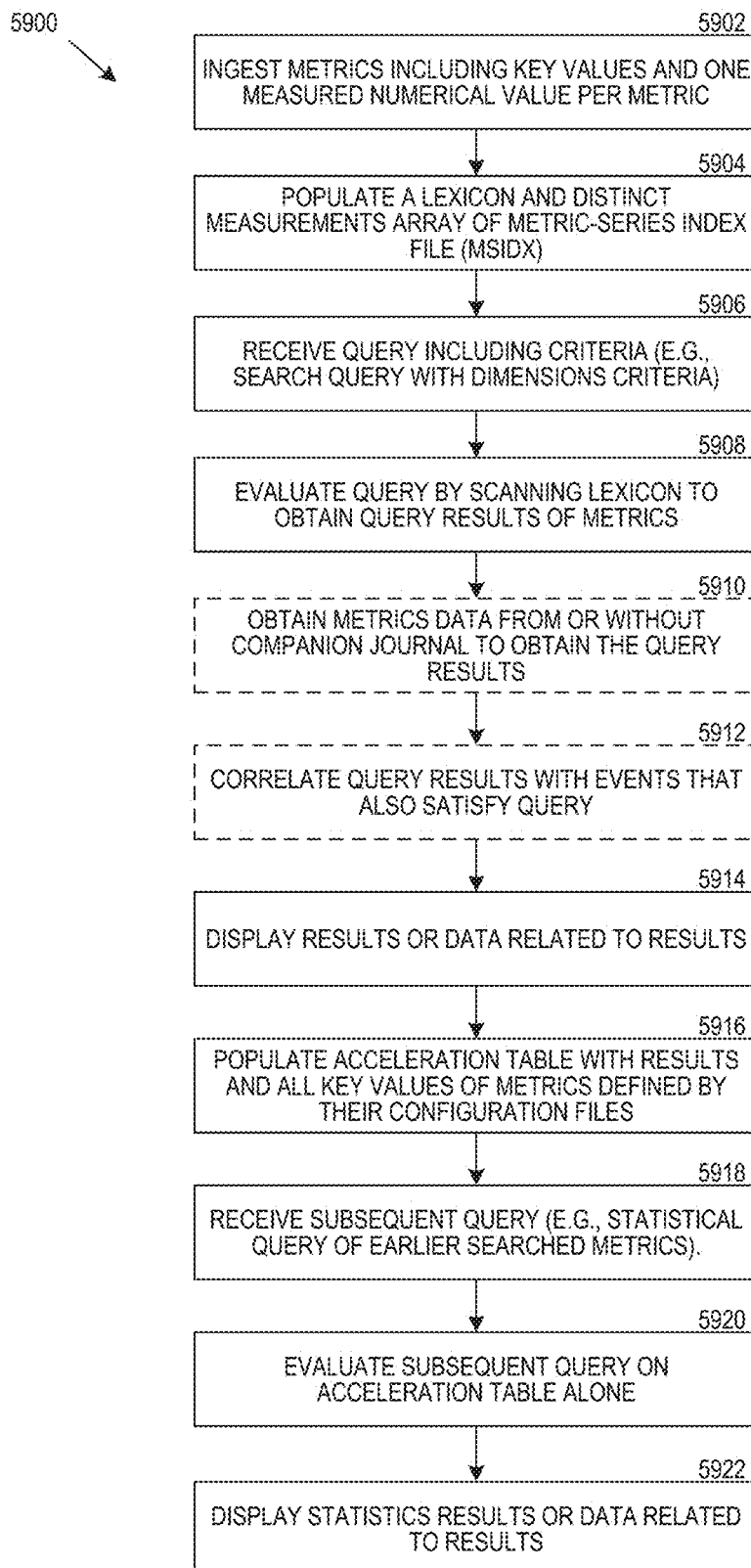
FIG. 59 is a flow diagram illustrating a method for performing metrics queries according to some embodiments of the present disclosure.

FIG. 59 is a flow diagram illustrating a method for performing metric queries according to some embodiments of the present disclosure. In step 5902, the data intake and query system ingests data including metrics (e.g., semi-structured or structured metrics data). In some embodiments, the metrics are received by the data intake and query system over a computer network from remote computer systems. Each metric can include numerous key values and at least one or only one numerical value (e.g., a floating point value) indicative of a measured characteristic of a computing resource. In some embodiments, the characteristic is a utilization of a processor, a temperature of an electronic component, or a voltage reading of an electronic component.

In step 5904, the data intake and query system populates a first portion of a metric-series index (msidx) file with the key values and a second portion of the msidx file with every numerical value indicative of a measured characteristic. The first portion may be a lexicon section, which is distinct from a measurements (e.g., second) section.

In some embodiments, the metrics are multi-dimensional metrics, where each metric has a number of dimensions including required dimensions that must have values and/or optional dimensions that can have values. Examples of the required dimensions include a time dimension including a value indicative of when a measured characteristic was measured, and a name dimension including a value indicative of a source of the measured characteristic. Examples of optional dimensions include a host dimension, a manufacturer dimension, or a model dimension. In some embodiments, the optional dimensions were specified by a user before or after ingestion of the metrics. Moreover, in some embodiments, at least some of the numerical values are indicative of a time series of measured characteristics of the same computing resource.

In step 5904, the data intake and query system receives a query, including criteria. In some embodiments, the query is input by a user and expressed as an SPL command. In some embodiments, the criteria may include values for required or optional dimensions. In step 5906, the data intake and query system evaluates the query by applying the criteria to the lexicon of the msidx file to obtain query results indicative of metrics that satisfy the criteria. For example, in step 5910, the query results are obtained by extracting data from the metrics stored in a journal distinct and separate from the msidx file, where each location of each metric stored in the journal is referenced in the msidx file. In another example, the query results are obtained from the msidx file without retrieving data from the journal storing the metrics.

In some embodiments, the query may specify a desired correlation operation between metrics and non-metrics data. For example, in step 5912, the data intake and query system can extract field values from time-indexed events that also satisfy search criteria and correlate the extracted field values and the metrics query results to obtain correlation results. Then, in step 5914, the query results (or correlation results) or data indicative of the query results (or correlation results) can be displayed on a display device.

In some embodiments, an acceleration table is produced to accelerate subsequent queries. In step 5916, the data intake and query system populates an acceleration table with the previous (e.g., first) query results obtained and additional key values of the metrics that satisfy the previous (e.g., first) criteria as defined in at least one configuration file associated with the metrics that satisfy the first criteria.

In step 5918, the data intake and query system receives another (e.g., second) query including other (e.g., second) criteria having a scope including the metrics that satisfied the previous (e.g., first) query. In some embodiments, the second query can be a second SPL command that appends the previous (e.g., first) SPL command. For example, the first SPL command can be a search command for certain metrics, and the second SPL command can be an aggregation or statistical command including the same certain metrics.

In step 5920, the data intake and query system can evaluate the second query by applying the second criteria to the acceleration table to obtain second query results without applying the second criteria to the msidx file. Lastly, in step 5922, the second query results or data indicative of the second query results can be displayed on a display device.

4.0. Computing System Architecture

Figure 60:
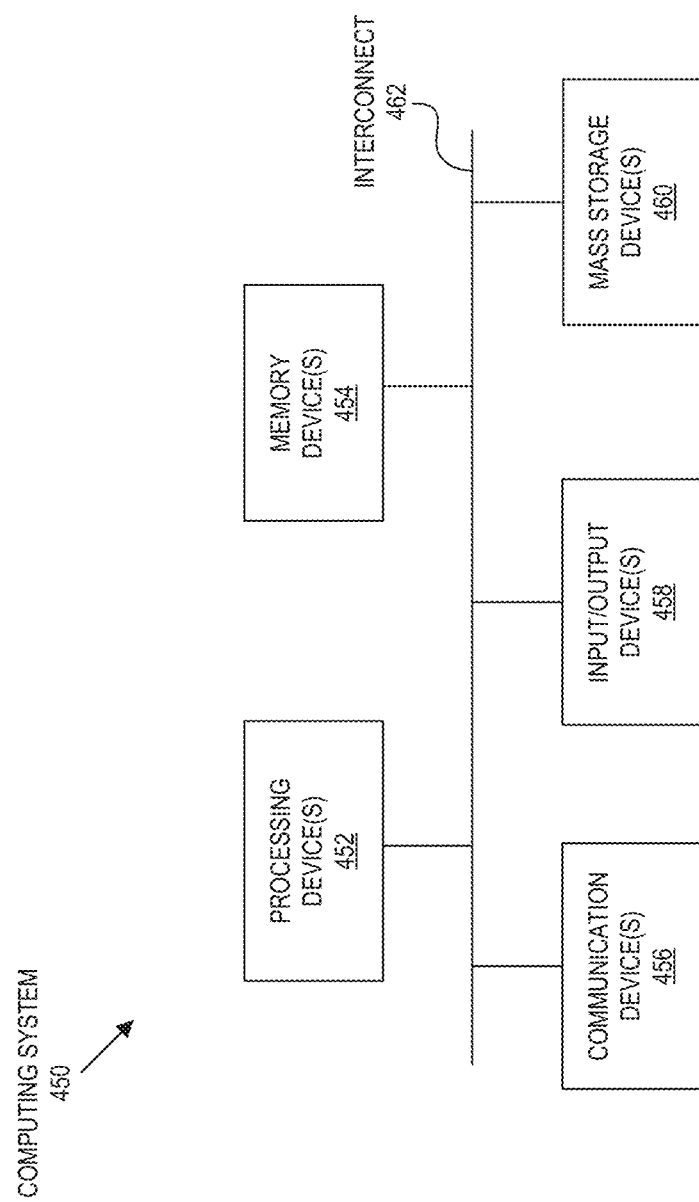
FIG. 60 is a block diagram illustrating a high-level example of a hardware architecture of a computing system in which an embodiment may be implemented.

FIG. 60 is a block diagram illustrating a high-level example of a hardware architecture of a computing system in which an embodiment may be implemented. For example, the hardware architecture of a computing system 450 can be used to implement any one or more of the functional components described herein (e.g., metrics ingestion component 202, metrics catalog and search component 204, metrics analysis component 206, metrics sharing component 208, or metrics store component 210). The computing system 450 can also be used to implement any of a forwarder, indexer, search head, data store, or a computing resource. In some embodiments, one or multiple instances of the computing system 450 can be used to implement the technologies described herein, where multiple such instances can be coupled to each other via one or more networks.

The processes and logic flows described in this specification can be performed by one or more programmable processors executing one or more computer programs to perform functions by operating on input data and generating output. For example, the computing system 450 includes one or more processing devices 452, one or more memory devices 454, one or more communication devices 456, one or more input/output (I/O) devices 458, and one or more mass storage devices 460, all coupled to each other through an interconnect 462.

The interconnect 462 may be or include one or more conductive traces, buses, point-to-point connections, controllers, adapters, and/or other conventional connection devices. Each of the processing devices 452 controls, at least in part, the overall operation of the processing of the computing system 450 and can be or include, for example, one or more general-purpose programmable microprocessors, digital signal processors (DSPs), mobile application processors, microcontrollers, special purpose logic circuitry, e.g., a field programmable gate array (FPGA) or an application specific integrated circuit (ASIC), or the like, or a combination of such devices.

Each of the memory devices 454 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 460 can be or include one or more hard drives, digital versatile disks (DVDs), flash memories, or the like. Each memory device 454 and/or mass storage device 460 can store (individually or collectively) data and instructions that configure the processing device(s) 452 to execute operations to implement the techniques described above.

Processors suitable for the execution of a computer program include, by way of example, both general and special purpose microprocessors, and any one or more processors of any kind of digital computer (e.g., processing devices 452). Generally, a processor will receive instructions and data from a read-only memory or a random access memory or both. The essential elements of a computer are a processor for performing instructions and one or more memory devices for storing instructions and data. Generally, the computer system 450 will also include, or be operatively coupled to receive data from or transfer data to, or both, one or more mass storage devices for storing data, e.g., magnetic, magneto optical disks, or optical disks. However, a computer need not have such devices.

Each communication device 456 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 452, each I/O device 458 can be or include a device such as a display (which may be a touch screen display), audio speaker, keyboard, mouse or other pointing device, microphone, camera, etc. Note, however, that such I/O devices 458 may be unnecessary if the processing device 452 is embodied solely as a server computer.

The computing system 450 can include clients or servers. A client and server are generally remote from each other and typically interact through a communication network. The relationship of client and server arises by virtue of computer programs running on the respective computers and having a client-server relationship to each other. In the case of a client device, the communication devices(s) 456 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 456 can be or include, for example, any of the aforementioned types of communication devices, a wired Ethernet adapter, cable modem, DSL modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 454). A processor (e.g., processing device(s) 452) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 452), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 454).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 450 can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor (e.g., processing devices 452) and the memory (e.g., memory device 454) can be supplemented by, or incorporated in, special purpose logic circuitry.

To provide for interaction with a user, architecture provider or reviewer, embodiments of the subject matter described in this specification can be implemented with a display device of the I/O devices 458, e.g., a CRT (cathode ray tube) to LCD (liquid crystal display) monitor, for displaying information to the user and a keyboard and a pointing device, e.g., a mouse or a trackball, by which the user can provide input to the computer. Other kinds of I/O devices 458 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some embodiments, the computing system 450 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   ingesting, by a data intake and query system, a plurality of metrics including key values and measured values, wherein a measured value includes a numerical value and represents a performance measurement of a computing resource that is measured at a point in time, and wherein each of the plurality of key values includes a primary key value of a primary key;
   generating, by the data intake and query system, a particular hash value for each metric of the plurality of metrics by processing a primary key value associated with the metric, with a hashing function; and
   storing, by the data intake and query system, a first metric of the plurality of metrics in a first hash bucket, wherein the first hash bucket is associated with a time-based criterion, and wherein a hash value of the first hash bucket matches the particular hash value for the first metric;
   storing, by the data intake and query system, a second metric of the plurality of metrics in a second hash bucket when a time value associated with the second metric of the plurality of metrics does not correspond to the time-based criterion associated with the first hash bucket;
   generating, by the data intake and query system, a new hash bucket for a third metric having a particular hash value that does not match the hash value of the first hash bucket, the new hash bucket being allocated to receive other metrics having hash values that match the hash value of the new bucket;
   identifying, by the data intake and query system, an anomalous metric from among the plurality of metrics, the anomalous metric being a metric that includes an outlier key value relative to key values of other metrics; and
   storing, by the data intake and query system, the anomalous metric in a quarantine bucket irrespective of the particular hash value of the anomalous metric;
   obtaining, by the data intake and query system, search results satisfying a search query indicative of queried key value by searching hash buckets having hash values that match a hash value of the queried key value;
   causing display, on a display device, of the search results or data indicative of the search results; and
   generating, by the data intake and query system, a new hash bucket for a particular metric having a particular hash value that matches the hash value of the first hash bucket, in response to determining that a time value of the particular metric is not within a time range of the first hash bucket, wherein the new hash bucket is allocated to receive other metrics having hash values that match the hash value of the first hash bucket.

2. The method of claim 1, wherein the primary key is selected by a user.

3. The method of claim 1, wherein the primary key is included in a policy defining conditions for generating a new hash bucket.

4. The method of claim 1, wherein the new hash bucket is generated in accordance with heuristics defining conditions that must be satisfied before generating the new hash bucket.

5. The method of claim 1, wherein the primary key is a source key, a host key, or a source type key.

6. The method of claim 1, wherein the search results are obtained by only searching the hash buckets that have hash values matching the hash value of the queried key value.

7. The method of claim 1, wherein the primary key is not a time based key.

8. The method of claim 1, wherein the quarantine bucket includes a plurality of anomalous metrics having different hash values.

9. The method of claim 1, wherein the new hash bucket is generated when the first hash bucket exceeds a threshold size value.

10. The method of claim 1, wherein the new hash bucket is generated when a time value of the particular metric is not within a time range of the first hash bucket.

11. The method of claim 1, wherein the search results are obtained by only searching the hash buckets having hash values that match the hash value of the queried key value, and wherein the search query is input by a user and expressed in a pipelined search language.

12. The method of claim 1, wherein each metric includes a plurality of dimensions, wherein each dimension is either a required dimension or an optional dimension, wherein each metric includes a key value for each required dimension, and wherein only some of the plurality of metrics include key values for some optional dimensions.

13. The method of claim 1, wherein each metric is a semi-structured metric or a structured metric.

14. The method of claim 1, wherein the measured value comprises a measure of a utilization of an electronic component, a temperature of the electronic component, or a voltage reading of the electronic component.

15. The method of claim 1, wherein each numerical value is a floating point value.

16. A non-transitory machine-readable store medium having instructions stored thereon, execution of which in a data intake and query system cause the data intake and query system to perform operations comprising:
ingesting, by a data intake and query system, a plurality of metrics including key values and measured values, wherein a measured value includes a numerical value and represents a performance measurement of a computing resource that is measured at a point in time, and wherein each of the plurality of key values includes a primary key value of a primary key;
generating, by the data intake and query system, a particular hash value for each metric of the plurality of metrics by processing a primary key value associated with the metric, with a hashing function;
storing, by the data intake and query system, a first metric of the plurality of metrics in a first hash bucket, wherein the first hash bucket is associated with a time-based criterion, and wherein a hash value of the first hash bucket matches the particular hash value for the first metric;
storing, by the data intake and query system, a second metric of the plurality of metrics in a second hash bucket when a time value associated with the second metric of the plurality of metrics does not correspond to the time-based criterion associated with the first hash bucket;
generating, by the data intake and query system, a new hash bucket for a third metric having a particular hash value that does not match the hash value of the first hash bucket, the new hash bucket being allocated to receive other metrics having hash values that match the hash value of the new bucket;
identifying, by the data intake and query system, an anomalous metric from among the plurality of metrics, the anomalous metric being a metric that includes an outlier key value relative to key values of other metrics;
storing, by the data intake and query system, the anomalous metric in a quarantine bucket irrespective of the particular hash value of the anomalous metric;
obtaining, by the data intake and query system, search results satisfying a search query indicative of queried key value by searching hash buckets having hash values that match a hash value of the queried key value;
causing display, on a display device, of the search results or data indicative of the search results; and
generating, by the data intake and query system, a new hash bucket for a particular metric having a particular hash value that matches the hash value of the first hash bucket, in response to determining that a time value of the particular metric is not within a time range of the first hash bucket, wherein the new hash bucket is allocated to receive other metrics having hash values that match the hash value of the first hash bucket.

17. The non-transitory machine-readable storage medium of claim 16, wherein the primary key is selected by a user.

18. The non-transitory machine-readable storage medium of claim 16, wherein the primary key is included in a policy defining conditions for generating the new hash bucket.

19. The method non-transitory machine-readable storage medium of claim 16, wherein the new hash bucket is generated in accordance with heuristics defining conditions that must be satisfied before generating the new hash bucket.

20. The non-transitory machine-readable storage medium of claim 16, wherein the primary key is a source key, a host key, or a source type key.

21. The non-transitory machine-readable storage medium of claim 16, wherein the search results are obtained by only searching the hash buckets matching the hash value of the queried key value.

22. The non-transitory machine-readable storage medium of claim 16, wherein the primary key is not a time based key.

23. The non-transitory machine-readable storage medium of claim 16, wherein the quarantine bucket includes a plurality of anomalous events having different hash values, and wherein the data intake and query system searches the quarantine bucket in addition to only the hash buckets matching the hash value of the queried key value to obtain the search results.

24. The non-transitory machine-readable storage medium of claim 16, wherein the new hash bucket is generated even if the first hash bucket has a matching hash value when the first hash bucket exceeds a threshold size value.

25. A data intake and query system comprising:
a processor; and
memory containing instructions that, when executed by the data intake and query system, cause the data intake and query system to:
ingest a plurality of metrics including key values and measured values, wherein a measured value includes a numerical value and represents a performance measurement of a computing resource that is measured at a point in time, and wherein each of the plurality of key values includes a primary key value;

generate a particular hash value for each metric of the plurality of metrics by processing a primary key value associated with the metric, with a hashing function; and store a first metric of the plurality of metrics in a first hash bucket, wherein the first hash bucket is associated with a time-based criterion, and wherein a hash value of the first hash bucket matches the particular hash value for the first metric;

store a second metric of the plurality of metrics in a second hash bucket when a time value associated with the second metric of the plurality of metrics does not correspond to the time-based criterion associated with the first hash bucket;

generate a new hash bucket for a third metric having a particular hash value that does not match the hash value of the first hash bucket, the new hash bucket being allocated to receive other metrics having hash values that match the hash value of the new bucket;

identify an anomalous metric from among the plurality of metrics, the anomalous metric being a metric that includes an outlier key value relative to key values of other metrics;

store the anomalous metric in a quarantine bucket irrespective of the particular hash value of the anomalous metric;

obtain search results satisfying a search query indicative of queried key value by searching hash buckets having hash values that match a hash value of the queried key value;

cause display, on a display device, of the search results or data indicative of the search results; and generate a new hash bucket for a particular metric having a particular hash value that matches the hash value of the first hash bucket, in response to determining that a time value of the particular metric is not within a time range of the first hash bucket, wherein the new hash bucket is allocated to receive other metrics having hash values that match the hash value of the first hash bucket.

* * * * *